(12) United States Patent
Kadono

(10) Patent No.: US 6,757,332 B1
(45) Date of Patent: Jun. 29, 2004

(54) VIDEO DECODING METHOD, VIDEO DECODING APPARATUS, AND PROGRAM STORAGE MEDIA

(75) Inventor: Shinya Kadono, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 620 days.

(21) Appl. No.: 09/695,227

(22) Filed: Oct. 25, 2000

(30) Foreign Application Priority Data

Oct. 25, 1999  (JP) ............................................. 11-301837

(51) Int. Cl.⁷ ............................. H04N 7/58; H04N 7/26
(52) U.S. Cl. ............................................... 375/240.25
(58) Field of Search ....................... 375/240.25, 240.27, 375/240.12, 240.13; H04N 7/58, 7/26

(56) References Cited

U.S. PATENT DOCUMENTS

| | | | | |
|---|---|---|---|---|
| 5,550,847 A | * | 8/1996 | Zhu ....................... | 375/240.13 |
| 5,719,646 A | * | 2/1998 | Kikuchi et al. ......... | 375/240.27 |
| 5,768,527 A | | 6/1998 | Zhu et al. .................... | 709/231 |

FOREIGN PATENT DOCUMENTS

JP         11-177623        7/1999

OTHER PUBLICATIONS

L. Ducla–Soares et al., "Error resilience and concealment performance for MPEG–4 frame–based video coding", Signal Processing, Image Communication, Elsevier Science Publishers, Amsterdam, NL, vol. 14, No. 6–8, May 1999, pp. 447–472, XP004165388, ISSN: 0923–5965.

Y. Wang et al., "Error Control and Concealment for Video Communication: A Review", Proceedings of the IEEE, IEEE. New York, US, vol. 86, No. 5, May 1998, pp. 974–997, XP000933873, ISSN: 0018–9219.

* cited by examiner

*Primary Examiner*—Nhon Diep
(74) *Attorney, Agent, or Firm*—Wenderoth, Lind & Ponack, L.L.P.

(57) ABSTRACT

A video decoding apparatus is provided with a rearrangement unit including a buffer memory for storing VOP data, and a comparator for comparing a VOP display time of a received VOP with a VOP display time Td' of VOP data which has been most-recently outputted from the buffer memory to a decoding unit. When VOP data of a previous VOP arrives at the rearrangement unit after VOP data of a subsequent VOP and later than its sending time, the rearrangement unit outputs VOP data of VOPs from the previous VOP to a target VOP to be displayed at this point of time, as a video stream VOPstr, to the decoding unit. Therefore, the decoding unit can resume decoding from the VOP data of the previous VOP, whereby degradation in picture quality of a decoded picture is prevented from propagating through subsequent decoded pictures.

21 Claims, 32 Drawing Sheets

VIDEO DECODING METHOD, VIDEO DECODING APPARATUS, AND PROGRAM STORAGE MEDIA

FIELD OF THE INVENTION

The present invention relates a method and an apparatus for video decoding capable of reducing an adverse effect on decoded video by a delay in a stream, which is caused by congestion of a transmission line or retransmission of the stream as a countermeasure against a transmission path error, when transmitting a coded stream obtained by coding video data, through the communication line. Further, the invention relates to a program storage medium containing a video decoding program for implementing the video decoding method by software.

BACKGROUND OF THE INVENTION

In recent years, we have greeted the age of multimedia in which representation media such as audio, video, and the like are integrally handled, and the conventional information media, i.e., means for transmitting information to men, such as newspapers, magazines, televisions, radios, and telephones, have been adopted as the targets of multimedia. Generally, "multimedia" means media representing not only characters but also diagrams, speeches, and especially pictures simultaneously in association with each other. In order to handle the conventional information media as the targets of multimedia, it is necessary to express the information in digital format.

However, when the quantity of data possessed by each of the above-described information media is estimated as the quantity of digital data, audio having quality for telecommunication requires 64 kbits per second while the quantity of data per character is only 1–2 byte. Further, video having quality for present television broadcasting requires more than 100 Mbits per second. So, with respect to the information media such as a telephone and a television, it is not practical to handle such massive data as it is in digital format. Although visual telephones have already been put to practical use by ISDN (Integrated Services Digital Network) having a transmission rate of 64 kbps–1.5 Mbps, it is impossible to transmit video data obtained by a television camera as digital data through ISDN.

So, a data compression technique is demanded. For example, for a visual telephone, a video compression technique such as H.261 or H.263 standard, which have been standardized by ITU-T (International Telecommunication Union—Telecommunication Sector), is employed. Further, according to a data compression technique of MPEG1 standard, it is possible to store video data as well as audio data in an ordinary music CD (compact disk).

MPEG (Moving Picture Experts Group) is an international standard of video data compression, and MPEG1 is a standard for compressing video data to 1.5 Mbps, i.e., data of a television signal to about 1/100. Since the transmission rate of the targets to which MPEG1 is directed is limited to about 1.5 Mbps, MPEG2, which compresses video data to 2~15 Mbps, has been standardized to meet the demands for higher picture quality.

Furthermore, under the existing circumstances, standardization of MPEG4 is now proceeded by the working group for standardization of MPEG1 and MPEG2 (ISO/IEC JTC1/SC29/WG11), and this MPEG4 enables coding and processing of picture data in object units to realize new functions required in the age of multimedia. At the beginning, MPEG4 has aimed at standardization of low-bit-rate coding, but the target of standardization is now extended to more versatile high-bit-rate coding adaptable to an interlace picture.

By the way, a feature of MPEG4 resides in that picture data corresponding to plural picture sequences (objects) are simultaneously coded and transmitted. This scheme enables constitution of one moving picture composed of plural objects. In this scheme, for example, a foreground and a background are handled as different picture sequences (different objects), and the frame frequency, picture quality, bit rate, etc. are separately changed for each picture sequence. Further, when plural picture sequences are arranged in the horizontal or vertical direction on a display area like multi-window, the user can extract or enlarge only his/her favorite picture sequence.

In order to code an object having no shape such as a background, generally employed is a coding method in which only pixel value signals indicating pixel values of the object are coded as picture data, such as MPEG2. On thy other hand, in order to code an object having a shape such as a foreground, employed is a coding method in which not only pixel value signals indicating pixel values of the object but also shape signals indicating the shape of the object are coded as picture data.

Further, in MPEG2 and MPEG4, each picture sequence is coded for each of pictures constituting the picture sequence (it corresponds to a frame in MPEG2, and a VOP in MPEG4), and some of the pictures are subjected to a differential coding process (inter-frame predictive coding) in which difference data between picture data of a picture to be encoded (target picture) and predictive data obtained from picture data of a picture for which coding has already been completed (already-processed picture) are encoded.

However, with respect to an object having a shape, its shape and size vary with time. So, in the coding process based on MPEG4, the coding algorithm for a shape signal and a pixel value signal greatly depends on the shape of the object in the already-processed picture. Therefore, the coding process based on MPEG4 is less resistant to a transmission error of a coded stream and has more difficulty in picture recovery utilizing inter-picture correlation or picture correction by picture processing, as compared with the coding process based on MPEG2 which handles picture data of a picture whose shape and size do not vary. In other words, in a decoding system based on MPEG4, when a transmission error occurs in a coded stream, the quality of decoded picture is considerably degraded.

In MPEG4, as described above, one moving picture is composed of plural picture sequences (objects), and each picture in one moving picture is a frame while each picture in one picture sequence is a VOP (Video Object Plane). When one moving picture is composed of one picture sequence, a frame is equal to a VOP.

Hereinafter, a decoding system adaptable to MPEG4 will be described specifically.

Generally, in a data transmission path (communication line), transmission delay of data occurs due to retransmission of data or the like which is a countermeasure against noise and congestion. Therefore, in a coded stream outputted from a video coding apparatus for coding picture data to output a coded stream or from a video transmission apparatus for transmitting a coded stream, the order of bit streams constituting the coded stream (the order of bit streams at transmission) is different from that when received at the receiving end (the order of bit streams at reception). To be specific, the order of bit streams corresponding to some VOPs in the coded stream at transmission is different from that at reception.

As a countermeasure against this problem, when a coded stream is divided into transmission units called "packets" at the transmitting end, each packet is given a number indicating its turn in the transmission order. Thereby, at the receiving end, VOP data in the received coded stream can be rearranged such that its order becomes equal to that at transmission, on the basis of the number given to each packet.

FIG. 30 is a block diagram for explaining a conventional video decoding apparatus 1000. The video decoding apparatus 1000 receives coded streams Vin corresponding to plural objects constituting one moving picture, and rearranges VOP data in the coded stream corresponding to each object. Thereafter, the video decoding apparatus 1000 decodes the coded streams Vin, and composites decoded picture data corresponding to the respective objects. Further, at the transmitting end, each VOP data in the coded stream Vin corresponding to each object is given information indicating the time at which the VOP data is to be displayed at the receiving end (VOP display time).

The video decoding apparatus 1000 includes a rearrangement unit 1001 and a decoding unit 1002. The rearrangement unit 1001 receives a coded stream Vin corresponding to a specific object from the transmitting end, rearranges streams (VOP data) corresponding to the respective VOPs in the coded stream such that the order of these VOP data is equal to the order of the VOP data at the transmitting end, and then outputs the coded stream Vin after the rearrangement as a video stream VOPstr. The decoding unit 1002 decodes the video stream VOPstr with reference to reference picture data VOPref as necessary to generate decoded picture data VOPout. Further, the video decoding apparatus 1000 includes a video memory 1003 which stores the decoded picture data VOPout from the decoding unit 1002, and supplies picture data required for the above-mentioned decoding process, amongst the decoded picture data VOPout stored, as reference picture data VOPref to the decoding unit 1002.

The rearrangement unit 1001 is provided with a buffer memory 1101, and a display time output unit 1102. The buffer memory 1101 temporarily stores the coded stream Vin supplied from the transmitting end. The display time output unit 1102 includes a timer, and generates a display time (specified display time) Td at which each of frames constituting the moving picture is to be displayed, which display time is specified at the receiving end. The rearrangement unit 1001 outputs, as a video stream VOPstr, specific VOP data from the buffer memory 1101 to the decoding unit 1002 on the basis of the specified display time Td. The specific VOP data is VOP data stored as the coded stream Vin in the buffer memory 1101, whose VOP display time is later than the VOP display time of VOP data which has already been outputted as a video stream VOPstr to the decoding unit, and earlier than the specified display time Td. The decoding unit 1002 includes a decoder 1103 for subjecting VOP data which has been coded by intra-frame coding to a decoding process without reference to the reference picture data VOPref, and subjecting VOP data which has been coded by inter-frame predictive coding to a decoding process with reference to the reference picture data VOPref, thereby generating decoded picture data VOPout of each of VOPs constituting the corresponding object.

In FIG. 30, although the rearrangement unit 1001, the decoding unit 1002, and the video memory 1003 correspond to one object, the video decoding apparatus 1000 actually includes rearrangement units 1001, decoding units 1002, and video memories 1003 as many as, at least, the maximum number of objects which are components of the moving picture to be displayed simultaneously. The maximum number of objects to be displayed simultaneously is equal to or smaller than the number of all objects which appear in one moving picture. Further, each of the rearrangement units in the video decoding apparatus does not necessarily have a display time output unit 1102, and a rearrangement unit corresponding to at least one object may have a display time output unit 1102. In this case, to the buffer memory 1101 of the rearrangement unit having no display time output unit 1102, a specified display time Td is supplied from the rearrangement unit having a display time output unit 1102.

Further, the video decoding apparatus 1000 is provided with a video compositor unit 1004 and a display unit 1005. The video compositor unit 1004 outputs, on the basis of the specified display time Td, a display picture selecting signal VOPsel for selecting decoded picture data corresponding to a VOP whose VOP display time is nearest to the specified display time Td, to the video memory corresponding to each object, and reads the decoded picture data corresponding to a VOP whose VOP display time is nearest to the specified display time Td, as display picture data VOPdes, from the video memory corresponding to each object, and composites the display picture data read from the video memories corresponding to the respective VOPs to make composite picture data Vout. The display unit 1005 displays the picture corresponding to one scene of the moving picture, on the basis of the composite picture data Vout. The display unit 1005 displays the moving picture by continuously displaying the pictures corresponding to the respective scenes of the moving picture, at the specified display times Td.

Hereinafter, the operation of the conventional video decoding apparatus 1000 will be described.

When coded streams Vin corresponding to plural objects constituting one moving picture are inputted to the video decoding apparatus 1000, the coded stream Vin corresponding to each object is stored in the buffer memory of the rearrangement unit corresponding to the object.

Since rearrangement of bit streams in a coded stream, decoding of the coded stream, and storage of decoded picture data into the video memory are common to the respective objects, these processes will be described for one object.

In the buffer memory 1101, all of the inputted coded streams are stored until the quantity of data reaches the capacity of the buffer memory 1101. Thereafter, every time a coded stream is inputted, the coded streams stored in the buffer memory 1101 are successively deleted in the order in which the streams were inputted to the buffer memory 1101, by a quantity of data equivalent to that the inputted coded stream.

In the display time output unit 1102 having a timer, a display time (specified display time) Td of each of pictures constituting the moving picture at the receiving end is generated, and information indicating the specified display time Td is output to the buffer memory 1101. In the buffer memory 1101, specific VOP data is selected from the buffer memory 1101 on the basis of the specified display time Td, and the selected VOP data is output as a video stream VOPstr to the decoding unit 1002.

The specific VOP data selected at this time is VOP data whose VOP display time is earlier than the specified display time Td and later than the VOP display time of the last VOP data amongst the VOP data which have already been outputted to the decoding unit 1002 at this point of time. Thereby, in the rearrangement unit 1001, rearrangement of VOP data is carried out so that the order of VOP data in the received coded stream (hereinafter also referred to as "receiving-end VOP order") becomes equal to the order of VOP data in the coded stream outputted from the transmitting end (hereinafter also referred to as "transmitting-end VOP order"). To be specific, even if the transmitting-end VOP order is difference from the receiving-end VOP order due to congestion of the communication line and thereby the VOP data are input to the buffer memory 1101 in the order different from the transmitting-end VOP order, the VOP data are output from the buffer memory 1101 in the correct VOP order equal to the transmitting-end VOP order, as a video stream VOPstr, to the decoding unit 1002.

In the decoding unit 1002, the inputted video stream VOPstr is decoded by the decoder 1103, and decoded picture data VOPout of each VOP is output as already-decoded data. The decoded picture data VOPout outputted from the decoding unit 1002 is temporarily stored in the video memory 1003. When the inputted video stream VOPstr is VOP data corresponding to a VOP which has been subjected to intra-VOP coding, the decoding unit 1002 subjects the video stream VOPstr to intra-VOP decoding without referring to the already-decoded data stored in the video memory 1003. On the other hand, when the inputted video stream VOPstr is VOP data corresponding to a VOP which has been subjected to inter-VOP coding, the decoding unit 1002 subjects the video stream VOPstr to inter-VOP predictive decoding with reference to the already-decoded data (reference picture data) VOPref stored in the video memory 1003.

Further, the information indicating the specified display time Td from the display time output unit 1006 is also supplied to the video compositor unit 1004. In the video compositor unit 1004, a display picture selecting signal VOPsel for selecting decoded picture data of a VOP whose VOP display time is nearest to the specified display time Td is output to the video memory 1003 on the basis of the specified display time Td. Then, decoded picture data of a VOP whose VOP display time is nearest to the specified display time Td is output from the video memory 1003, as display picture data VOPdsp, to the video compositor unit 1004. At this time, plural pieces of display picture data VOPdsp corresponding to the respective objects are supplied from the video memories corresponding to the respective objects to the video compositor unit 1004.

When the decoded picture data stored in the video memory 1003 has already been output to the video compositor unit 1004 at the time when the display picture selecting signal VOPsel from the video compositor unit 1004 is input to the video memory 1003, or when no decoded picture data is stored in the video memory 1003, no decoded picture data is output from the video compositor unit 1004 in response to the display picture selecting signal VOPsel.

In the video compositor unit 1004, the display picture data VOPdsp corresponding to the respective objects are composited, whereby composite picture data Vout is output to the display unit 1005. This composite picture data Vout corresponds to one scene of the moving picture. In the display unit 1005, the picture corresponding to each scene of the moving picture is displayed on the basis of the composite picture data Vout. Further, the display unit 1005 displays the moving picture by continuously displaying the pictures of the respective scenes, on the basis of the specified display times Td.

FIGS. 31(*a*) and 31(*b*) are diagrams for explaining the flow of processing on a coded stream in the conventional video decoding apparatus. In these figures, a coded stream corresponding to one picture sequence (object) is processed.

Initially, a description will be given of the case where the order of VOP data in a received coded stream is equal to the order of VOPs at the transmitting end, with reference to FIG. 31(*a*).

When there is no defect in the coded stream due to transmission path delay, for example, VOP data of VOP1~VOP4 are input, as a coded stream Vin, to the video decoding apparatus 1000 in the order of VOP display times T1~T4 (T1<T2<T3<T4) which are set for the respective VOPs.

Then, these VOP data are input to the buffer memory 1101 of the rearrangement unit 1001 to be stored in it for a predetermined period of time (delay time Bdt1). When the predetermined period of time has passed, the VOP data of VOP1~VOP4 are output to the decoding unit 1002, as video streams VOPstr1~VOPstr4, on the basis of the specified display time Td from the display time output unit 1102. The delay time Bdt1 of the VOP data in the buffer memory 1101 is determined according to the capacity of the buffer memory 1101. The larger the capacity of the buffer memory 1101 is, the longer the delay time is. In this case, the buffer memory 1101 has enough capacity for VOP data of two VOPS.

In the decoding unit 1002, the video streams VOPstr1~VOPstr4 of the respective VOPs are decoded in the order of the VOP display times T1~T4. The decoded picture data of the respective VOPs are temporarily stored in the video memory 1003 and, thereafter, outputted to the video compositor unit 1004, as display picture data VOPdsp1~VOPdsp4, according to the display picture selecting signal VOPsel from the video compositor unit 1004.

Next, a description will be given of the case where the order of VOP data in a received coded stream is not equal to the order of VOPs at the transmitting end, with reference to FIG. 31(*b*).

When the order of VOP data in the codes stream is not correct, VOP data of VOP1~VOP4 are input to the rearrangement unit 1001 of the video decoding apparatus 1000, as a coded stream Vin, in the order in which the VOP data arrived at the apparatus 1000, i.e., in the order of VOP1, VOP3, VOP2, and VOP4.

Then, these VOP data are input to the buffer memory 1101 of the rearrangement unit 1001 to be stored in it for a predetermined period of time (delay time Bdt2 ). When the predetermined period of time has passed, the VOP data of VOP1~VOP4 are output as video stream VOPstr1~VOPstr4 to the decoding unit 1002, on the basis of the specified display time Td from the display time output unit 1102. At the point of time when the VOP data of VOP2 is output from the rearrangement unit 1001 on the basis of the specified display time Td, the VOP data of the VOP2 is stored in the buffer memory 1101 and, therefore, the VOP data of VOP2 which has arrived at the video decoding apparatus 1000 after the VOP data of VOP3 is output to the decoding unit 1002 before the VOP data of VOP3. The buffer memory 1101 has enough capacity for VOP data of three VOPs.

In the decoding unit 1002, the video streams VOPstr1~VOPstr4 of the respective VOPs are decoded in the order of the VOP display times T1~T4. The decoded picture data of the respective VOPs are temporarily stored in the video memory 1003 and, thereafter, outputted to the video compositor unit 1004, as display picture data VOPdsp1~VOPdsp4, according to the display picture selecting signal VOPsel from the video compositor unit 1004.

However, the quantity of VOP data which can be stored in the buffer memory 1101 of the rearrangement unit 1001 is limited. Therefore, although there arises no problem hen the degree of transmission path delay is so small that the rearrangement unit 1001 can absorb the disorder of arrival VOP data due to the transmission path delay, if there occurs a large transmission path delay which disables the rearrangement unit 1001 from absorbing the disorder of arrival VOP data, this delay adversely affects the decoding operation.

FIG. 32 is a diagram for explaining the flow of processing performed on a coded stream in the conventional video decoding apparatus. FIG. 20 shows the case where VOP data of VOP2 arrives at the video decoding apparatus with a delay due to which the VOP data of VOP2 cannot be rearranged, with respect to VOP data of other VOPs in the rearrangement unit 1001. In other words, the arrival time of the VOP data of VOP2 is delayed more than the delay time in the buffer memory 1101.

When VOP data is input to the rearrangement unit 1001 at a correct input timing, it is output from the rearrangement unit 1001 to the decoding unit 1002 at an output timing after the above-mentioned buffer delay time has passed from the correct input timing. Therefore, even when the VOP data arrives at the video decoding apparatus 1000 with a delay, if the delayed VOP data is input to the rearrangement unit 1001 before the output timing, it is normally output to the decoding unit 1002.

However, when the transmission delay of VOP data of VOP2 is considerably large as shown in FIG. 32, there arises a situation where the VOP data of VOP2 is not yet stored in the buffer memory 1101 of the rearrangement unit 1001 at the time when the VOP data of VOP2 should be output to the decoding unit 1002 (output timing of VOP2). In this situation, the VOP data of VOP2 is not decoded by the decoding unit 1002.

Thereafter, at the time when VOP data of VOP3 is output to the decoding unit 1002 (output timing of VOP3), the VOP data of VOP3 stored in the buffer memory 1101 of the rearrangement unit 1001 is output to the decoding unit 1002. In the decoding unit 1002, the VOP data of VOP3 is decoded after decoding VOP data of VOP1.

Although the VOP data of VOP2 arrives at the video decoding unit 1000 at the time when VOP data of VOP4 is output to the decoding unit 1002 (output timing of VOP4), the VOP data of VOP2 is discarded, and only the VOP data of VOP4 is output to the decoding unit 1002. This is because the VOP data of VOP2, which is earlier in decoding order than the VOP data of VOP3, cannot be decoded after decoding the VOP data of VOP3. In the decoding unit 1002, the VOP data of VOP4 is decoded after decoding the VOP data of VOP3.

On the other hand, decoded picture data of VOP1, VOP3, and VOP4 supplied from the decoding unit 1002 art stored in the video memory 1003, and the decoded picture data of each VOP is output, as display picture data VOPdsp, from the video memory 1003 to the video compositor unit 1004, at the time to display each VOP. However, since the VOP data of VOP2 (video stream VOPstr2) is not input to the decoding unit 1002, decoded picture data of VOP1 (display picture data VOPdsp1) is output at the time to display VOP2, as decoded picture data of VOP2, from the video memory 1003 to the video compositor unit 1004.

In this case, since the decoded picture data of VOP2 cannot be referred to when performing inter-VOP decoding on the VOP data of VOP3, the quality of decoded picture of VOP3 is degraded. Further, since the decoded picture data of VOP3 whose picture quality is degraded is referred to when performing inter-VOP decoding on the VOP data of VOP4, the quality of decoded picture of VOP4 is also degraded.

As described above, in the conventional video decoding apparatus, when a part of a coded stream (i.e., specific VOP data) is received with a considerable delay due to transmission path delay, the qualities of decoded picture of all VOPs, whose VOP display times are later than the VOP display time of the delayed VOP data, are degraded.

Further, in the conventional video decoding apparatus 1000, when the capacity of the buffer memory 1101 of the rearrangement unit 1001 is increased and, further, the time from when VOP data of each VOP is input as a coded stream Vin to the rearrangement unit 1001 to when the corresponding VOP data is output as a video stream VOPstr from the rearrangement unit 1001 is increased, VOP data of a VOP which arrives at the apparatus with a considerable delay can be output as a video stream VOPstr in the normal order.

In this case, however, the delay time from when the VOP data of each VOP is input as a coded stream Vin to the video decoding apparatus 1000 to when the decoded picture of each VOP is displayed is increased as a whole. As the result, especially in a monitor system in which a taken picture is transmitted to a receiving terminal and displayed in real time, the function of the monitor system is degraded by an increase in response time from when a coded stream is input to when a decoded picture is displayed.

Further, an increase in the memory capacity of the buffer memory 1101 in the rearrangement unit 1001 can lead to an increase in power consumption or device cost

SUMMARY OF THE INVENTION

The present invention is made to solve the above-described problems and has for its object to provide a video decoding method and a video decoding apparatus by which, even when a part of a coded stream obtained by coding video data is received with a considerable delay, degradation in picture quality of a decoded picture corresponding to this part of the coded stream is prevented from propagating through subsequent decoded pictures.

It is another object of the present invention to provide a program storage medium containing a program for performing the video decoding method.

Other objects and advantages of the invention will become apparent from the detailed description that follows. The detailed description and specific embodiment described are provided only for illustration since various additions and modifications within the scope of the invention will be apparent to those of skill in the art from the detailed description.

According to a first aspect of the present invention, there is provided a video decoding method for decoding coded streams obtained by coding picture data of a moving picture which is composed of pictures for which their specific times are set. This method comprises a rearrangement step of receiving coded data of the respective pictures as coded streams from a transmitting end, and outputting the received coded data of the respective pictures in chronological order of the specific times set on the respective pictures, at sending times corresponding to the respective pictures; and a decoding step of performing decoding on the coded data of the respective pictures outputted in the rearrangement step, thereby generating decoded picture data corresponding to the respective pictures. When the rearrangement step receives coded data of a picture to be outputted at a first sending time, with a delay after a second sending time which is later than the first sending time, the rearrangement step outputs coded data of pictures whose specific times are within the range from the first sending time to the second sending time. Therefore, even when coded data of a picture is received with a delay, the decoding step can resume decoding from the coded data of the delayed picture, whereby decoding on coded data can be performed without propagating degradation in picture quality through the subsequent pictures.

According to a second aspect of the present invention, in the video decoding apparatus of the first aspect, when the rearrangement step receives coded data of a picture as one of components of the moving picture, before a time at which a last picture in the display order is to be displayed, the rearrangement step outputs the coded data of the picture received. On the other hand, when the rearrangement step receives coded data of a picture as one of components of the moving picture after the time at which the last picture is to be displayed, the rearrangement step discards the coded data of the picture received. Therefore, a buffer memory for storing coded data of pictures can be effectively used, and the number of picture sequences (objects) which are simultaneously decodable is prevented from increasing unnecessarily.

According to a third aspect of the present invention, in the video decoding method of the first aspect, when the rearrangement step receives the coded data of the picture to be outputted at the first sending time, with a delay after the second sending time later than the first sending time, if it is possible to output coded data of all pictures whose specific times are within the range from the first sending time to the second sending time, the rearrangement step outputs the coded data of all these pictures. On the other hand, if it is impossible to output coded data of all pictures whose specific times are within the range from the first sending time to the second sending time, the rearrangement step discards the coded data the picture received. Therefore, inter-frame predictive decoding with referring to decoded picture data is prevented from being performed when there is no normal reference picture data, whereby degradation in picture quality is prevented from propagating through the subsequent pictures in the process of decoding.

According to a fourth aspect of the present invention, there is provided a video decoding method for decoding coded streams obtained by coding picture data of a moving picture which is composed of pictures on which their specific times are set. This method comprises a rearrangement step of receiving coded data of the respective pictures as coded streams frog a transmitting end, and outputting the received coded data of the respective pictures in chronological order of the specific times set on the respective pictures; and a decoding step of performing decoding on the coded data of the respective pictures outputted in the rearrangement process, thereby generating decoded picture data corresponding to the respective pictures. When the rearrangement step outputs coded data of a picture which is not normally decodable, the decoding step suspends decoding on coded data of pictures during a period from when the coded data is outputted to when coded data of a normally decodable picture is outputted. Therefore, considerable degradation in picture quality is prevented from occurring and, moreover, degradation in picture quality is prevented from propagating through the subsequent pictures.

According to a fifth aspect of the present invention, in the video decoding method of the fourth aspect, the decoding step decides whether or not decoding is to be suspended when coded data of a picture which is not normally decodable is outputted, on the basis of a user's control signal. Therefore, whether or not to suspend decoding when an error is detected in coded data can be decided according to the user's preference or purpose.

According to a sixth aspect of the present invention, in the video decoding method of the fourth aspect, the decoding step includes a shape decision step of deciding whether or not coded data of a picture outputted from the rearrangement step includes shape information indicating the shape of the picture. In the case where the coded data of the picture includes shape information, when coded data of a picture which is not normally decodable is outputted, the decoding step suspends decoding on coded data during a period from when the coded data is outputted to when coded data of a normally decodable picture is outputted. On the other hand, in the case where the coded data of the picture includes no shape information, the decoding step continues decoding on coded data regardless of whether coded data of a picture outputted from the rearrangement step is normally decodable or not. Therefore, a picture sequence having no shape signal, which is not very much affected by a transmission error or the like, can be decoded without degrading real-time performance. Further, with respect to a picture sequence having a shape signal which is considerably affected by a transmission error or the like, degradation in picture quality due to the error is reduced.

According to a seventh aspect of the present invention, there is provided a video decoding apparatus for decoding coded streams obtained by coding picture data of a moving picture which is composed of pictures on which their specific times are set. This apparatus comprises a data rearrangement unit for receiving coded data of the respective pictures as coded streams from a transmitting end, and outputting the received coded data of the pictures in chronological order of the specific times set on the respective pictures, at sending times corresponding to the respective pictures; a decoding unit for performing decoding on the coded data of the respective pictures outputted from the rearrangement unit, thereby generating decoded picture data corresponding to the respective pictures; and a display picture output unit for outputting the decoded picture data corresponding to the respective pictures outputted from the decoding unit, as display picture data, so that the respective pictures are displayed at predetermined timings. When the data rearrangement unit receives coded data of a picture to be outputted at a first sending time, with a delay after a second sending time which is later than the first sending time, the rearrangement unit outputs coded data of pictures whose specific times are within the range from the first sending time to the second sending time. Therefore, even when coded data of a picture is received with a delay, the decoding unit can resume decoding from the coded data of the delayed picture, whereby decoding on coded data can be performed without propagating degradation in picture quality.

According to an eighth aspect of the present invention, in the video decoding apparatus of Claim 7, when the data rearrangement unit outputs coded data of pictures whose specific times are within the range from the first sending time to the second sending time, the display picture output unit outputs, as display picture data, only decoded picture data of a picture whose specific time is nearest to the second sending time, among the coded data of pictures outputted from the data rearrangement unit. Therefore, the latest picture is displayed at the decoding end, among pictures which have already been decoded.

According to a ninth aspect of the present invention, there is provided a video decoding apparatus for decoding coded streams obtained by coding picture data of a moving picture which is composed of pictures on which their specific times are set. This apparatus comprises a data rearrangement unit for receiving coded data of the respective pictures as coded streams from a transmitting end, and outputting the received coded data of the respective pictures in chronological order of the specific times set on the respective pictures; a decoding unit for performing decoding on the coded data of the respective pictures outputted from the rearrangement unit, thereby generating decoded picture data corresponding to the respective pictures; and a display picture output unit for outputting the decoded picture data corresponding to the respective pictures outputted from the decoding unit, as display picture data, so that the respective pictures are displayed at predetermined timings. When coded data of a picture which is not normally decodable is outputted from the data rearrangement unit, the decoding unit suspends decoding on coded data of pictures during a period from when the coded data is outputted to when coded data of a picture which is normally decodable is outputted. Therefore, considerable degradation in picture quality is prevented from occurring and, moreover, degradation in picture quality is prevented from propagating through the subsequent pictures.

According to a tenth aspect of the present invention in the video decoding apparatus of the ninth aspect, while the decoding unit suspends decoding on coded data of pictures, the display picture output unit outputs, as display picture data, decoded picture data which has most-recently been decoded by the decoding unit. Therefore, even when decoding on coded data is being suspended, normally decoded picture is displayed.

According to an eleventh aspect of the present invention, there is provided a program storage medium containing a program for making a computer perform decoding on coded streams obtained by coding picture data of a moving picture which is composed of pictures on which their specific display times are set. This program comprises a rearrangement program for making a computer perform a rearrangement process comprising the steps of: receiving coded data of the respective pictures as coded streams from a transmitting end; outputting the received coded data of the respective pictures in chronological order of the specific times set on the respective pictures, at sending times corresponding to the respective pictures; and when coded data of a picture to be outputted at a first sending time arrives at the computer with a delay after a second sending time which is later than the first sending time, outputting coded data of pictures whose specific times are within the range from the first sending time to the second sending time; and a decoding program for making the computer perform a decoding process on the coded data of the respective pictures outputted from the rearrangement unit, thereby generating decoded picture data corresponding to the respective pictures. Therefore, even when coded data of a picture is received with a delay, the computer can resume decoding from the coded data of the delayed picture, whereby decoding on coded data can be performed without propagating degradation in picture quality through the subsequent pictures.

According to a twelfth aspect of the present invention, there is provided a program storage medium containing a program for making a computer perform decoding on coded streams obtained by coding picture data of a moving picture which is composed of pictures on which their specific times are set. This program comprises a rearrangement program for making a computer perform a rearrangement process of receiving coded data of the respective pictures as coded streams from a transmitting end, and outputting the received coded data of the respective pictures in chronological order of the specific times set on the respective pictures; and a decoding program for making the computer perform a decoding process comprising the steps of: performing decoding on the coded data of the respective pictures outputted from the rearrangement step, thereby generating decoded picture data corresponding to the respective pictures; and during the decoding, when coded data of a display picture which is not normally decodable is outputted from the rearrangement step, suspending decoding on coded data of pictures during a period from when the coded data is outputted to when coded data of a normally decodable picture is outputted. Therefore, considerable degradation in picture quality is prevented from occurring and, moreover, degradation in picture quality is prevented from propagating through the subsequent pictures.

According to a thirteenth aspect of the present invention, there is provided a video decoding method for decoding coded streams obtained by coding picture data of a moving picture which is composed of pictures for which their specific times are set. This method comprises a rearrangement step of receiving coded data of the respective pictures as coded streams from a transmitting end, and outputting the received coded data of the respective pictures in chronological order of the specific times set on the respective pictures, at sending times corresponding to the respective pictures; and a decoding step of performing decoding on the coded data of the respective pictures outputted in the rearrangement step, thereby generating decoded picture data corresponding to the respective pictures. When the rearrangement step cannot receive coded data of a picture to be outputted at a predetermined sending time by the predetermined sending time, the rearrangement step suspends sending of coded data of pictures until receiving the coded data of the picture to be outputted at the predetermined sending time, and resumes sending of coded data of pictures after receiving the coded data of the picture. Therefore, even when a decoding unit is constituted by only a decoder which performs decoding on inputted coded data, it is avoided that inter-frame prediction decoding is performed without normal reference picture data, whereby degradation in picture quality due to presence of unreceived picture is avoided. Further, degradation in picture quality, which occurs in a picture, is prevented from propagating through the subsequent pictures.

According to a fourteenth aspect of the present invention, there is provided a video decoding method for decoding coded streams obtained by coding picture data of a moving picture which is composed of pictures for which their specific times are set. This method comprises a rearrangement step of receiving coded data of the respective pictures as coded streams from a transmitting end, and outputting the received coded data of the respective pictures in chronological order of the specific times set on the respective pictures, at sending times corresponding to the respective pictures; and a decoding step of performing decoding on the coded data of the respective pictures outputted in the rearrangement step, thereby generating decoded picture data corresponding to the respective pictures. When the rearrangement step cannot receive coded data of a picture to be outputted at a predetermined sending time by the predetermined sending time, the rearrangement step suspends sending of coded data of pictures until a predetermined condition is satisfied or until it receives the coded data of the picture to be outputted at the predetermined sending time, and resumes sending of coded data of pictures after the condition is satisfied or after it receives the coded data of the picture. Therefore, degradation in picture quality due to presence of coded data of an unreceived picture is avoided and, moreover, the operation of a buffer memory is prevented from being impeded by unnecessary coded data.

According to a fifteenth aspect of the present invention, in the video decoding method of the fourteenth aspect, the predetermined condition is that, in the rearrangement step, the remaining memory capacity of a buffer memory which stores received coded streams of the respective pictures is equal to or smaller than a predetermined threshold in the rearrangement step. Therefore, overflow of the buffer memory is avoided.

According to a sixteenth aspect of the present invention, in the video decoding method of the fourteenth aspect, the predetermined condition is that, in the rearrangement step, the time during which sending of coded data of pictures is suspended is equal to or longer than a predetermined threshold. Therefore, when part of coded data of pictures from a delayed picture to a target picture to be displayed at this point of time is deleted from the buffer memory and so these coded data cannot be decoded normally, the coded data of the delayed picture is prevented from being output to the buffer memory.

According to a seventeenth aspect of the present invention, there is provided a video decoding apparatus for decoding coded streams obtained by coding picture data of a moving picture which is composed of pictures on which their specific times are set. This apparatus comprises a data rearrangement unit for receiving coded data of the respective pictures as coded streams from a transmitting end, and outputting the receive coded data of the pictures in chronological order of the specific times set on the respective pictures, at sending times corresponding to the respective pictures; a decoding unit for performing decoding on the coded data of the respective pictures outputted from the rearrangement unit, thereby generating decoded picture data corresponding to the respective pictures; and a display picture output unit for outputting the decoded picture data corresponding to the respective pictures outputted from the decoding unit, as display picture data, so that the respective pictures are displayed at predetermined timings. When the data rearrangement unit cannot receive coded data of a picture to be outputted at a predetermined sending time by the predetermined sending time, the rearrangement unit suspends sending of coded data of pictures until receiving the coded data of the picture to be outputted at the predetermined sending time, and resumes sending of coded data of pictures after receiving the coded data of the picture. Therefore, even when the decoding unit is constituted by only a decoder which performs decoding on inputted coded data, it is avoided that inter-frame prediction decoding is performed without normal reference picture data, whereby degradation in picture quality due to presence of unreceived picture is avoided. Further, degradation in picture quality, which occurs in a picture, is prevented from propagating through the subsequent pictures.

According to an eighteenth aspect of the present invention, there is provided a video decoding apparatus for decoding coded streams obtained by coding picture data of a moving picture which is composed of pictures on which their specific times are set. This apparatus comprises a data rearrangement unit for receiving coded data of the respective pictures as coded streams from a transmitting end, and outputting the received coded data of the pictures in chronological order of the specific times set on the respective pictures, at sending times corresponding to the respective pictures; a decoding unit for performing decoding on the coded data of the respective pictures outputted from the rearrangement unit, thereby generating decoded picture data corresponding to the respective pictures; and a display picture output unit for outputting the decoded picture data corresponding to the respective pictures outputted from the decoding unit, as display picture data, so that the respective pictures are displayed at predetermined timings. When the data rearrangement unit cannot receive coded data of a picture to be outputted at a predetermined sending time by the predetermined sending time, the rearrangement unit suspends sending of coded data of pictures until a predetermined condition is satisfied or until it receives the coded data of the picture to be outputted at the predetermined sending time, and resumes sending of coded data of pictures after the condition is satisfied or after it receives the coded data of the picture. Therefore, degradation in picture quality due to presence of coded data of an unreceived picture is avoided and, moreover, the operation of a buffer memory is prevented from being impeded by unnecessary coded data.

According to a nineteenth aspect of the present invention, in the video decoding apparatus of Claim the eighteenth aspect, when the data rearrangement unit resumes sending of coded data of pictures to the decoding unit, the display image output unit performs display of pictures within a predetermined period of time such that delays in display timings of these pictures, which occur due to the suspended sending, are decreased every time a picture is displayed. Therefore, when coded data of a picture is received with a delay, a predetermined number of pictures following this delayed picture are displayed such that the actual display times of these pictures, which are delayed from their original display times, gradually approach the original display times. Therefore, even when there is such delayed picture, the display times of the subsequent pictures are gradually corrected, resulting in a smoothly-moving picture.

According to a twentieth aspect of the present invention, there is provided a program storage medium containing a program for making a computer perform decoding on coded streams obtained by coding picture data of a moving picture which is composed of pictures on which their specific display times are set. This program comprises a rearrangement program for making a computer perform a rearrangement process comprising the steps of: receiving coded data of the respective pictures as coded streams from a transmitting end; outputting the received coded data of the respective pictures in chronological order of the specific times set on the respective pictures, at sending times corresponding to the respective pictures; and when coded data of a picture to be outputted at a predetermined sending time has not arrived at the computer by the predetermined sending time, suspending sending of coded data of pictures until receiving the coded data of the picture to be outputted at the predetermined sending time, and resuming sending of coded data of pictures after receiving the coded data of the picture; and a decoding program for making the, computer perform a decoding process on the coded data of the respective pictures outputted from the rearrangement unit, thereby generating decoded picture data corresponding to the respective pictures. Therefore, even when a decoding unit is constituted by only a decoder which performs decoding on inputted coded data, it is avoided that inter-frame prediction decoding is performed without normal reference picture data, whereby degradation in picture quality due to presence of unreceived picture is avoided. Further, degradation in picture quality which occurs in a picture is prevented from propagating through the subsequent pictures.

According to a twenty-first aspect of the present invention, there is provided a program storage medium containing a program for making a computer perform decoding on coded streams obtained by coding picture data of a moving picture which is composed of pictures on which their specific display times are set. This program comprises a rearrangement program for making a computer perform a rearrangement process comprising the steps of: receiving coded data of the respective pictures as coded streams from a transmitting end; outputting the received coded data of the respective pictures in chronological order of the specific times set on the respective pictures, at sending times corresponding to the respective pictures; and when coded data of a picture to be outputted at a predetermined sending time has not arrived at the computer by the predetermined sending time, suspending sending of coded data of pictures until a predetermined condition is satisfied or until the computer receives the coded data of the picture to be outputted at the predetermined sending time, and resuming sending of coded data of pictures after the condition is satisfied or after the computer receives the coded data of the picture; and a decoding program for making the computer perform a decoding process on the coded data of the respective pictures outputted from the rearrangement unit, thereby generating decoded picture data corresponding to the respective pictures. Therefore, degradation in picture quality due to presence of coded data of unreceived picture is avoided and, moreover, the operation of a buffer memory is prevented from being impeded by unnecessary coded data.

BRIEF DESCRIPTION OF THE DRAWINGS

FIG. 9 is a flowchart illustrating the operation of the rearrangement unit 101a.

FIGS. 12(a) and 12(b) are diagrams far explaining the operation of the video decoding apparatus according to the second embodiment, wherein FIG. 12(a) shows the time zone where six picture sequences (objects A to F) are displayed, and FIG. 12(b) shows the time zone where coded streams of the respective picture sequences are processed by corresponding rearrangement units (decoding units).

FIGS. 26(a) and 26(b) are diagrams for explaining the effect of the ninth embodiment, wherein FIG. 26(a) shows the state where actual display times Td0 of VOPs (i+1)~(i+3) which follow a delayed VOP (i) gradually approach their original display times Td, and FIG. 26(b) shows the state where the VOPs (i+1)~(i+3) are displayed at their original display times Td.

FIGS. 31(a) and 31(b) are diagrams for explaining the flow of processing on a coded stream in the conventional video decoding apparatus, wherein FIG. 31(a) shows the case where the order of VOP data in a received coded stream is normal, and FIG. 31(b) shows the case where the order of VOP data in a received coded stream is abnormal.

DETAILED DESCRIPTION OF THE PREFERRED EMBODIMENTS

Embodiment 1

Figure 1:
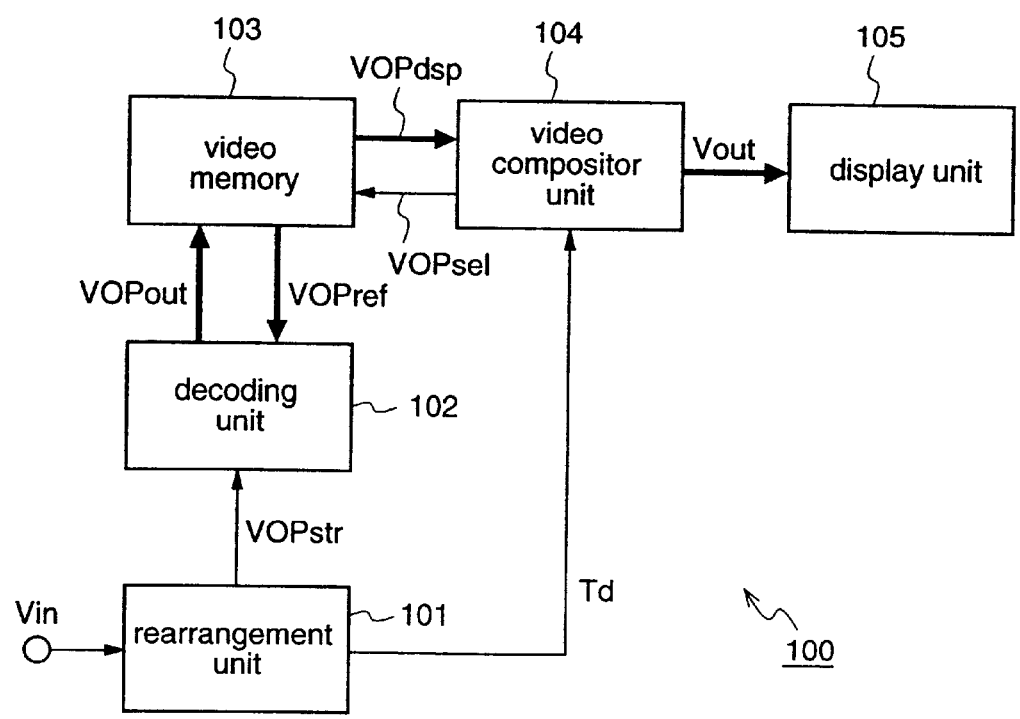
FIG. 1 is a block diagram for explaining a video decoding apparatus 100 according to a first embodiment of the present invention.

FIG. 1 is a block diagram for explaining a video decoding apparatus 100 according to a first embodiment of the present invention.

Figure 30:
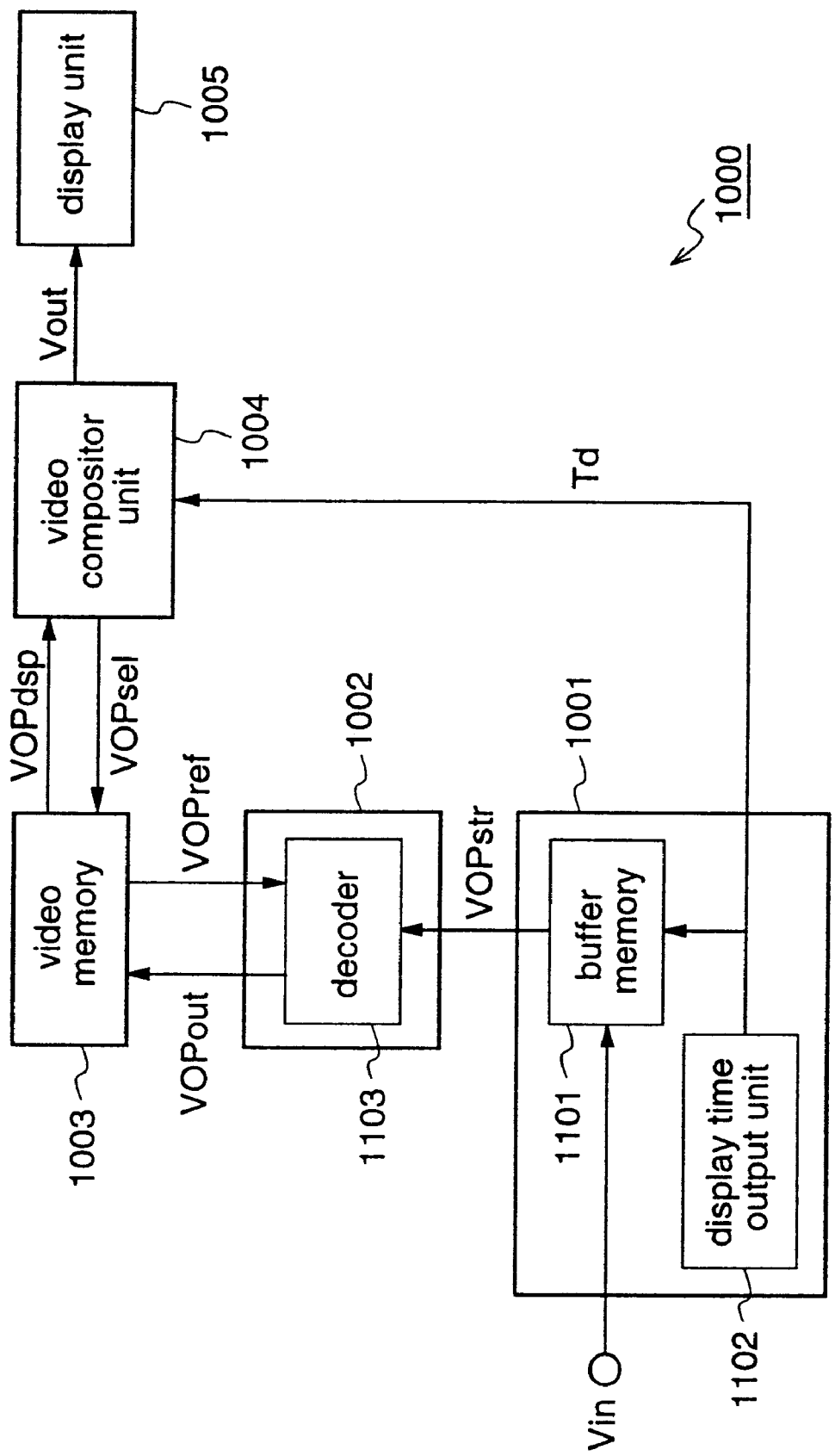
FIG. 30 is a block diagram for explaining the conventional video decoding apparatus.
Figure 31:
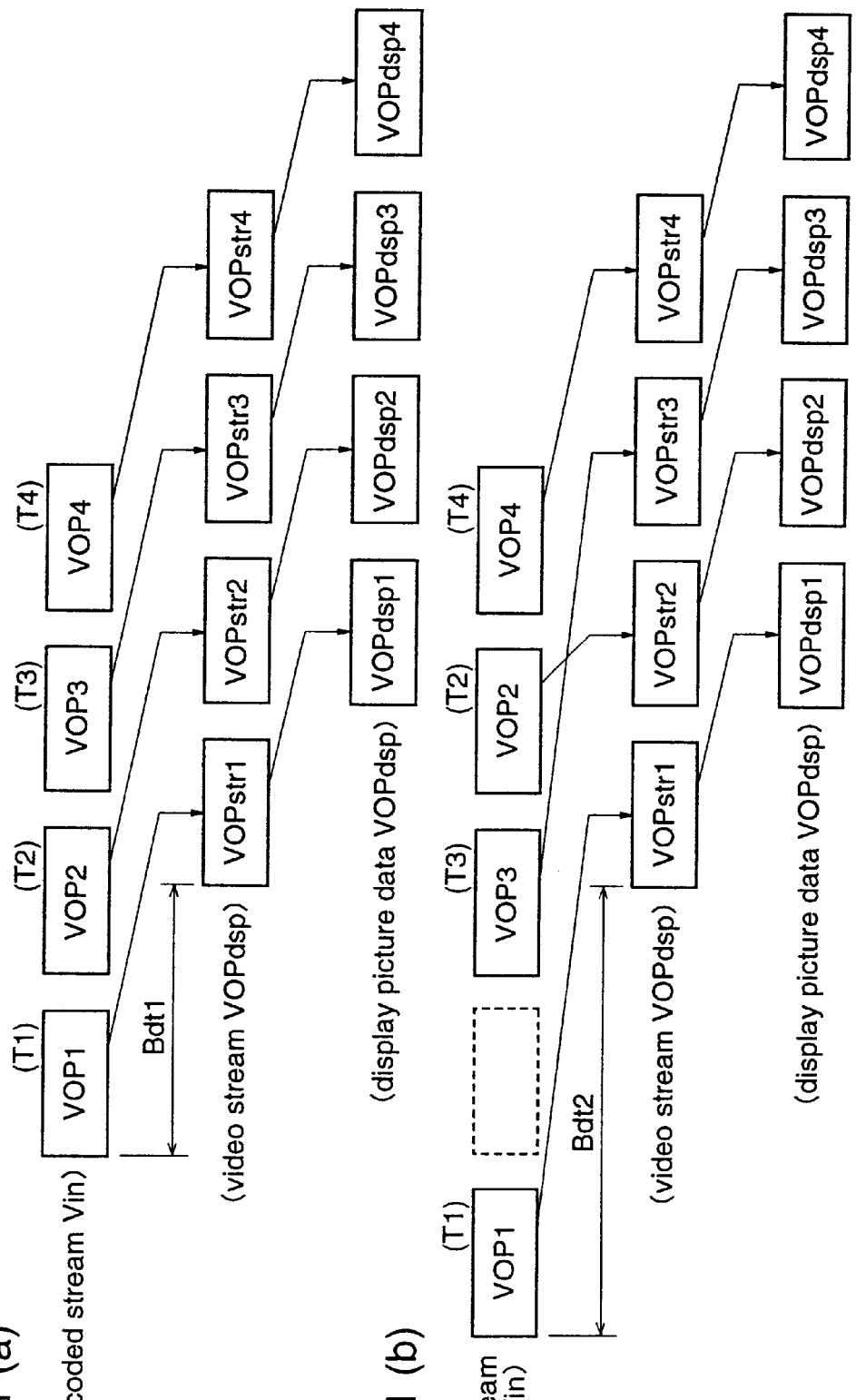
Figure 32:
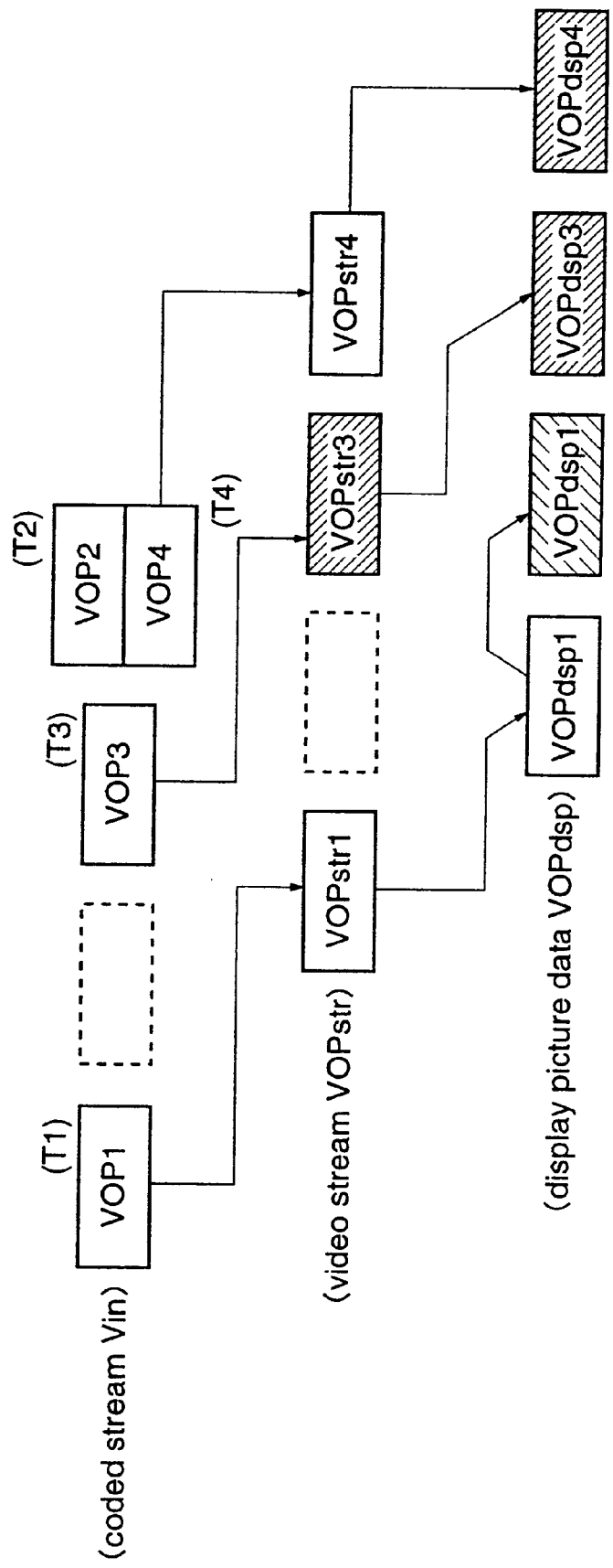
FIG. 32 is a diagram for explaining the flow of processing on a coded stream in the conventional video recoding apparatus.

The video decoding apparatus 100 includes a rearrangement unit 101 instead of the rearrangement unit 1001 of the conventional video decoding apparatus 1000 shown in FIG. 30. When VOP data of a VOP for which an earlier VOP display time is set (previous VOP) is received after reception n of VOP data of a VOP for which a later VOP display time is se (subsequent VOP), the rearrangement unit 101 outputs VOP data of VOPs from the previous VOP to a display target VOP which is indicated by a display time specified at this decoding apparatus end. The display target VOP is a VOP for which a VOP display time not later than and nearest to the specified display time is set. Further, when the VOP data of the previous VOP is received after the VOP data of the subsequent VOP, there will be a first case where VOP data of the previous VOP is received by a sending time at which this VOP data should be outputted from the rearrangement unit 101 (in other words, by a time at which decoding and composition will be performed in the following units 102 and 104), and a second case where the VOP data of the previous VOP is received with a delay after the sending time.

Even when the VOP data of the previous VOP is received after the VOP data of the subsequent VOP, as long as the VOP data of the previous VOP is received by its sending time (the first case), the VOP data of the previous VOP received later is outputted from the rearrangement unit 101 before the VOP data of the subsequent VOP received earlier (the usual rearrangement process like the conventional one). Therefore, the rearrangement unit 101 does not perform the rearrangement process of out putting VOP data of VOPs from the previous VOP to the display target VOP (the rearrangement process unique to this first embodiment).

On the other hand, when the VOP data of the previous VOP is received after the VOP data of the subsequent VOP and later than its sending time (the second case), usually the VOP data of the subsequent VOP has already been outputted from the rearrangement unit 101. Therefore, the rearrangement unit 101 performs the rearrangement process unique to this first embodiment, whereby VOP data of VOPs from the previous VOP to the display target VOP are outputted from the rearrangement unit 101.

Accordingly, in the following description with respect to the embodiments of the present invention, the case where the VOP data of the subsequent VOP is received after the VOP data of the subsequent VOP is not the first case where the usual rearrangement process is performed (the case where the VOP data of the previous VOP is received by its sending time), but the second case where the rearrangement process typical to this first embodiment is performed (the case where the VOP data of the previous VOP is received after its sending time).

Further, the video decoding apparatus 100 includes a decoding unit 102 instead of the decoding unit 1002 of the conventional video decoding apparatus 1000. The decoding unit 102 stops decoding on VOP data including errors, and decodes only VOP data of a VOP which is given a VOP display time later than a VOP display time of an already-decoded VOP.

Further, the video decoding apparatus 100 is provided with a video memory 103 for storing decoded picture data VOPout obtained by the decoding process in the decoding unit 102, like the conventional video decoding apparatus 1000.

The rearrangement unit 101, the decoding unit 102, and the video memory 103 are provided as many as, at least, the maximum number of picture sequences (objects) to be displayed simultaneously which are components of one moving picture. The video memory 103 has the same construction as the video memory 1003 of the conventional video decoding apparatus 1000.

The video decoding apparatus 100 further comprises a video compositor unit 104, and a display unit 105. The video compositor unit 104 reads, from video memories corresponding to objects to be displayed at a point of time (FIG. 1 shows only the video memory 103 corresponding to one object), decoded picture data VOPout of the respective objects as display picture data VOPdsp according to display picture selection signals VOPsel, and composites the display picture data VOPdsp of the respective objects to create composite picture data Vout as picture data corresponding to one scene of one moving picture. The display unit 105 displays the composite picture as a scene of one moving picture, on the basis of the composite picture data Vout.

The video compositor unit 104 outputs decoded picture data of a VOP to the display unit 105, which decoded picture data is stored in the video memory 103 by the time when the display picture selection signal VOPsel from the video compositor unit 104 is input to the video memory 103 and is included in a VOP whose VOP display time is nearest to a specified display time Td which is indicated by the display picture se section signal VOPsel.

The display unit 105 according to the first embodiment has the same construction as that of the display unit 1005 of the conventional video decoding apparatus 1000.

Hereinafter, the operation of the video decoding apparatus 100 will be described.

When coded streams Vin corresponding to plural objects (picture sequences) constituting one moving picture are input to the video decoding apparatus 100, the coded streams Vin corresponding to the respective objects to be displayed at this point of time are successively input to the rearrangement units corresponding to the respective objects (figure 1 shows only the rearrangement unit 101 corresponding to one object). In the following description, rearrangement of code, streams, decoding of coded streams, and storage of decoded picture data to the video memories will be described with respect to only one object because these processes are common to the respective objects.

In the rearrangement unit 101, while VOP data of the respective VOPs are input to the unit 101 in the order of VOP display times set for the respective VOPs, these VOP data are output as a video stream VOPstr to the decoding unit 102 in the order as inputted to the unit 101. However, when VOP data of a VOP for which an earlier VOP display time is set (previous VOP) is input to the unit 101 after VOP data of a VOP for which a later VOP display time is set (subsequent VOP), VOP data of VOPs from the previous VOP to a display target VOP (i.e., a VOP whose VOP display time is not later than and nearest to the specified display time) are output as a video stream VOPstr to the decoding unit 102.

When the VOP data included in the video stream VOPstr inputted to the decoding unit 102 are normal VOP data which have no defects and are able to be normally decoded, the decoding unit 102 successively decodes these VOP data in the video stream VOPstr. However, when the video stream VOPstr includes defective VOP data which may cause degradation in quality of display picture because of absence of reference picture data, decoding on the defective VOP data in the video stream VOPstr is stopped until normal VOP data is input to the decoding unit 102.

Defective VOP data is, for example, VOP data which is given a later VOP display time and is input to the decoding unit 102 skipping VOP data for which an earlier VOP display is set, or VOP data including a defect such as a transmission error. On the other hand, normal VOP data is, for example, VOP data which is given an earlier VOP display time and is input to the decoding unit 102 after VOP data which is given a later VOP display time and is previously input to the decoding unit 102, or VOP data of a VOP which has been subjected to intra-VOP coding (intra VOP). Further, while decoding on VOP data in the decoding unit 102 is suspended, decoded picture data VOPout corresponding to a VOP which has been decoded just before the suspension of decoding is output as display picture data VOPdes to the video memory 103. The above-described rearrangement of coded stream Vin, decoding of video stream VOPstr, and storage of decoded picture data VOPout are performed by the arrangement unit decoding unit, and video memory corresponding to each of plural objects to be displayed simultaneously, respectively.

In the video compositor unit 104, a display picture selection signal VOPsel for selecting decoded picture data of a VOP whose VOP display time is nearest to the specified display time Td is output to the video memory corresponding to the each object, on the basis of the specified display time Td generated in the arrangement unit 101. Then, the decoded picture data of the VOP whose VOP display time is nearest to the specified display time Td is output, as display picture data VOPdsp, from the video memory corresponding to each object to the video compositor unit 104.

In the video compositor unit 104, the display picture data VOPdsp read from the video memories corresponding to the respective objects are composited, and composite picture data Vout so obtained is output to the display unit 105. The composite picture data Vout is picture data corresponding to one scene (one picture) of a moving picture. In the display unit 105, the picture of each scene of the moving picture is displayed on the basis of the composite picture data Vout. That is, the moving picture is displayed by continuously displaying the pictures of the respective scenes, on the basis of the specified display times Td.

Hereinafter, rearrangement and decoding of VOP data and reading of display picture data from the video memory will be described more specifically.

Figure 2:
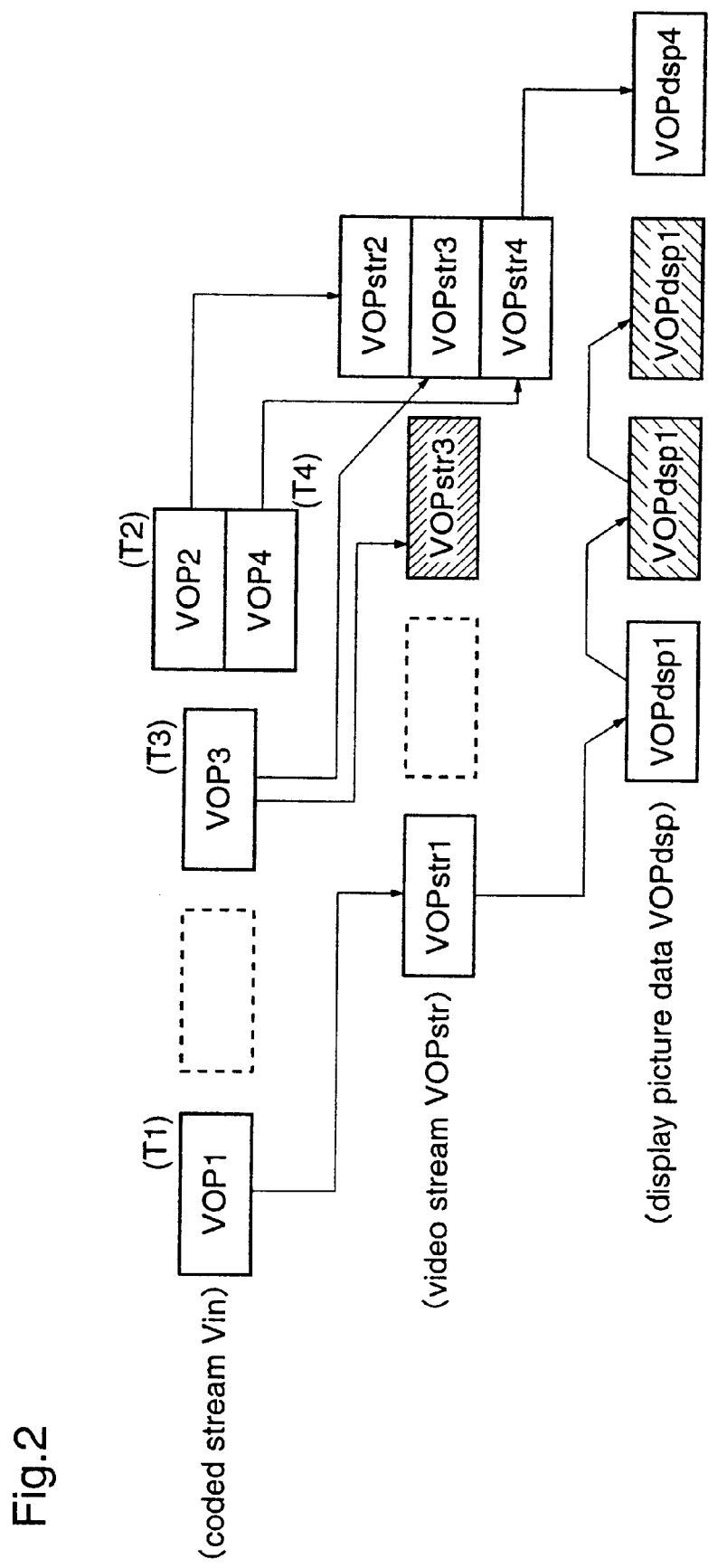
FIG. 2 is a diagram for explaining the flow of processing on a coded stream in the video decoding apparatus 100 according to the first embodiment.

FIG. 2 is a diagram for explaining the flow of processing on a coded stream in the video decoding apparatus according to the first embodiment.

FIG. 2 shows, as VOP data received by the video decoding apparatus, VOP data of VOP1~VOP4 for which VOP display times T1~T4 (T1<T2<T3<T4) are set, respectively. Further, after the VOP data of VOP3 is received by the video decoding apparatus, the VOP data of VOP2 arrives at the video decoding apparatus with such a delay that the rearrangement unit 101 cannot perform rearrangement of VOP data.

In the rearrangement unit 101, after the VOP data of VOP1 is output to the decoding unit 102, not the VOP data of VOP2 but the VOP data of VOP3 is output to the decoding unit 102 subsequently to the VOP data of VOP1. Thereafter, all of VOP data, from the VOP data of VOP2 which has been received after the VOP data of VOP3 to the VOP data of VOP4 which is the most-recently received VOP at this point of time, are output to the decoding unit 102.

When the VOP data are output to the decoding unit 102 in the order described above, the decoding unit 102 performs decoding as follows. After the VOP data of VOP1 is decoded, the VOP data of VOP3 which is input to the decoding unit 102 before the VOP data of VOP2 is detected as defective VOP data, a d the VOP data of VOP3 is not decoded. When the VOP data of VOP2 and VOP4 are input to the decoding unit 102 after the VOP data of VOP3, the VOP data of VOP2~VOP4 are decoded. Further, decoded picture data VOPout of the respective VOPs obtained in the decoding unit 102 are successively output to the video memory 103 to be stored therein.

In the above-described VOP data decoding process by the decoding unit 102, since decoded picture data VOPout of a new VOP is not written in the video memory while the decoding process is suspended, the decoded picture data VOPout of the most-recently written VOP is output as display picture data VOPdsp from the video memory 103 on the basis of the display picture selection signal VOPsel from the video compositor unit 104. As the result, at the timing when the decoded pictures of VOP2 and VOP3 are displayed, the decoded picture of VOP1 is displayed on the basis of the display picture data VOPdsp of VOP1.

Further, under the state where the VOP data of VOP2 is considerably delayed from the VOP data of VOP3, when VOP data of an intra VOP is received after reception of the VOP data of VOP3 and before reception of the VOP data of VOP2, the decoding unit 102 performs decoding on this intra VOP. Therefore, even when a stream in which VOP data of a VOP is completely lost is input as a coded stream Vin to the video decoding apparatus 100, decoding on VOP data is resumed at the timing when VOP data of an intra VOP, whose VOP display time is later than that of the VOP with loss of VOP data, is input. This is because decoding on VOP data of an intra VOP is performed without referring to picture data of an already-decoded VOP, and decoded picture data obtained by the decoding overwrites reference picture data. Accordingly, it is avoided that the decoding in the decoding unit 102 is stopped permanently.

Next, the rearrangement unit 101 as one of components of the video decoding apparatus 100 will be described more specifically.

Figure 3:
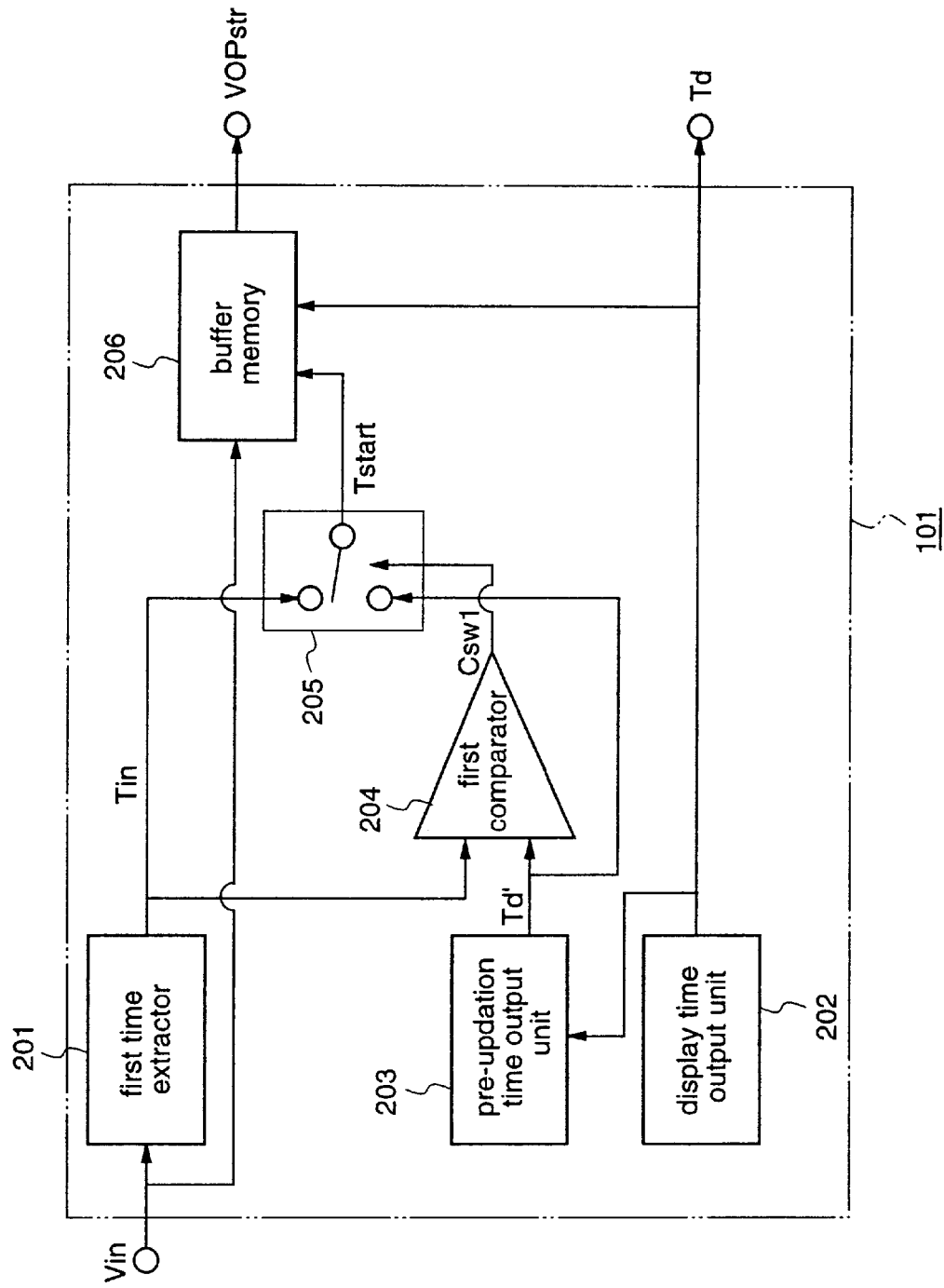
FIG. 3 is a block diagram for explaining a rearrangement unit 101 as a component of the video decoding apparatus 100 according to the first embodiment.

FIG. 3 is a block diagram for explaining the rearrangement unit 101.

The rearrangement unit 101 is provided with a first time extractor 201, a display time output unit 202, a pre-updation time output unit 203, and a comparator 204. The first time extractor 201 extracts a VOP display time Tin which is set for a VOP whose VOP data is received (received VOP), on the basis of an inputted coded stream Vin. The display time output unit 202 contains a timer (not shown), and successively updates and outputs a specified display time Td indicating a display timing for each VOP at the video decoding apparatus end. When the specified display time Td is updated, the pre-updation time output unit 203 outputs a specified display time Td' prior to the updation (pre-updation display time). The comparator 204 compares the VOP display time Tin with the pre-updation display time Td', and outputs a control signal Csw1 according to the result of comparison.

Further, the rearrangement unit 101 is provided with a selector switch 205, and a buffer memory 206. The switch 205 selects either the VOP display time Tin or the pre-updation display time Td' on the basis of the control signal Csw1, and outputs the selected time as a decoding restart time Tstart. The buffer memory 206 stores the coded stream Vin. When the extracted VOP display time Tin is earlier than the pre-updation display time Td', the selector switch 205 selects the VOP display time Tin. When the extracted VOP display time Tin is later than the pre-updation display time Td', the switch 205 selects the pre-updation display time Td'. When the selector switch 205 selects the VOP display time Tin as a decoding restart time Tstart, the buffer memory 206 outputs, as a video stream VOPstr, VOP data of VOPs whose VOP display times are set between the VOP display time Tin and the specified display time Td. On the other hand, when the selector switch 205 selects the pre-updation display time Td' as a decoding restart time Tstart, the buffer memory 206 outputs, as a video stream VOPstr, VOP data of VOPs whose VOP display times are set between the pre-updation display time Td' and the specified display time Td.

Next, the operation of the rearrangement unit 101 will be described more specifically.

Figure 4:
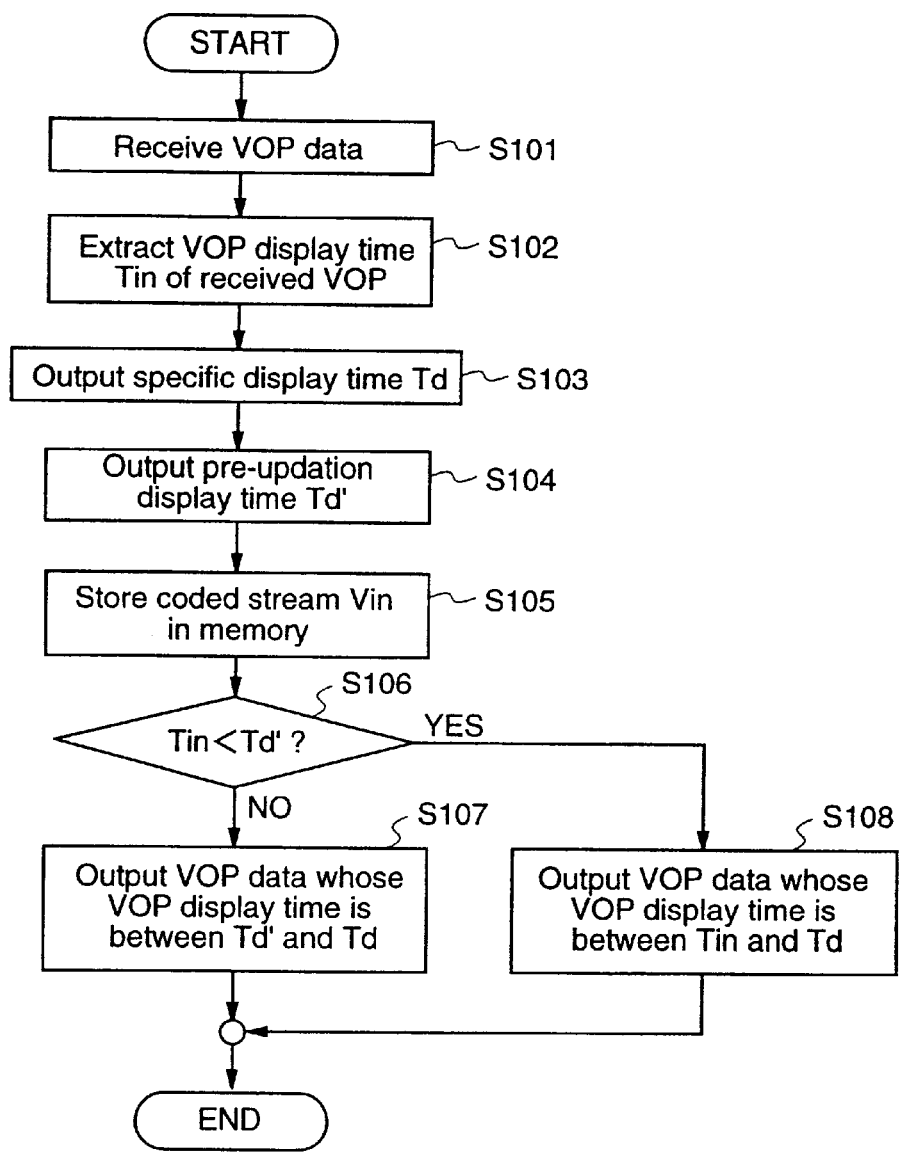
FIG. 4 is a flowchart illustrating the operation of the rearrangement unit 101.

FIG. 4 is a flowchart illustrating the operation of the rearrangement unit 101.

Initially, a coded stream Vin corresponding to one picture sequence (object) is received by the rearrangement unit 101 (step S101), and a VOP display time corresponding to VOP data received as the coded stream Vin (VOP display time of received VOP) is extracted by the first time extractor 201 (step S102). Further, in the display time output unit 202, the specified display time Td indicating the VOP display timing at the video decoding apparatus end is updated and outputted, on the basis of reference time information included in the coded stream Vin (step S103). Further, in the pre-updation time output unit 202, according to the updation of the specified display time Td, a display time Td' prior to the updation is output (step S104). Further, the VOP data received as the coded stream Vin is stored in the buffer memory 206 (step S105).

Next, in the first comparator 204, the VOP display time Tin of the received VOP is compared with the pre-updation display time Td' (step S106). Based on the result of comparison, when the VOP display time Tin is earlier than the pre-updation display time Td' (Tin<Td'), VOP data stored in the buffer memory 206, whose VOP display times are between the extracted VOP display time Tin and the specified display time Td, are output as a video stream VOPstr (step 5108). On the other hand, when the VOP display time Tin is equal to or later than the pre-updation display time Td' (Tin≧Td'), VOP data stored in the buffer memory 206, whose VOP display times are between the extracted pre-updation display time Td, and the specified display time Td, are output as a video stream VOPstr (step S107). That is, when Tin≧Td', VOP data, which are given VOP display times earlier than the specified display time Td and are not yet been output to the decoding unit 102, are output from the buffer memory 206 as a video stream VOPstr (step S107).

As described above, in the rearrangement unit 101, according to the process steps S101~S108, when VOP data for which an earlier VOP display time is set is received with a delay after reception of VOP data for which a later VOP display time is set, VOP data of VOPs from the VOP which has been received with the delay (delayed VOP) to a VOP to be displayed at this point of time (display target VOP) are retransmitted to the decoding unit 102. Therefore, in the decoding unit 102, when the VOP data of the delayed VOP is received, those VOP data from the delayed VOP to the display target VOP at this point of time are successively decoded, whereby picture display of the target VOP at this point of time is satisfactorily performed without degradation of picture quality.

Next, the decoding unit 102 as one of components of the video decoding apparatus 100 according to the first embodiment will be described.

Figure 5:
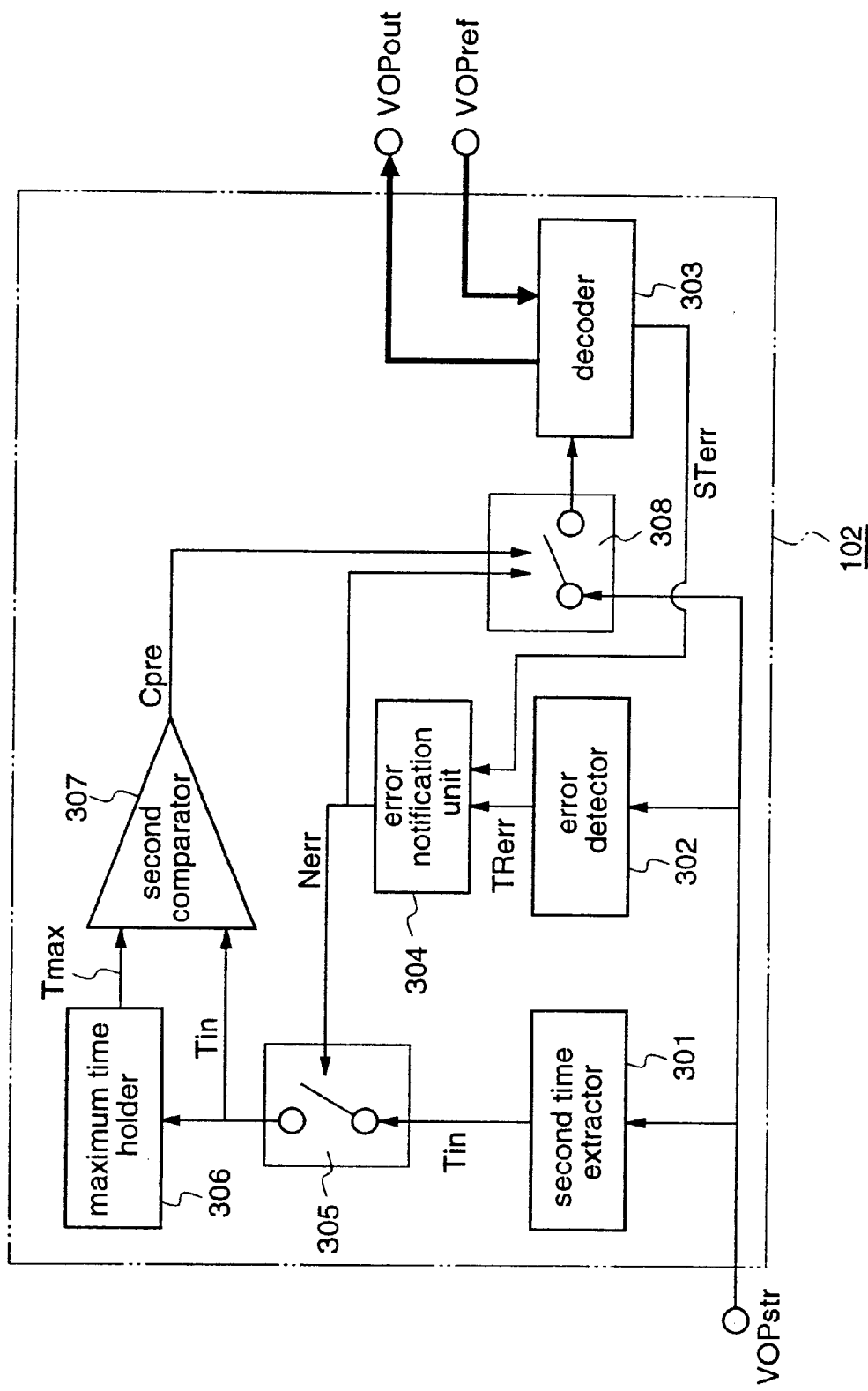
FIG. 5 is a block diagram for explaining a decoding unit 102 as a component of the video decoding apparatus 100 according to the first embodiment.

FIG. 5 is a block diagram for explaining the decoding unit 102.

Generally, since updation of the specified display time Td indicating the display timing of each VOP in the video decoding apparatus is performed at the timing when all of the VOPs corresponding to the respective VOP data received as the coded stream are displayed, the VOP data are output from the rearrangement unit 101 to the decoding unit 102 for each VOP at the updation timing of the specified display time Td. However, when the interval between updation timings of the specified display time Td is long and the number of frames which can be displayed for each second by the display unit 105 is less than the number of VOP data inputted for each second, VOP data of plural VOPs may be transmitted from the rearrangement unit to the decoding unit 102 at the updation timing of the specified display time Td. However, in the decoding unit 102, decoding on each VOP data in the case where VOP data of plural VOPs are input at the updation timing of the specified display time Td is performed in the same way as the decoding on VOP data in the case where only VOP data of a single VOP is input at the updation timing of the specified display time Td. Accordingly, hereinafter, a description will be given of the case where the updation timing of the specified display time Td is a timing at which VOP data of a single VOP is output from the rearrangement unit 101 to the decoding unit 102.

The decoding unit 102 is provided with a second time extractor 301, and an error detector 302. The second time extractor 301 sequentially receives VOP data of each VOP which has been output as a video stream VOPstr from the rearrangement unit 101, and extracts a VOP display time Tin set for the received VOP data. The error detector 302 subjects the video stream VOPstr from the rearrangement unit 101 to error detection for detecting whether there is loss of data due to transmission error in the video stream VOPstr, and outputs a transmission error notification signal TRerr only when there is loss of data.

The decoding unit 102 further includes a decoder 303, and an error notification unit 304. The decoder 303 subjects the video stream VOPstr to decoding with reference to reference picture data VOPref which is picture data of an already-decoded VOP to output decoded picture data VOPout, and outputs a decoding error notification signal STerr when a stream error such as a syntax error or a semantics error is detected during the decoding process. The error notification unit 304 calculates the logical OR of the transmission error notification signal TRerr and the decoding error notification signal STerr, and outputs an error notification signal Nerr as an OR signal. The error notification signal Nerr indicates that at least one of a transmission error and a decoding error occurs or that none of these errors occurs.

The decoding unit 102 further includes a maximum time holder 306, and a second comparator 307. The maximum time holder 306 receives the VOP display time Tin from the second time extractor 301, and holds the VOP display time Tin of a most-recent VOP which has been normally decoded, as an already-decoded VOP maximum display time Tmax. The second comparator 307 compares the VOP display time Tin of a VOP to be decoded (coding target VOP) with the already-decoded VOP maximum display time Tmax stored in the maximum time holder 306, and outputs a control signal Cpre according to the result of comparison.

When decoding on the target VOP is completed normally, if the VOP display time Tin of the target VOP is later than the maximum time Tmax which is stored at this point of time, the maximum time holder 306 replaces the maximum time Tmax with the VOP display time Tin of the target VOP. The control signal Cpre outputted from the second comparator 307 is an already-decoded VOP notification signal for notifying whether the target VOP has already been coded or not (already-decoded VOP).

The decoding unit 102 further includes a first ON/OFF switch 305 disposed between the second time extractor 301 and the maximum time holder 306, and a second ON/OFF switch 308 disposed before the decoder 303. The first ON/OFF switch 305 controls supply of the VOP display time Tin from the second time extractor 301 to the maximum time holder 306 on the basis of the error notification signal Nerr. The second ON/OFF switch 308 controls supply of the video stream VOPstr to the decoder 303 on the basis of the error notification signal Nerr and the control signal Cpre.

The first ON/OFF switch 305 is in the OFF state when at least one of a transmission error and a decoding error occurs while it is in the ON state when none of these errors occurs. The second ON/OFF switch 308 is in the OFF state when at least one of a transmission error and a decoding error occurs or when the VOP display time Tin of the target VOP is equal to or earlier than the maximum time Tmax which is stored in the maximum time holder 306 (Tin≦Tmax). On the other hand, the second ON/OFF switch 308 is in the ON state when none of these errors occurs and the VOP display time Tin of the target VOP is later than the maximum time Tmax stored in the maximum time holder 306 (Tin>Tmax).

Next, the operation of the decoding unit 102 will be described in detail.

Figure 6:
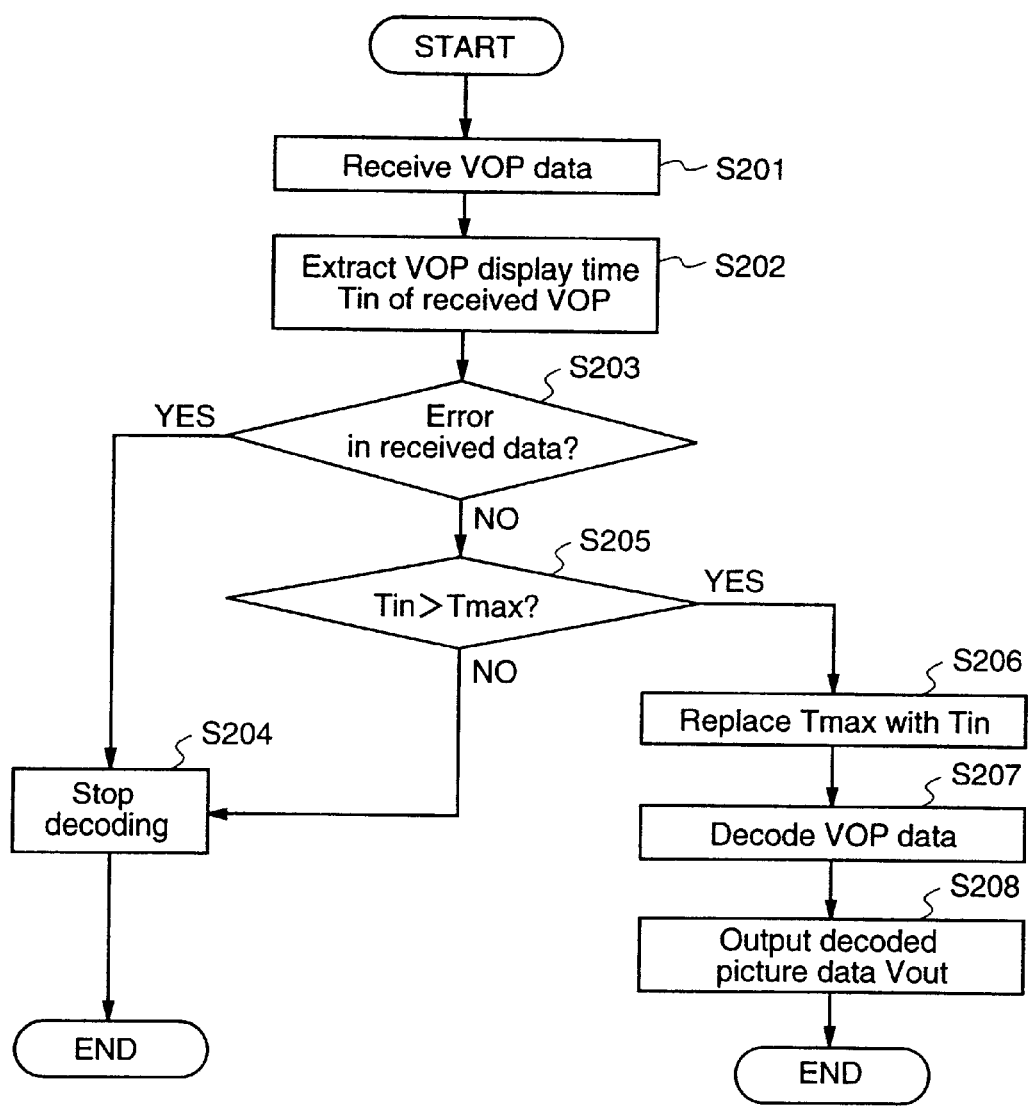
FIG. 6 is a flowchart illustrating the operation of the decoding unit 102.

FIG. 6 is a flowchart illustrating the operation of the decoding unit 102.

Initially, the decoding unit 102 receives, as a video stream VOPstr corresponding to one picture sequence, VOP data of a predetermined VOP as one of components of the picture sequence (step S201). Then, the second time extractor 301 extracts a VOP display time Tin of the received VOP data (VOP data of a target VOP to be decoded) (step S202).

Further, the error detector 302 checks whether there is loss of data due to transmission error or not on the basis of the received data (video stream), and the decoder 303 checks whether there is any stream error (decoding error) or not on the basis of the video stream VOPstr (step S203).

When an error is detected in step S203, the second ON/OFF switch 308 is turned off according to the error notification signal Nerr from the error notification unit 304 to which a transmission error notification signal TRerr and a decoding error notification signal STerr are input, and supply of the video stream VOPstr to the decoder 303 is stopped. Thereby, decoding on the video stream VOPstr in the decoder 301 is stopped. At this time, the first ON/OFF switch 305 is turned off according to the error notification signal Nerr from the error notification unit 304, whereby the VOP display time Tin of the target VOP is not supplied to the maximum time holder 306 (step 204).

On the other hand, when no error is detected in step S203, the first ON/OFF switch 305 is turned on according to the error notification signal Nerr, and the VOP display time Tin of the target VOP is compared with the maximum time Tmax stored in the maximum time holder 306, by the second comparator 307 (step S205). Based on the result of comparison, when the VOP display time Tin is equal to or earlier than the maximum time Tmax (Tin≦Tmax), the second ON/OFF switch 308 is turned off according to the control signal Cpre from the second comparator 307 indicating that the target VOP is an already-decoded VOP. At this time, supply of the video stream VOPstr to the decoder 303 is stopped, whereby decoding on the video stream VOPstr is stopped (step S204).

On the other hand, based on the result of comparison in step S205, when the VOP display time Tin is later than the maximum time Tmax (Tin>Tmax), the maximum time Tmax is replaced with the VOP display time Tin of the target VOP in the maximum time holder 306 (step S206). Further, the second switch 308 is turned on according to the control signal from the second comparator 307 indicating that the target VOP is not an already-decoded VOP. Then, in the decoder 303, the target VOP is decoded with reference to the reference picture data VOPref as required (step S207). Thereby, decoded picture data VOPout corresponding to the target VOP is output from the decoder 303 (step S208).

Next, the effect of this first embodiment will be described.

The rearrangement unit 101 as one of components of the video decoding apparatus 100 according to the first embodiment is provided with the buffer memory 206 for storing inputted VOP data, and the comparator 204 for comparing the VOP display time Tin of the inputted VOP data with the VOP display time Td' of VOP data which has most recently been output from the puffer memory 206 to the decoding unit 102. When VOP data of a VOP for which an earlier VOP display time is set (previous VOP) is received after VOP data of a VOP for which a later VOP display time is set (subsequent VOP), VOP data of VOPS from the previous VOP to a VOP to be displayed at this point of time (display target VOP) are output as a video stream VOPstr to the decoding unit 102. Therefore, when the VOP data of the previous VOP is input to the decoding 102 after the VOP data of the subsequent VOP, the decoding unit 102 can perform decoding on the VOP data of the previous VOP.

Further, the decoding unit 102 as one of components of the video decoding apparatus 100 according to the first embodiment is provided with the error detector 302 for detecting transmission errors, the decoder 303 for performing decoding on the video stream VOPstr and detecting stream errors such as syntax errors, and the comparator 307 for comparing the VOP display time Tin of the inputted VOP data with the VOP display time Tmax of the most-recently decoded VOP data. Having this construction, the decoding unit 102 stops decoding on VOP data affected by errors (error VOP data), or VOP data whose VOP display time is earlier than that of VOP data which has been most recently decoded (delayed VOP data) and, thereafter, when normal VOP data is inputted, the decoding unit 102 resumes decoding on the VOP data. Therefore, considerable degradation of picture quality is avoided, and the display picture is prevented from having continuous degradation of picture quality.

That is, as shown in FIG. 2, when VOP data of VOP2 is received after VOP data of VOP3, if the decoding unit 102 continues decoding on the defective video stream VOPstr (i.e., the video stream VOPstr3), since decoded picture data of the already-decoded VOP2 (display picture data VOPdsp2) cannot be referred to when performing decoding on the video stream VOPstr3, the quality of display picture of VOP3 is degraded. Further, in this case, even when decoding is resumed frog the VOP data of VOP2 (video stream VOPstr2) which has been received with a delay, since the reference picture data at the reception point is replaced with the decoded picture data of VOP3 (display picture data VOPdes3), decoding cannot be performed correctly.

So, the decoding unit 102 detects the video stream VOPstr3 which has the risk of causing propagation of degradation in picture quality due to absence of reference pictures at decoding, and stops decoding on the video stream VOPstr3. Thereafter, the decoding unit 102 outputs decoded picture VOPout corresponding to the VOP1 which has been normally decoded most recently, as display picture data VOPdsp1, from the video memory 103 to the display unit 105, until receiving VOP data which has no risk of bringing propagation of degradation in picture quality (in this case, video streams VOPstr2). Thereby, considerable degradation in picture quality and propagation of degradation in picture quality are avoided.

While this first embodiment of the invention relates to a video decoding apparatus adapted to MPEG4 which handles coded data of a moving picture constituted by plural objects (picture sequences), i.e., a video decoding apparatus having rearrangement units 101 and decoding units 102 for processing coded streams of plural objects constituting one moving picture, respectively. However, a video decoding apparatus adapted to MPEG2 or the like which handles coded data of a moving picture comprising one object (picture sequence), i.e., a video decoding apparatus having a rearrangement unit 101, a decoding unit 102, and a video memory 103 corresponding to one picture sequence, is also within the scope of the present invention.

Further, in this first embodiment, the order of VOPs, which is set at the transmitting end, is based on the VOP display times set for the respective VOPs. However, when the picture sequence includes not only P-VOPs which have been subjected to inter-VOP forward predictive coding but also B-VOPs which have been subjected to bi-directional predictive coding, the order of VOPs to be displayed is not equal to the order of VOPs to be decoded and, therefore, the VOP decoding order cannot be decided from the VOP display times. However, even when the picture sequence includes B-VOPs, the rearrangement unit 101 and the decoding unit 102 can perform in the same way as in the case where the picture sequence includes no B-VOP, by obtaining the time at which each VOP is to be decoded (VOP decoding time) from the VOP display time, and replaying the VOP display time with the VOP decoding time.

Further, while in this first embodiment the decoder 303 does not perform decoding on VOP data for which reference picture data is absent (picture data of an already-decoded VOP to be referred to for inter-VOP predictive decoding), the decoder 303 may perform decoding on VOP data for which reference picture data is absent.

Figure 7:
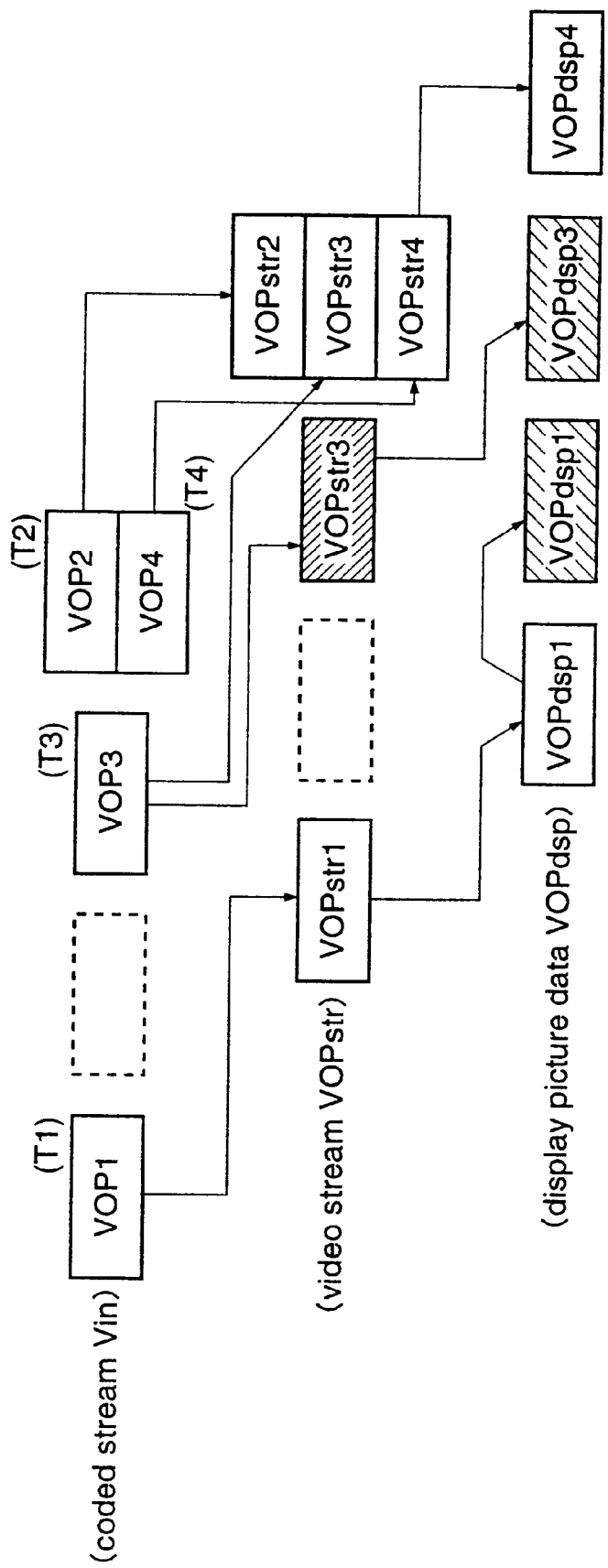
FIG. 7 is a diagram for explaining another example of processing on a coded stream in the video decoding apparatus 100 according to the first embodiment.

To be specific, FIG. 7 shows the case where VOP data of VOP2 (VOP display time T2) is received after VOP data of VOP3 (VOP display time T3). In this case, when the VOP data of VOP3 is output as a video stream VOPstr3 to the decoding unit 102, the video stream VOPstr3 is decoded by the decoder 303, and decoded picture data VOPout of VOP3 is stored in the video memory 103. Then, the decoded picture data VOPout of VOP3 is read as display picture data VOPdsp3 from the video memory 103 to the video compositor unit 104, whereby a decoded picture of VOP3 is displayed.

In the video decoding apparatus so constructed, when the video stream VOPstr3 is an inter VOP, the reference picture data stored in the video memory 103 is replaced with the decoded picture data VOPout of VOP3, and degradation in picture quality of the decoded picture of VOP3 is undesirably propagated through decoded pictures of subsequent VOPs. However, when the coded stream Vin inputted to the video decoding apparatus is composed of only VOP data of intra VOPs, a normal decided picture can be displayed before the VOP data of delayed VOP2 is input.

Further, when the coded stream Vin inputted to the video decoding apparatus is composed of only VOP data of inter VOPS or when the picture sequence (object) is not one having a shape such as a foreground but one having no shape such as a background, it is better, for pleasant display to the viewer, to decode the VOP data of VOP3 inputted subsequently to the VOP data of VOP1 to display the decoded picture of VOP3 than to continuous display the decoded picture of normally decoded VOP1 until the VOP data of the delayed VOP2 is inputted.

Further, in the video decoding apparatus having the decoder 303 which can perform decoding also on VOP data of an inter VOP having no corresponding reference picture data, when VOP data of a delayed VOP is received by the decoder 303, VOP data of VOPs from the most-recently arrived intra VOP to the target VOP to be displayed at this point of time may be decoded. Thereby, degradation in picture quality of decoded picture of the inter VOP for which reference picture data is absent is prevented from propagating through decoded pictures of the subsequent VOPs.

Figure 8:
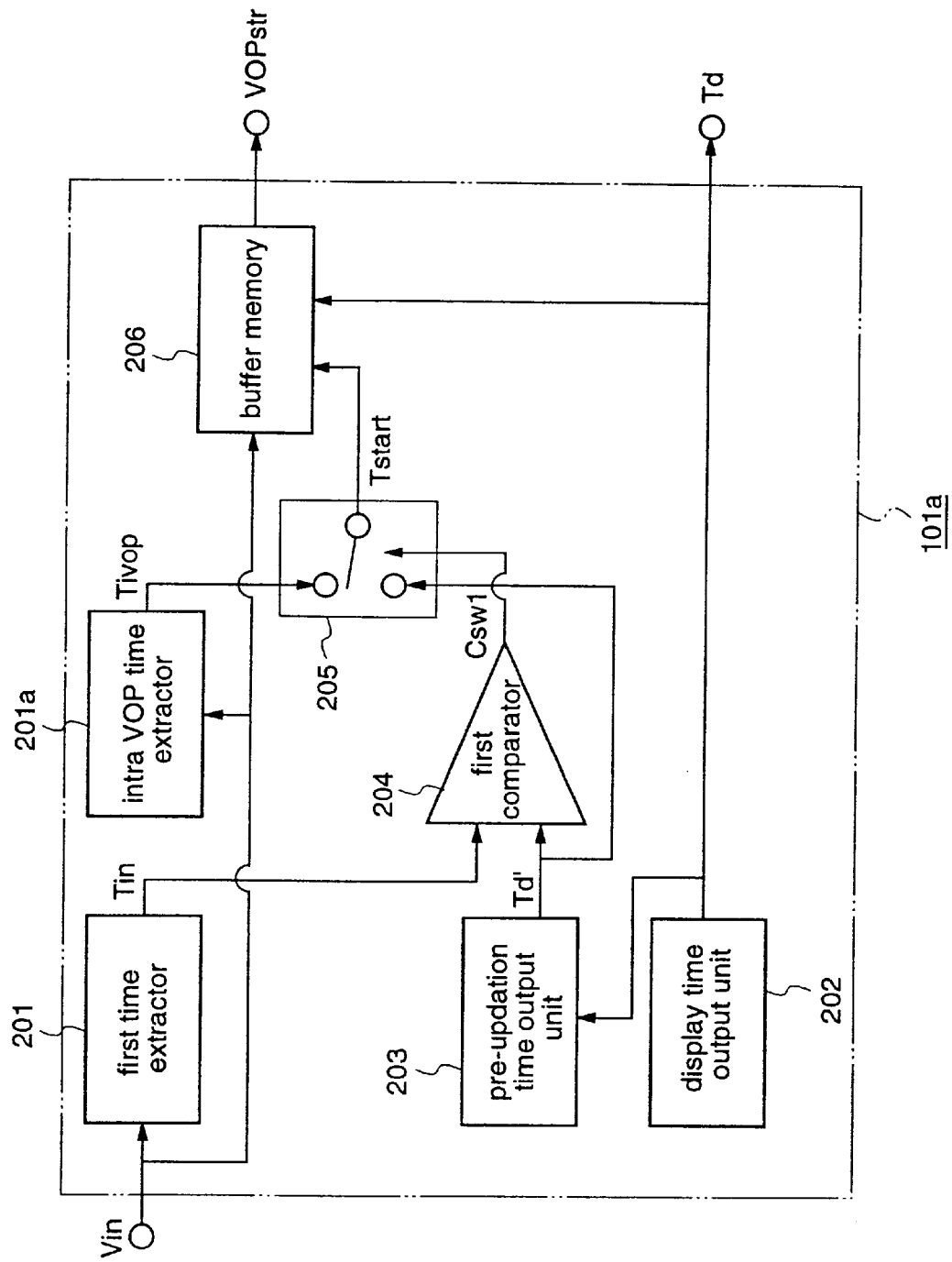
FIG. 8 is a block diagram for explaining another example of a rearrangement unit (101a) as a component of the video decoding apparatus 100 according to the first embodiment.

FIG. 8 is a block diagram for explaining a video decoding apparatus as described above.

This video decoding apparatus performs decoding also on VOP data of inter VOPs for which no reference picture data is present and, when VOP data of a delayed VOP arrives, it performs decoding on VOP data of all the VOPs from the most-recently arrived intra VOP to the target VOP to be displayed at this point of time.

To be specific, a rearrangement unit 101a as one of components of the video decoding apparatus includes, in addition to the construction of the rearrangement unit 101 of the first embodiment, an intra VOP time extractor 201a for extracting the VOP display times of intra VOPs on the basis of the coded stream Vin, and outputs the VOP display time Tivop of the most recent intra VOP, which is equal to or earlier than the VOP display time Tin of the received VOP (Tivop$\leq$Tin). Further, the selector switch 205 according to the first embodiment is altered such that it selects either the VOP display time Tivop of the most-recently inputted intra VOP or the specified display time Td from the display time output unit 202, on the basis of the control signal Csw1 from the first comparator 204.

That is, the selector switch 205 selects the VOP display time Tivop of the most-recently inputted intra VOP, which is equal to or earlier than the VOP display time Tin of the received VOP (Tivo$\leq$Tin), when the VOP display time Tin of the inputted VOP data is earlier than the pre-updation display time Td', and selects the pre-updation display time Td, when the VOP display time Tin is not earlier than the pre-updation display time Td'.

Other constituents of the rearrangement unit 101a are identical to those of the rearrangement unit 101 according to the first embodiment.

Hereinafter, the operation of the video decoding apparatus shown in FIG. 8 will be described briefly.

Figure 9:
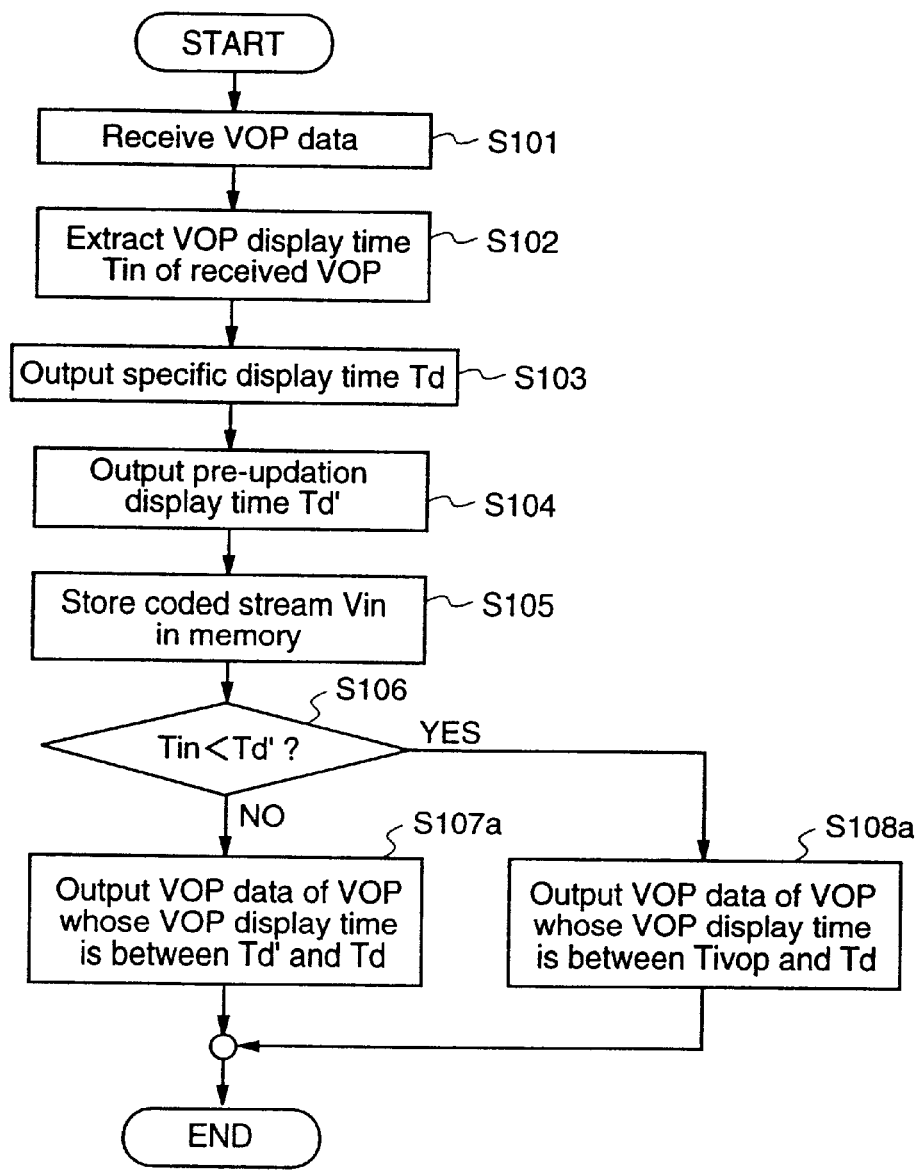

FIG. 9 is a flowchart for explaining the operation of the rearrangement unit 101a of the video decoding apparatus.

Steps S101 through S106 are identical to those described for the rearrangement unit 101 according to the first embodiment. When it is decided in step S106 that the VOP display time Tin of the inputted VOP data is earlier than the pre-updation display time Td', the selector switch 205 selects the VOP display time Tivop of the most-recently inputted intra VOP, and outputs the selected VOP display time Tivop as a decoding restart time Tstart to the memory 206 (step S108a). At this time, the memory 206 outputs VOP data of VOPs from the most-recently inputted intra VOP to the VOP to be displayed at this point of time, as a video stream VOPstr, to the decoding unit.

On the other hand, when it is decided in step S106 that the VOP display time Tin is not earlier than the pre-updation display time Td', the selector switch 205 selects the pre-updation display time Td', and outputs the selected pre-updation display time Td' as decoding restart time Tstart to the memory 206 (step S107a). At this time, the memory 206 outputs VOP data of VOPs from a VOP whose VOP display time is later than the pre-updation display time Td' (i.e., a VOP which is next to the VOP whose VOP data has already been output to the decoding unit) to the VOP to be displayed at this point of time, as a video stream VOPstr, to the decoding unit.

Embodiment 2

Figure 10:
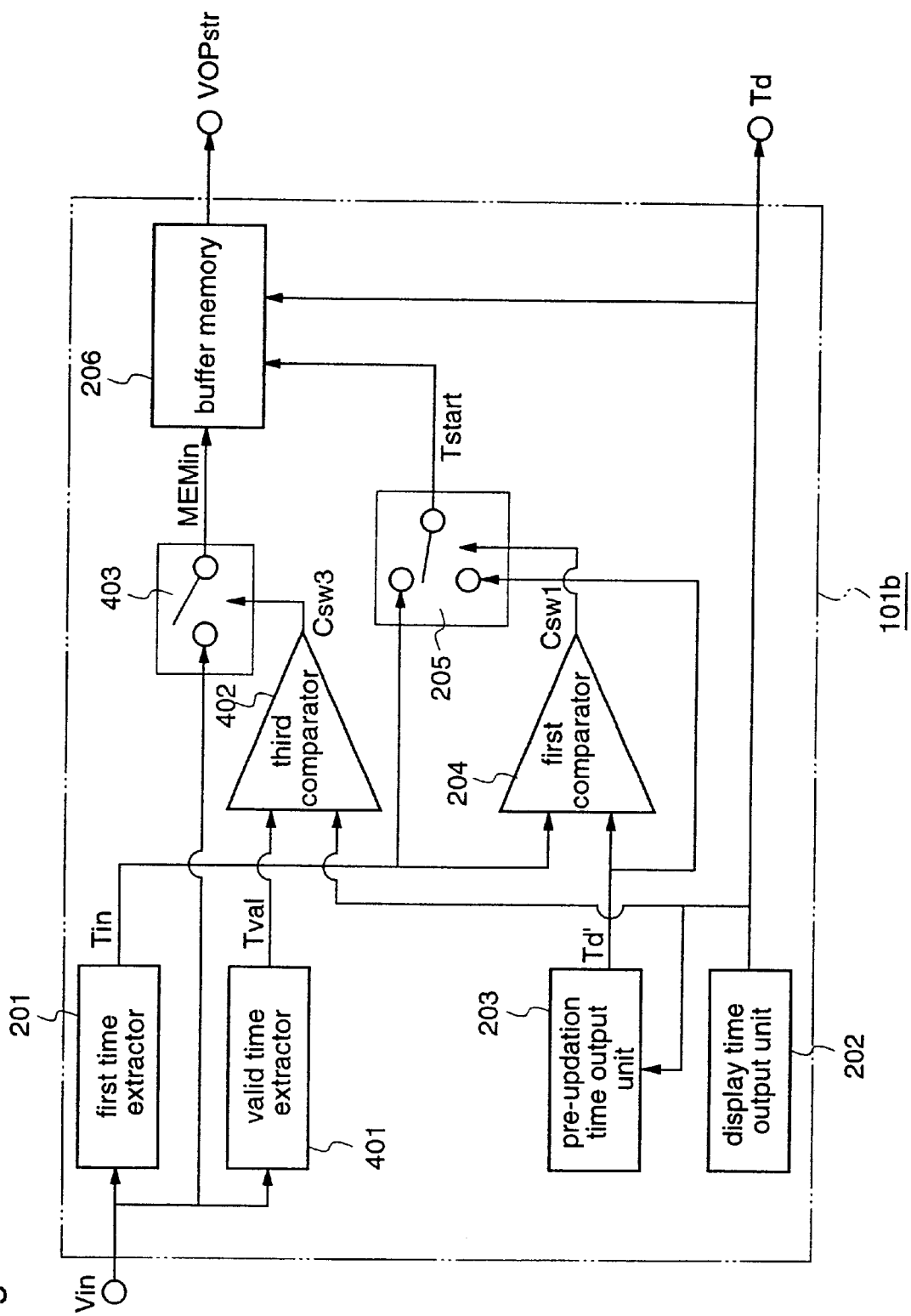
FIG. 10 is a block diagram for explaining a video decoding apparatus according to a second embodiment of the present invention, illustrating a rearrangement unit 101b as a component of the video decoding apparatus.

FIG. 10 is a block diagram for explaining a video decoding apparatus according to a second embodiment of the present invention, illustrating a rearrangement unit as one of components of the video decoding apparatus.

As described above, one moving picture (video corresponding to a movie or a program) is composed of plural picture sequences (objects) and, therefore, the video decoding apparatus is provided with rearrangement units as many as, at least, the maximum number of picture sequences (objects) to be displayed simultaneously when playing one moving picture. However, since the processes performed by these rearrangement units are identical, in this second embodiment one of these rearrangement units (rearrangement unit 101b) will be described for the sake of simplicity.

The rearrangement unit 101b of this second embodiment includes, like the rearrangement unit 101 of the first embodiment, a first time extractor 201, a display time output unit 202, a pre-updation time output unit 203, a first comparator 204, a selector switch 205, and a buffer memory 206. The rearrangement unit 101b further includes a valid time extractor 401, a third comparator 402, and an ON/OFF switch 403. The effective time extractor 401 extracts a valid time Tval of each object on the basis of scene description information included in a coded stream Vin inputted to the video decoding apparatus. The third comparator 402 compares the specified display time Td from the display time output unit 202 with the valid time Tval of the corresponding object. The ON/OFF switch 403 is disposed just before the buffer memory 206, and controls supply of the inputted coded stream to the buffer memory 206 on the basis of a control signal Csw3 according to the result of comparison in the third comparator 402.

The scene description information includes information indicating arrangement of objects in each scone of the moving picture, information indicating objects which appear in each scene, and the like. A timing at which each object included in the moving picture appears on the display area when playing the moving picture can be obtained from this scene description information. The above-mentioned valid time Tval is the latest VOP display time corresponding to a picture sequence (object) whose coded stream has already been input to the rearrangement unit. Further, according to the control signal Csw3 from the third comparator 302, the ON/OFF switch 403 is turned on when the specified display time Td is equal to or earlier than the valid time Tval, and turned off when specified display time Td is later than the valid time Tval. That is, the received VOP data is output as memory input data MEMin to the buffer memory 206 through the ON/OFF switch 403 when the specific display time Td at its reception time is equal to or earlier than the VOP display time (valid time) Tval of the last VOP in the picture sequence. On the other hand, the received VOP data is discarded at the ON/OFF switch 403 when the specific display time Td at its reception time is later than the VOP display time (valid time) Tval of the last VOP in the picture sequence. In this case, the received VOP data is not output as memory input data MEMin to the buffer memory 206.

In FIG. 10, the same reference numerals as those shown in FIG. 3 designate the same or corresponding parts.

Next, the operation will be described.

The operation of the video decoding apparatus according to the second embodiment is identical to that described for the first embodiment except the operation of the rearrangement unit 101b and, therefore, the operation of the rearrangement unit 101b will be mainly described hereinafter.

Figure 11:
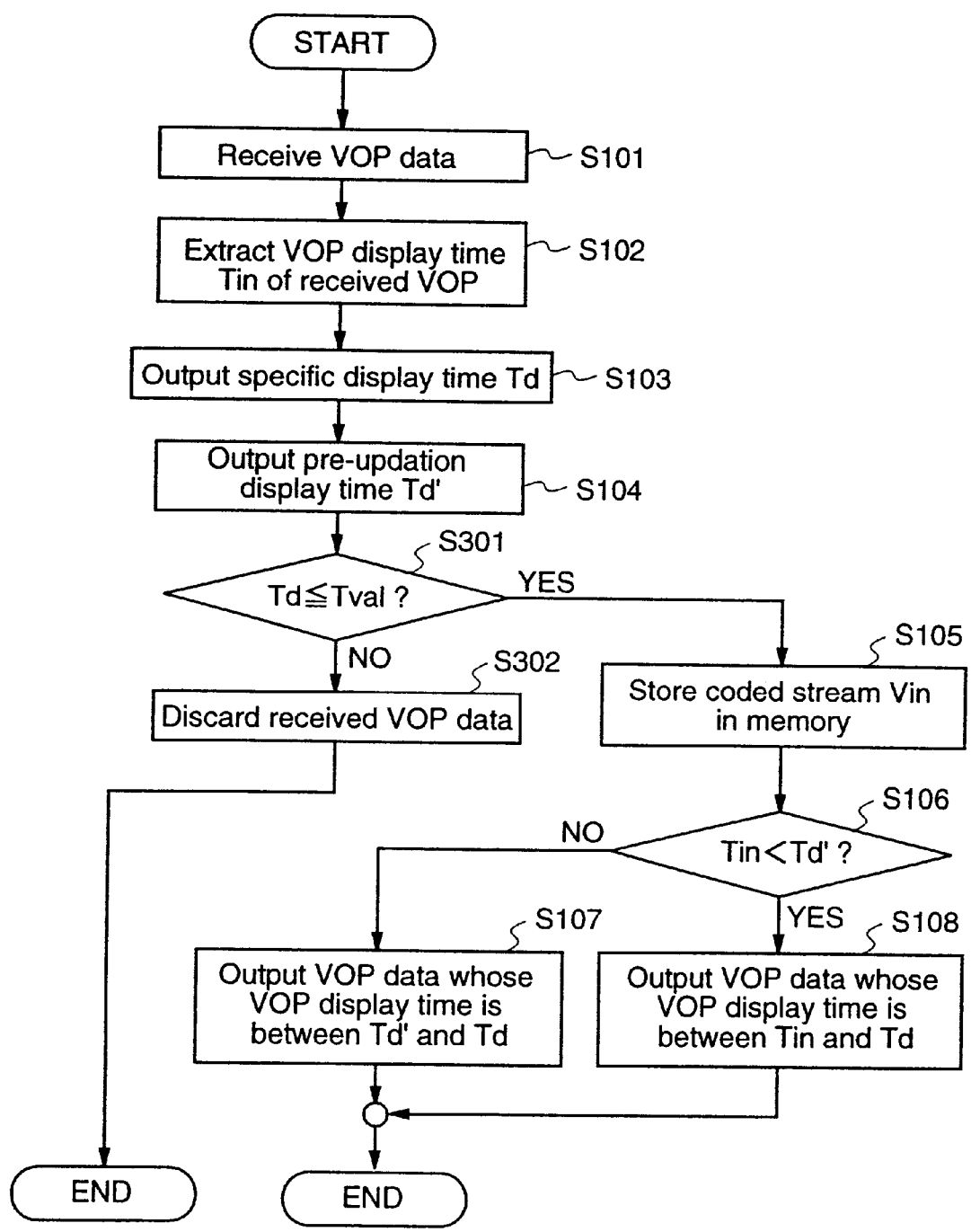
FIG. 11 is a flowchart illustrating the operation of the rearrangement unit 101b.

FIG. 11 is a flowchart for explaining the operation of the rearrangement unit 101b.

Initially, a coded stream Vin corresponding to one picture sequence (object) is received by the rearrangement unit 101b (step S101), and the VOP display time Tin of VOP data received as the coded stream Vin (VOP display time of the received VOP) is extracted by the first time extractor 201 (step S102).

In the display time output unit 202, the specified display time Td indicating the VOP display timing at the video decoding apparatus end is updated and outputted on the basis of reference time information included in the coded stream Vin (step S103). In the pre-updation time extractor 202, the display time Td' before updation of the specified display time Td is output according to updation of the specified display time Td (step S104).

Next, in the third comparator 402, the specified display time Td from the display time output unit 202 is compared with the valid time Tval outputted from the valid time extractor 401 (step S301). Based on the result of comparison, when the specified display time Td is later than the valid time Tval, the ON/OFF switch 403 is turned off according to the control signal Csw3 from the third comparator, and the VOP data of the received VOP is discarded (step S302). On the other hand, when the specified display time Td is equal to or earlier than the valid time Tval, the ON/OFF switch 403 is turned on according to the control signal Csw3 from the third comparator 402, and the received VOP data is recorded as memory input data MEMin in the buffer memory 209 (step S105).

Thereafter, like the rearrangement unit 101 of the first embodiment, the VOP display time Tin is compared with the pre-updation display time Td' by the first comparator 204 (step S106), and VOP data according to the result of comparison is output from the buffer memory 206 (steps S107 and S108). To be specific, when the VOP display time Tin of the received VOP is earlier than the pre-updation display time Td' (Tin<Td'), VOP data of VOPs whose VOP display times are between the VOP display time Tin of the received VOP and the specified display time Td are output from the buffer memory 206 (step S108). On the other hand, when the VOP display time Tin is equal to or later than the pre-updation display time Td' (Tin≧Td'), VOP data of VOPs whose VOP display times are between the pre-updation display time Td' and the specified display time Td are output from the buffer memory 206. That is, in this case (Tin≧Td'), VOP data whose VOP display time is earlier than the specified display time Td, which is stored in the buffer memory 206 and is not yet output to the decoding unit 102, is output as a video stream VOPstr (step S106).

Hereinafter, the operation and effect If the rearrangement unit corresponding to each object will be described.

In the video decoding apparatus, rearrangement and decoding for VOP data of objects to be displayed simultaneously are performed in rearrangement units and decoding units corresponding to the respective objects, respectively. However, the number of objects to be displayed simultaneously varies from scene to scene of the moving picture.

To be specific, even when six picture sequences (i.e., objects A to F) are included in one moving picture, all of these objects are not continuously displayed from the first scene to the last scene when one moving picture is played. For example, as shown in FIG. 12(a), when three objects A, B, C are displayed as a composite picture from time t0 to time t1, three objects A, E, F from t1 to t2, and two objects A and D from t2 to t3, the maximum number of picture sequences objects) displayed simultaneously is three.

A video decoding apparatus for decoding coded streams of such moving picture requires at least three rearrangement units (first to third rearrangement units). That is, during a period from t0 to t1, coded streams of three objects A, B, C are subjected to rearrangement by the first to third rearrangement units. During a period from t1 to t2, coded streams of three objects A, E, F are subjected to rearrangement by the first to third rearrangement units. Further, during period from t2 to t3, coded streams of two objects A and D are subjected to rearrangement by the first and second rearrangement units. FIG. 12(b) shows the objects (A~F) corresponding to the coded streams to be processed by the first to third rearrangement units (decoding units) during the respective periods described above.

Figure 12:
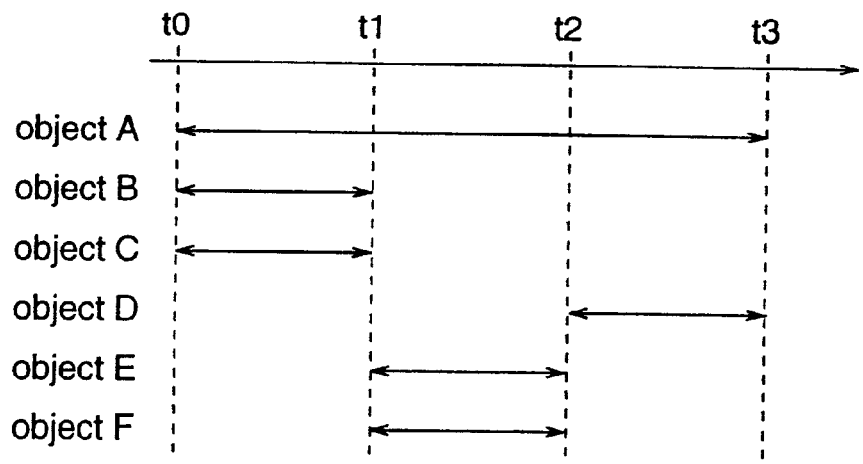
Figure 12:
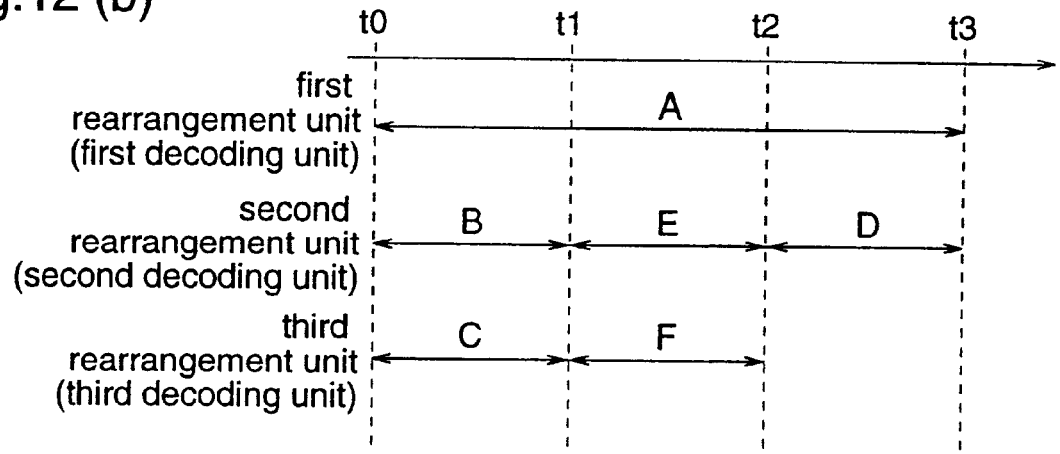

With reference to FIG. 12(b), in the first rearrangement unit, the coded stream of object A is subjected to rearrangement from the start of video playback (time to) to the end of playback (time t3). In the second rearrangement unit, the coded stream of object B is subjected to rearrangement from time t0 to time t1, the coded stream of object E is subjected to rearrangement from t1 to t2, and the coded stream of object D is subjected to rearrangement from t2 to t3. In the third rearrangement unit, the coded stream of object C is subjected to rearrangement from t0 to t1, the coded stream of object F is subjected to rearrangement from t1 to t2, and no coded stream is subjected to rearrangement from t2 to t3.

Since a video decoding apparatus, in which the maximum number of picture sequences (objects) to be displayed simultaneously is set at three, is provided with only three sets of rearrangement units, decoding units, and video memories, there is no allowance in the number of objects to be processed during the period from t0 to t1 (or from t1 to t2) for rearrangement and decoding on coded streams of three objects.

However, when VOP data of a VOP for which an earlier VOP display time is set (previous VOP) is input to the video decoding apparatus after VOP data of a VOP for which a later VOP display time is set (subsequent VOP), VOP data of VOPs from the previous VOP to the target VOP to be displayed at this point of time are output as a video stream VOPstr from the buffer memory 206 to the decoding unit.

In this case, there is a possibility that the number of picture sequences to be decoded simultaneously may exceed the maximum number of picture sequences which is set in the video decoding apparatus. To be specific, if delayed VOP data of object B (VOP data of delayed VOP) is input to the second rearrangement unit during the period from t1 to t2 in which VOP data of object E is input to the second rearrangement unit, this second rearrangement unit outputs VOP data of VOPs from the delayed VOP to the last VOP of object B, to the second decoding unit.

In this case, there arises no problem in a video decoding apparatus having an allowance in the number of simultaneously decodable picture sequences. However, in a video decoding apparatus having no allowance in the maximum number of picture sequences, the number of picture sequences to be decoded simultaneously may exceed the maximum number of picture sequences. To be specific, in the video decoding apparatus in which the maximum number of picture sequences decodable simultaneously is set at three, since the first, second, and third decoding units perform decoding on the objects A, E, and F during the period from t1 to t2, the number of picture sequences to be decoded simultaneously becomes four, that is, it exceeds the maximum number of picture sequences (three), when the VOP data of object B is output from the second rearrangement unit to the second decoding unit.

To solve the above-mentioned problem, in the rearrangement unit 101b of this second embodiment, the VOP display time (valid time) Tval of the last VOP in each picture sequence (object) is extracted on the basis of the scene description information included in the inputted coded stream, and VOP data inputted to the rearrangement unit 101b is discarded if the specified display time Td at the time when the VOP data of the picture sequence corresponding to this rearrangement unit 101b is later than the valid time Tval of the corresponding picture sequence.

As described above, in the rearrangement unit 101b of this second embodiment, as in the rearrangement unit 101 of the first embodiment, when VOP data of a previous VOP is received after VOP data of a subsequent VOP, VOP data of VOPs from the previous VOP to a VOP to be displayed at this point of time are output as a video stream VOPstr to the decoding unit 1021 Therefore, when the VOP data of the previous VOP is input to the decoding 102 after the VOP data of the subsequent VOP, the decoding unit 102 can resume decoding on the VOP data of the previous VOP.

Further, the rearrangement unit 101b is provided with the valid time extractor 401 for extracting, as a valid time Tval, the VOP display time of the last VOP of an object on the basis of the scene description information included in the coded stream Vin, and the third comparator 402 for comparing the specified display time Td at the time when VOP data is received with the valid time Tval of the object corresponding to the VOP data. When the specified display time Td at the reception of the VOP data exceeds the valid time Tval, the rearrangement unit 101b discards the VOP data of the received VOP. Therefore, VOP data of a VOP for which decoding is no longer needed is prevented from being input to the buffer memory 206.

The rearrangement unit 101b so constructed enables the video decoding apparatus to perform decoding considering the number of simultaneously decodable picture sequences. That is, even when the video decoding apparatus has no allowance in the maximum number of picture sequences (number of simultaneously decodable picture sequences), the rearrangement unit 101b prevents the number of picture sequences to be decoded simultaneously from exceeding the maximum number of picture sequences. Further, since VOP data of a VOP for which decoding it no longer needed is not output to the buffer memory 206, the recording area of the buffer memory 206 is effectively used.

In this second embodiment, the VOP data of the received VOP is unconditionally discarded when the specified display time Td generated at a predetermined timing on the video decoding apparatus side is later than the valid time Tval (the latest VOP display time of an object corresponding to the received VOP). However, even when the specified display time Td is later than the valid time Tval, the VOP data of the received VOP may be output to the buffer memory 206 so long as there is an allowance in the number of picture sequences to be decoded simultaneously in the video decoding apparatus.

For example, with reference to FIG. 12(b), since the number of picture sequences to be decoded simultaneously (two) is less than the maximum number of picture sequences of the video decoding apparatus (three) in the period from t2 to t3, when the delayed VOP data of object E is input to the second rearrangement unit, the second rearrangement unit may output the VOP data from the delayed VOP to the target VOP to be displayed at this point of time, to the third decoding unit which does not perform decoding at this point of time. In this case, the second decoding unit corresponding to the second rearrangement unit can continue decoding on the VOP data of object D.

Embodiment 3

Figure 13:
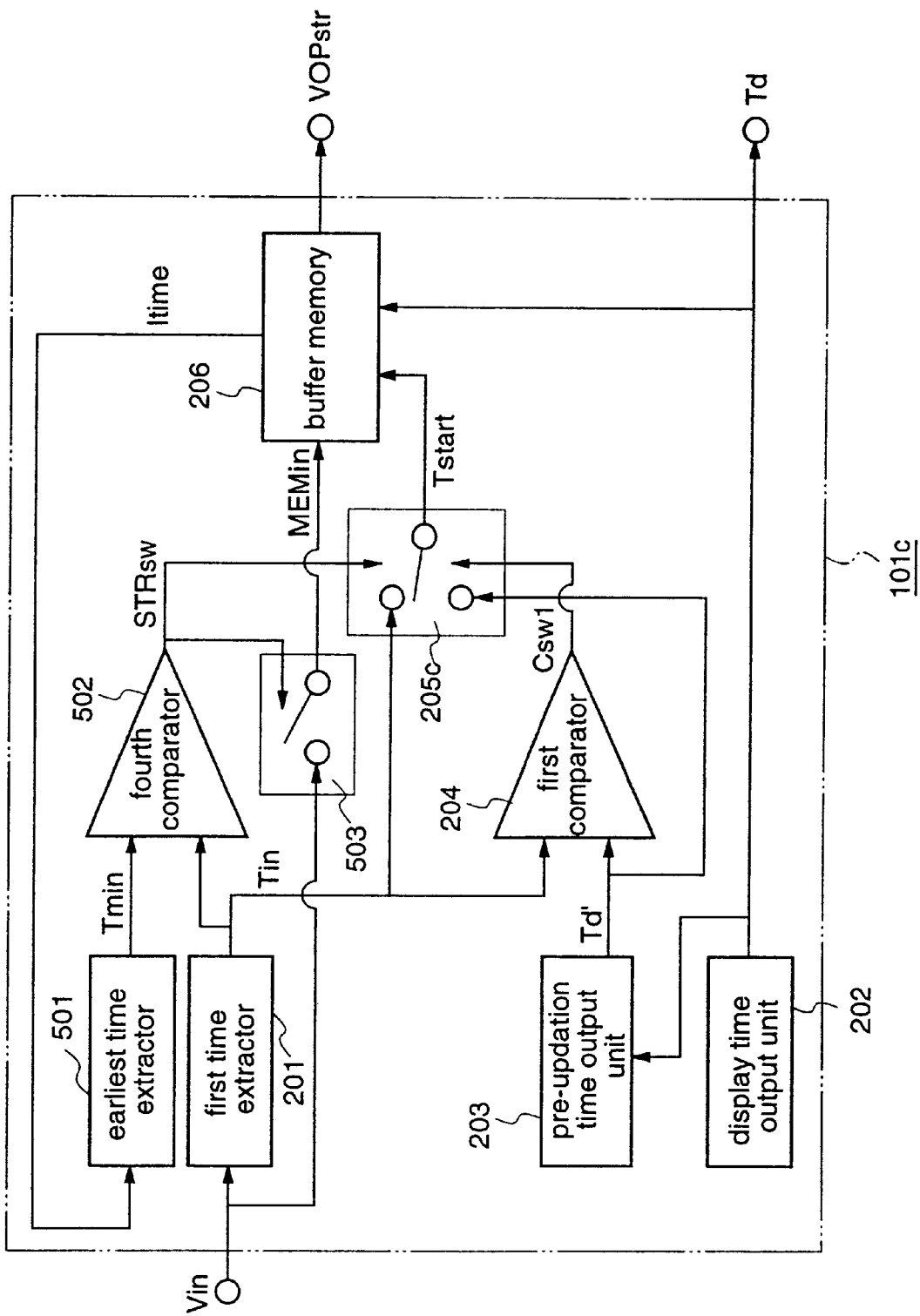
FIG. 13 is a block diagram for explaining a video decoding apparatus according to a third embodiment of the present invention, illustrating a rearrangement unit 101c as a component of the video decoding apparatus.

FIG. 13 is a block diagram for explaining a video decoding apparatus according to a third embodiment of the present invention, illustrating a rearrangement unit 101c as one of components of the video decoding apparatus.

The rearrangement unit 101c includes, like the rearrangement unit 101 of the first embodiment, a first time extractor 201, a display time output unit 202, a pre-updation time output unit 203, a first comparator 204, and a buffer memory 206. The rearrangement unit 101c further includes an earliest time extractor 501, a fourth comparator 502, and an ON/OFF switch 503. The earliest time extractor 501 extracts, as an earliest time Tmin, the VOP display time of a VOP which is oldest among the VOPs whose VOP data are recorded in the buffer memory 206. The fourth comparator 502 compares the VOP display time Tin of the received VOP outputted from the first time extractor 201 with the earliest time Tmin, and outputs a control signal STRsw according to the result of comparison. The ON/OFF switch 503 is placed just before the buffer memory 206, and controls supply of the inputted coded stream to the buffer memory 206, on the basis of the control signal STRsw. Further, the rearrangement unit 101c includes a selector switch 205c instead of the selector switch 205 of the rearrangement unit 101 according to the first embodiment. The selector switch 205c selects either the VOP display time Tin of the received VOP or the specified display time Td, on the basis of the control signal Csw1 from the first comparator 204 and the control signal STRsw from the fourth comparator 502, and outputs the selected time to the buffer memory 206.

According to the control signal STRsw from the fourth comparator 502, the ON/OFF switch 503 is in the OFF state when the VOP display time Tin of the received VOP is earlier than the earliest time Tmin while it is in the ON state when the VOP display time Tin of the received VOP is equal to or later than the earliest time Tmin. That is, the received VOP data is discarded by the ON/OFF switch when its VOP display time Tin is prior to the VOP display time (earliest time) Tmin of the oldest VOP among the VOPs whose VOP data are recorded in the buffer memory 206, whereby the received VOP data is not output to the buffer memory 206 as memory input data MEMin. On the other hand, the received VOP data is output as memory input data MEMin to the buffer memory 206 through the ON/OFF switch 503 when its VOP display time Tin is equal to or later than the earliest time Tmin.

Further, when the VOP display time Tin is earlier than the earliest time Tmin, the selector switch 205c selects the pre-updation display time Td' according to the control signal STRsw from the fourth comparator 502 regardless of the control signal Csw1 from the first comparator 204, and outputs the pre-updation display time Td, as a decoding restart time Tstart to the buffer memory 206. On the other hand, when the extracted VOP display time Tin is equal to or later than the earliest time Tmin, the selector switch 205c selects either the VOP display time Tin or the pre-updation display time Td, according to the control signal Csw1 from the first comparator 204, and outputs the selected time as a decoding restart time Tstart to the buffer memory 206. That is, in this case, the selector switch 205 selects the pre-updation display time Td' when the VOP display time Tin is equal to or later than the pre-updation display time Td', and selects the VOP display time Tin when the VOP display time Tin is earlier than the pre-updation display time Td'.

In FIG. 13, the same reference numerals as those shown in FIG. 3 denote the same or corresponding parts.

Next, the operation will be described.

The operation of the video decoding apparatus according to the third embodiment is identical to that described for the first embodiment except the operation of the rearrangement unit 101c and, therefore, the operation of the rearrangement unit 101c will be mainly described hereinafter.

Figure 14:
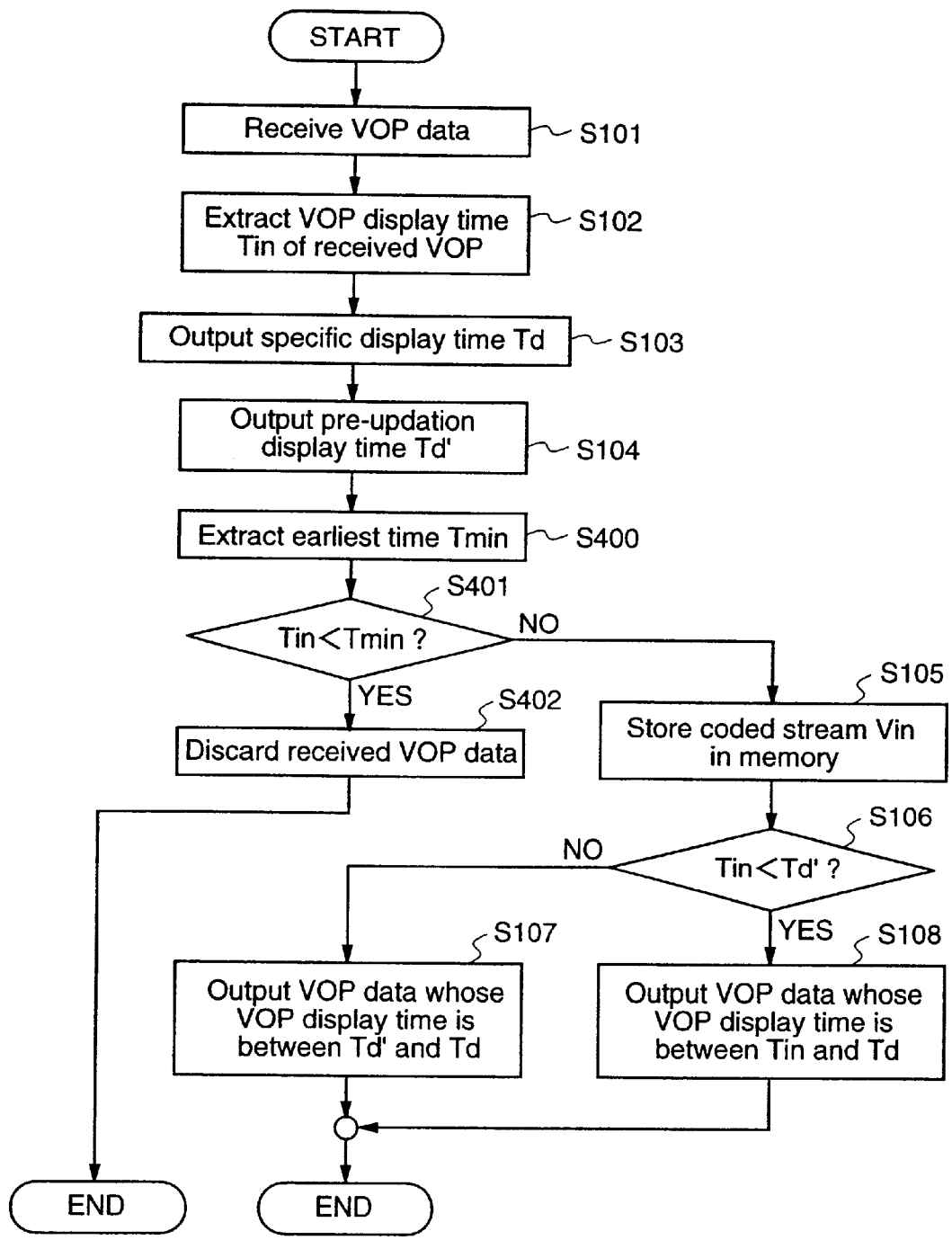
FIG. 14 is a flowchart illustrating the operation of the rearrangement unit 101c.

FIG. 14 is a flowchart for explaining the operation of the rearrangement unit 101c.

Initially, like the rearrangement unit 101 according to the first embodiment, VOP data inputted as a coded stream Vin is received (step S101), the VOP display time Tin of the received VOP is extracted (step S102), the specified display time Td is output (step S103), and the pre-updation display time Td' is output (step S104).

Thereafter, in the earliest time extractor 501, the VOP display time of the oldest VOP among the VOPs whose VOP data are recorded in the buffer memory 206 is extracted as an earliest time Tmin, on the basis of time information time from the buffer memory 206 (step S400).

Subsequently, in the fourth comparator 502, the VOP display time Tin outputted from the first time extractor 201 is compared with the earliest time Tmin outputted from the earliest time extractor 501 (step S401).

Based on the result of comparison, when the VOP display time Tin is earlier than the earliest time Tmin, the ON/OFF switch 503 is turned off according to the control signal STRsw from the fourth comparator 502, and the VOP data of the received VOP is discarded (step 5402). At this time, even when the control signal Csw1 from the first comparator 204 indicates that the VOP display time Tin is earlier than the pre-updation display time Td', the selector switch 205c selects the pre-updation display time Td' according to the control signal STRew from the fourth comparator 502.

On the other hand, when the VOP display time Tin is equal to or later than the earliest time Tmin, VOP data whose VOP display times are within a range from the VOP display time Tin of the received VOP to the specified display time Td, among the VOP data stored in the buffer memory 206, can be retransmitted to the decoding unit 102. Therefore, as in the first embodiment, process step S105~S108 are performed.

That is, the ON/OFF switch 503 is turned on according to the control signal STRsw from the fourth comparator 502, whereby the VOP data of the received VOP is supplied as memory input data MEMin to the buffer memory 206 to be recorded in the buffer memory 206 (step S105).

Thereafter, like the rearrangement unit 101 of the first embodiment, the VOP display time Tin is compared with the pre-updation display time Td, by the first comparator 204 (step S106), and VOP data according to the result of comparison is output from the buffer memory 206 (steps S107 and S108). To be specific, when the VOP display time Tin is earlier than the pre-updation display time Td' (Tin<Td'), VOP data of VOPs whose VOP display times are between the VOP display time Tin of the received VOP and the specified display time Td are output from the buffer memory 206 (step S108). On the other hand, when the VOP display time Tin is equal to or later than the pre-updation display time Td' (Tin≧Td'), VOP data of VOPs whose VOP display times are between the pre-updation display time Td' and the specified display time Td are output from the buffer memory 206 (step S106).

Next, the function and effect of the third embodiment will be described.

As described for the first embodiment, in the rearrangement unit 101 according to the first embodiment, when there is VOP data which cannot be output to the decoding unit 102 at the display time Td specified at the video decoding apparatus end (specified display time Td) due to transmission path delay, all of VOP data from the VOP whose VOP data is received with a delay to the target VOP to be displayed at this point of time are retransmitted to the decoding unit 102. Thereby, even when some VOP data is received with a delay, the decoding unit 102 performs decoding normally, and degradation of picture quality due to the delayed VOP is prevented from propagating through VOPs following the delayed VOP.

However, since the memory capacity of the buffer memory 206 is limited, VOP data which are temporarily stored in the buffer memory 206 are successively deleted in order as received by the buffer memory 206.

Accordingly, when the VOP display time Tin of the delayed VOP is earlier than the earliest time Tmin, tart of VOP data from the delayed VOP to the target VOP is already deleted from the buffer memory 206. Therefore, even when the VOP data from the delayed VOP to the target VOP, which are stored in the buffer memory 206, are retransmitted to the decoding unit 102, the decoding unit 102 cannot perform normal decoding on the respective VOPs from the delayed VOP to the target VOP. Moreover, reference picture data to be referred to when decoding inter VOPs is replaced with decoded picture data of a decoding error VOP which has not been decoded normally, when decoding a subsequent VOP in the decoding unit 102. As the result, retransmission of the VOP data from the delayed VOP to the target VOP from the rearrangement unit 101 to the decoding unit 102 will cause undesired propagation of degradation in picture quality.

In order to solve the above-mentioned problem, according to the third embodiment, even if the VOP display time Tin of the delayed VOP is earlier than the pre-updation display time Td', the VOP data from the delayed VOP to the target VOP are retransmitted from the rearrangement unit 101c to the decoding unit 102 as long as the VOP display time Tin is equal to or later than the earliest time Tmin, i.e., as long as the buffer memory 206 stores all of VOP data of VOPs whose VOP display times are within the range from the VOP display time Tin of the delayed VOP to the specified display time Td.

More specifically, the earliest time extractor 501 checks the VOP display time of each VOP whose VOP data is stored in the buffer memory 206, and outputs the earliest time Tmin to the four comparator 502. The fourth comparator 502 compared the VOP display time Tin of the received VOP with thy earliest time Tmin, and outputs a control signal STRsw according to the result of comparison to the ON/OFF switch 503 and to the selector switch 205c. When the VOP display time Tin is equal to or later than the earliest time Tmin, the switch 503 is turned on, whereby the VOP data of the received VOP is stored in the buffer memory 206. On the other hand, when the VOP display time Tin is earlier than the earliest time Tmin, the switch 503 is turned off, whereby the VOP data of the received VOP is discarded. Further, when the VOP display time Tin is earlier than the pre-updation display time Td', the selector switch 205c selects the VOP display time Tin as decoding restart time Tstart on the basis of the result from the first comparator 204. On the other hand, when the VOP display time Tin is equal to or later than the pre-updation display time Td', the switch 205c selects the pre-updation display time Td' as a decoding restart time Tstart. However, when the VOP display time Tin of the received VOP is earlier than the earliest time Tmin, the selector switch 205 selects the pre-updation display time Td' as a decoding restart time Tstart regardless of the result of comparison in the first comparator 204.

As described above, in the rearrangement unit 101c according to the third embodiment, when VOP data of a VOP for which an earlier VOP display time is set (previous VOP) is received after VOP data of a VOP for which a later VOP display time is set (subsequent VOP), VOP data of VOPs from the previous VOP to a target VOP to be displayed at this point of time are output as a video stream VOPstr to the decoding unit 102. Therefore, when the VOP data of the previous VOP is input to the decoding unit 102 after the VOP data of the subsequent VOP, the decoding unit 102 can resume decoding from the VOP data of the previous VOP. Further, the rearrangement unit 101c according to the third embodiment is provided with the earliest time extractor 501 which extracts the earliest time Tmin among the VOP display times of the VOPs whose VOP data are stored in the buffer memory 206, on the basis of the time information Itime. Only when the buffer memory 206 stores VOP data of all VOPs whose VOP display times are within the range from the VOP display time Tin of the delayed VOP to the specified display time Td, the VOP data from the delayed VOP to the display target VOP are retransmitted to the decoding unit 102. Therefore, when the delayed VOP is older than the oldest VOP whose VOP data is stored in the buffer memory 206, degradation of picture quality is prevented from propagating through following decoded pictures in the decoding process for the VOP data from the delayed VOP to the target VOP.

Embodiment 4

Figure 15:
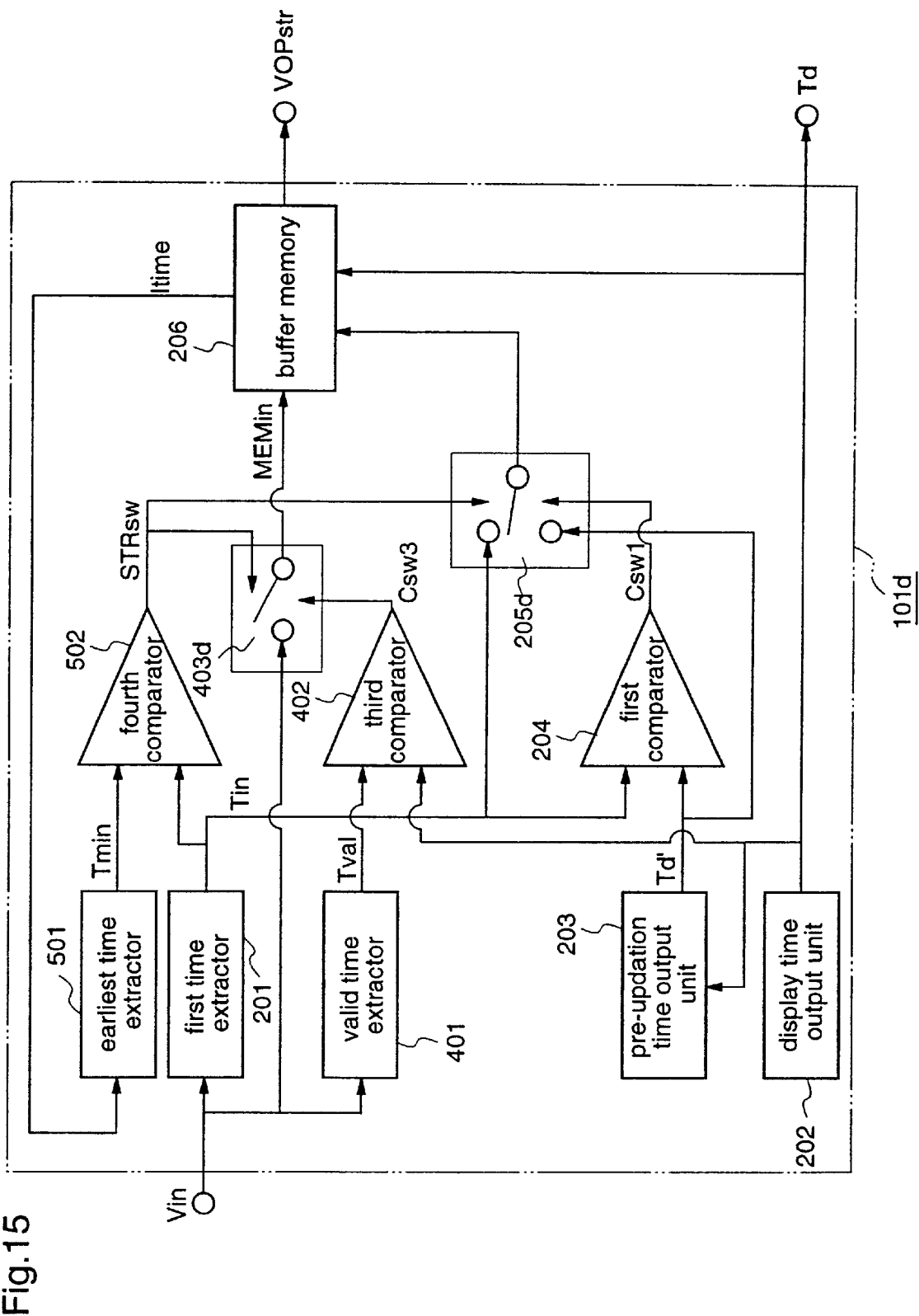
FIG. 15 is a block diagram for explaining a video decoding apparatus according to a fourth embodiment of the present invention, illustrating a rearrangement unit 101d as a component of the video decoding apparatus.

FIG. 15 is a block diagram for explaining a video decoding apparatus according to a fourth embodiment of the present invention, illustrating a rearrangement unit 101d as one of components of the video decoding apparatus.

The rearrangement unit 101d includes, like the rearrangement unit 101b of the second embodiment, a first time extractor 201, a valid time extractor 401, a display time output unit 202, a pre-updation time output unit 203, a first comparator 204, a third comparator 402, and a buffer memory 206. The rearrangement unit 101d further includes an earliest time extractor 501, and a fourth comparator 502. The earliest time extractor 501 extracts, as an earliest time Tmin, the VOP display time of a VOP which is oldest among the VOPs whose VOP data are recorded in the buffer memory 206. The fourth comparator 502 compares the VOP display time Tin of the received VOP outputted from the first time extractor 201 with the earliest time Tmin, and outputs a control signal STRsw according to the result of comparison.

The rearrangement unit 101d further includes an ON/OFF switch 403d instead of the ON/OFF switch 403 of the rearrangement unit 101b according to the second embodiment. The ON/OFF switch 403d controls supply of the inputted coded stream to the buffer memory 206, on the basis of the control signal Csw3 from the third comparator 402 and the control signal STRsw from the fourth comparator 502. Further, the rearrangement unit 101d includes a selector switch 205d instead of the selector switch 205 of the rearrangement unit 101b according to the second embodiment. The selector switch 205d selects either the VOP display time Tin of the received VOP or the specified display time Td from the display time output unit 202, on the basis of the control signal Csw1 from the first comparator 204 and the control signal STRsw from the fourth comparator, and outputs the selected time to the buffer memory 206.

The ON/OFF switch 403d is in the OFF state when the specified display time Td at the time when the VOP data is received is equal to or earlier than the valid time Tval (Td≦Tval) and the VOP display time Tin of the received VOP is equal to or later than the earliest time Tmin (Tin≧Tmin), while it is in the ON state when the specified display time Td at the time when the VOP data is received is later than the valid time Tval (Td>Tval) or the VOP display time Tin of the received VOP is earlier than the earliest time Tmin (Tin<Tmin).

To be specific, the received VOP data output as memory input data MEMin to the buffer memory 206 through the ON/OFF switch 403d when the specified display time Td at the reception time is equal to or earlier than the VOP display time (valid time) Tval of the last VOP in the picture sequence and the VOP display time Tin of the received VOP is equal to or later than the VOP display time (earliest time) Tmin of the oldest VOP among the VOPs whose VOP data are stored in the buffer memory 206. On the other hand, the received VOP data is discarded at the ON/OFF switch 403d when the specified display time Td at the reception time is later than the VOP display time (valid time) Tval of the last VOP in the picture sequence or when the VOP display time Tin of the received VOP is earlier than the VOP display time (earliest time) Tmin of the oldest VOP among the VOPs whose VOP data are stored in the buffer memory 206.

Further, when the VOP display time Tin is earlier than the earliest time Tmin, the selector switch 205d selects the pre-updation display time Td according to the control signal STRsw from the fourth comparator 502, regardless of the control signal Csw1 from the first comparator 204, whereby the pre-updation display time Td' is output as a decoding restart time Tstart to the buffer memory 206. On the other hand, when the extracted VOP display time Tin is equal to or later than the earliest time Tmin, the selector switch 205d selects either the VOP display time Tin or the pre-updation display time Td' according to the control signal Csw1 from the first comparator 204, and the selected time is output as a decoding restart time Tstart to the buffer memory 206. That is, in this case, the selector switch 205d selects the pre-updation display time Td' when the VOP display time Tin is equal to or later than the pre-updation display time Td', and selects the VOP display time Tin when the VOP display time Tin is earlier than the pre-updation display time Td'.

In FIG. 15, the same reference numerals as those shown in FIGS. 10 and 13 denote the same or corresponding parts.

Next, the operation will be described.

The operation of the video decoding apparatus according to the fourth embodiment is identical to that described for the second embodiment except the operation of the rearrangement unit 101d and, therefore, the operation of the rearrangement unit 101d will be mainly described hereinafter.

Figure 16:
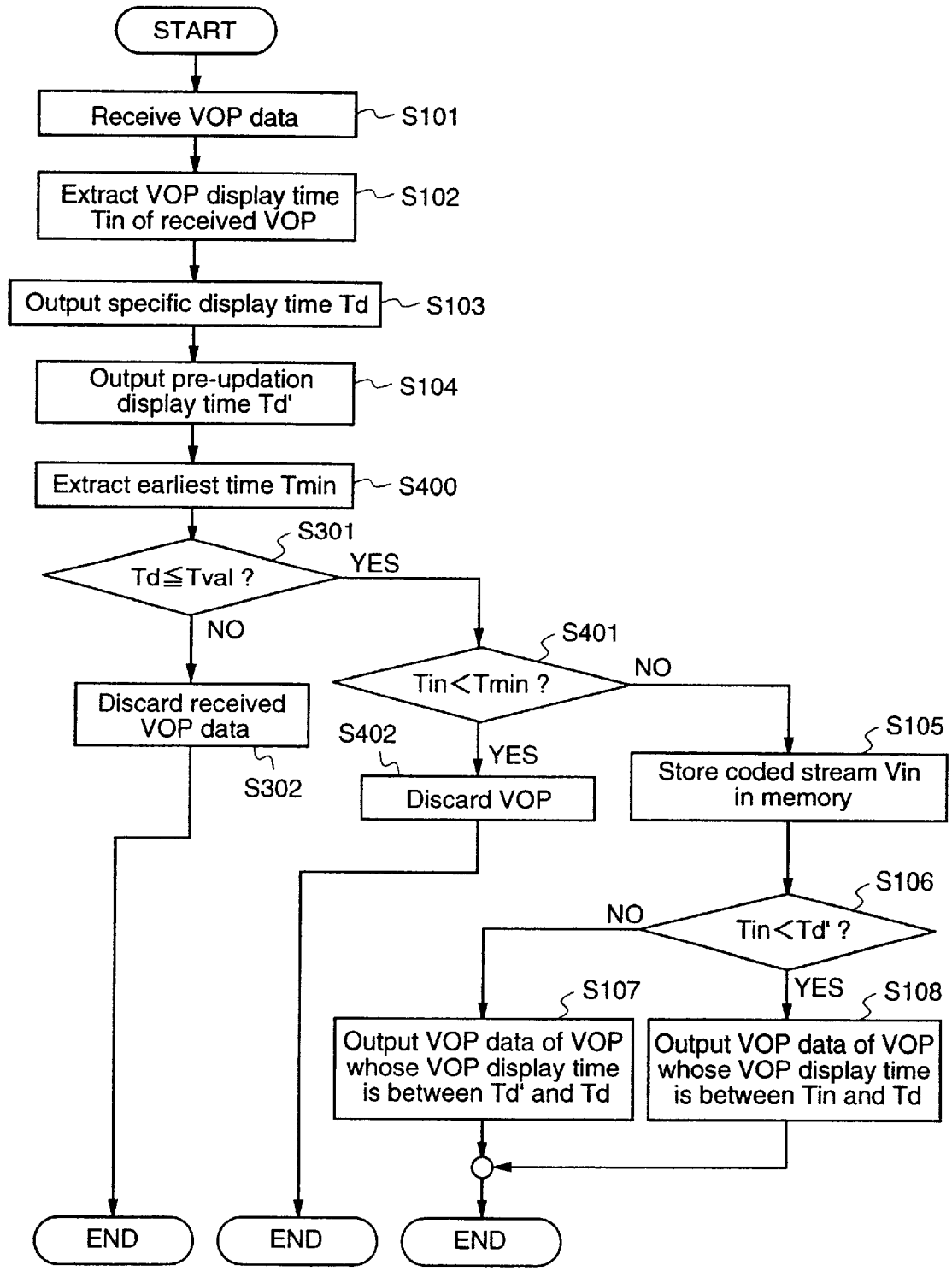
FIG. 16 is a flowchart illustrating the operation of the rearrangement unit 101d.

FIG. 16 is a flowchart for explaining the operation of the rearrangement unit 101d.

Initially, like the rearrangement unit 101b according to the second embodiment, VOP data inputted as a coded stream Vin is received (step S101), the VOP display time Tin of the received VOP is extracted (step S102), the specified display time Td is output (step S103), and the pre-updation display time Td' is output (step S104).

Thereafter, in the earliest time extractor 501, the VOP display time of the oldest VOP among the VOPs whose VOP data are stored in the buffer memory 206 is extracted as an earliest time Tmin, on the basis of time information Itime from the buffer memory 206 (step S400).

Next, in the third comparator, the specified display time Td outputted from the display time output unit 202 is compared with the valid time Tval outputted from the valid time extractor 401a (step S301). Based on the result of comparison, when the specified display time Td at the time when the VOP data is received is later than the valid time Tval (Td>Tval), the ON/OFF switch 403d is turned off according to the control signal Csw3 from the third comparator 402, and the received VOP data is discarded (step S302). On the other hand, when the specified display time Td is equal to or earlier than the valid time Tval (Td≦Tval), the VOP display time Tin outputted from the first extractor 201 is compared with the earliest time Tmin outputted from the earliest time extractor 501 by the fourth comparator 502 (step S401).

Based on the result of comparison, when the VOP display time Tin is earlier than the earliest time Tmin (Tin<Tmin), the ON/OFF switch 403d is turned off according to the control signal STRsw from the fourth comparator 502, and the VOP data of the received VOP is discarded (step S402). At this time, even when the control signal Csw1 from the first comparator 204 indicates that the VOP display time Tin is earlier than the pre-updation display time Td', the selector switch 205d selects the pre-updation display time Td' according to the control signal STRsw from the fourth comparator 403d.

On the other hand, when the VOP display time Tin is equal to or later than the earliest time Tmin (Tin≧Tmin), VOP data whose VOP display times are within the range from the VOP display time Tin of the received VOP to the specified display time Td, among the VOP data stored in the buffer memory 206, can be retransmitted to the decoding unit 102. Therefore, as in the second embodiment, process step S105~S108 are performed.

That is, the ON/OFF switch 403d is turned on according to the control signal STRsw from the fourth comparator 502, whereby the VOP data of the received VOP is supplied as memory input data MEMin to the buffer memory 206 to be stored therein (step S105).

Thereafter, like the rearrangement unit 101b of the second embodiment, the VOP display time Tin is compared with the pre-updation display time Td' by the first comparator 204 (step S106), and VOP data according to the result of comparison is output from the buffer memory 206 (steps S107 and S108). To be specific, when the VOP display time Tin is earlier than the pre-updation display time Td' (Tin<Td'), VOP data of VOPs whose VOP display times are between the VOP display time Tin of the received VOP and the specified display time Td are output from the buffer memory 206 (step 5108). On the other hand, when the VOP display time Tin is equal to or later than the pre-updation display time Td' (Tin≧Td'), VOP data of VOPs whose VOP display times are between the pre-updation display time Td' and the specified display time Td are output from the buffer memory 206 (step S106).

As described above, in the rearrangement unit 101d according to the fourth embodiment, when VOP data of a previous VOP is received after VOP data of a subsequent VOP, VOP data of VOPs from the previous VOP to the target VOP to be displayed at this point of time are output as a video stream VOPstr to the decoding unit 102. Therefore, when the VOP data of the previous VOP is input to the decoding unit 102 after the VOP data of the subsequent VOP, the decoding unit 102 can resume decoding from the VOP data of the previous VOP.

Further, the rearrangement unit 101d is provided with the valid time extractor 401 for extracting, as a valid time Tval, the VOP display time of the last VOP of an object on the basis of the scene description information included in the coded stream Vin, and the third comparator 402 for comparing the specified display time Td at the time when VOP data is received with the valid time Tval of the object corresponding to the VOP data, and the VOP data of the received VOP is discarded when the specified display time Td at the reception of the VOP data exceeds the valid time Tval. Therefore, VOP data of a VOP for which decoding is no longer needed is prevented from being input to the buffer memory 206. This rearrangement unit 101d enables the video decoding apparatus to perform decoding considering the number of picture sequences which are simultaneously decodable. Further, since VOP data of a VOP for which decoding is no longer needed is not output to the buffer memory 206, the recording area of the buffer memory can be effectively used.

Furthermore, the rearrangement unit 101d according to the fourth embodiment is provided with the earliest time extractor 501 for extracting the earliest time Tmin among the VOP display times of the VOPs whose VOP data are stored in the buffer memory 206, on the basis of the time information Itime from the buffer memory 206. Only when the buffer memory 206 stores VOP data of all VOPs whose VOP display times are within the range from the VOP display time Tin of the delayed VOP to the specified display time Td, the VOP data from the delayed VOP to the display target VOP are retransmitted to the decoding unit 102. Therefore, when the delayed VOP is older than the oldest VOP whose VOP data is stored in the buffer memory 206, degradation of picture quality is prevented from propagating through following decoded pictures in the decoding process for the VOP data from the delayed VOP to the target VOP.

Embodiment 5

Figure 17:
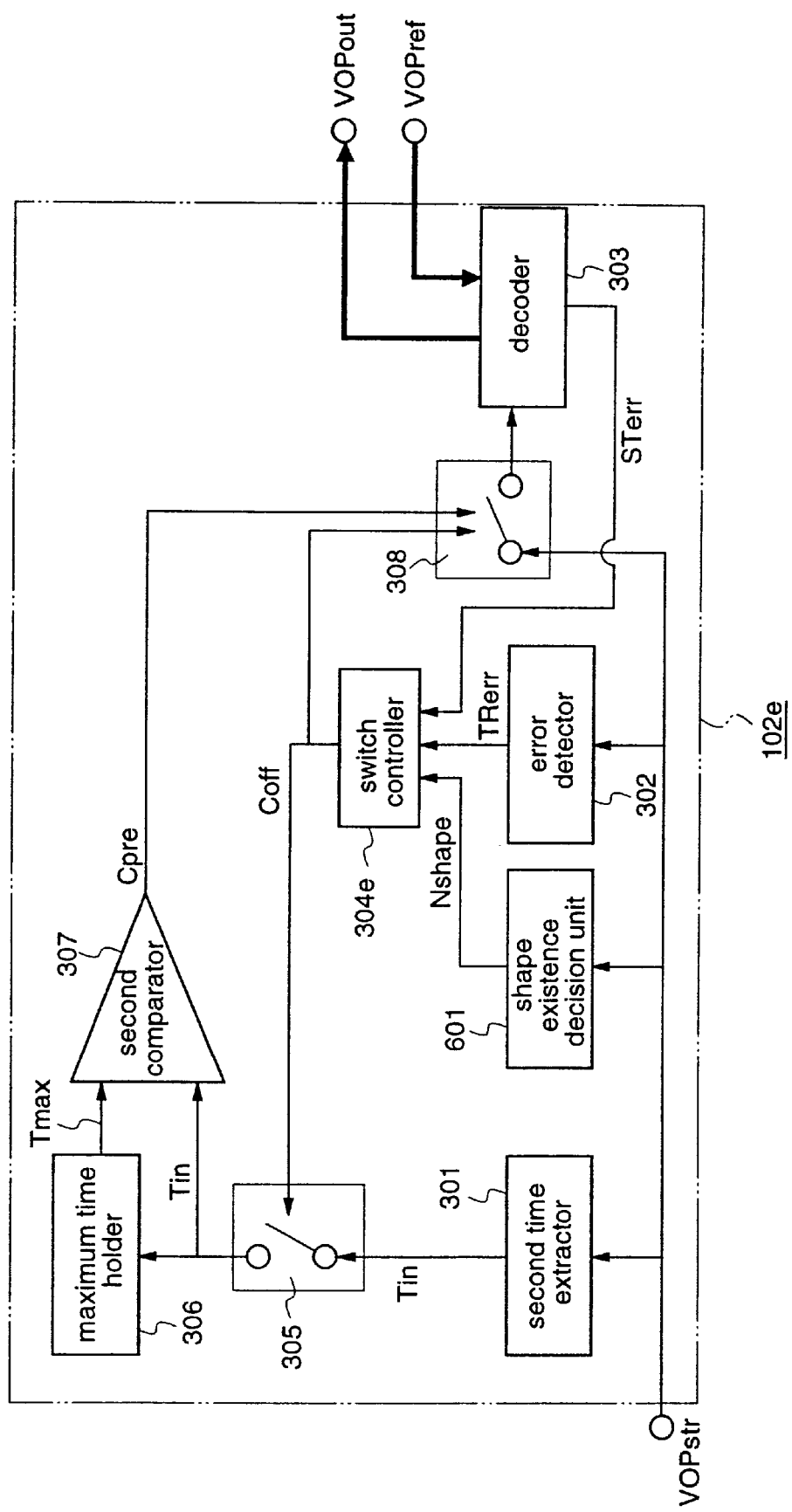
FIG. 17 is a block diagram for explaining a video decoding apparatus according to a fifth embodiment of the present invention, illustrating a decoding unit 102e as a component of the video decoding apparatus.

FIG. 17 is a block diagram for explaining a video decoding apparatus according to a fifth embodiment of the present invention, illustrating a decoding unit 102e as one of components of the video decoding apparatus.

The decoding unit 102e includes, like the decoding unit 102 of the first embodiment, a second time extractor 301, an error detector 302, a decoder 303, an ON/OFF switch 305, a maximum time holder 306, a second comparator 307, and an ON/OFF switch 308.

The decoding unit 102e further includes a shape existence decision unit 601 decides, on the basis of a video stream VOPstr outputted from the rearrangement unit (refer to FIG. 1), as to whether this video stream VOPstr includes shape information indicating a shape of an object, and outputs a shape notification signal Nshape indicating whether a picture sequence (object) corresponding to the video stream VOPstr has a shape or not.

Further, the decoding unit 102e includes a switch controller 304e instead of the error notification unit 304 of the decoding unit 102 according to the first embodiment. The switch controller 304e outputs a switch control signal Coff for turning off the ON/OFF switches 305 and 308, on the basis of a shape notification signal Nshape from the shape existence decision unit 601, a transmission error notification signal TRerr from the error detector 302, and a decoding error notification signal STerr from the decoder 303.

The switch controller 304e outputs a switch control signal Coff to turn off the ON/OFF switches 305 and 308 to these switches only when at least one of the transmission error notification signal TRerr and the decoding error notification signal STerr notifies that an error occurs, and the shape notification signal Nshape notifies that the picture sequence (object) corresponding to the video stream VOPstr has a shape. Accordingly, when no error is detected or when the picture sequence (object) corresponding to the video stream VOPstr has no shape, the ON/OFF switches 305 and 308 are not turned off by the switch control signal Coff. In this case, however, the ON/OFF switch 308 is controlled by a control signal Cpre from the second comparator 307.

In FIG. 17, the same reference numerals as those shown in FIG. 5 designate the same or corresponding parts.

Hereinafter, the operation will be described.

The operation of the video decoding apparatus according to this fifth embodiment is identical to that according to the first embodiment except the operation of the decoding unit 102e and, therefore, the operation of the decoding unit 102e will be mainly described hereinafter.

Figure 18:
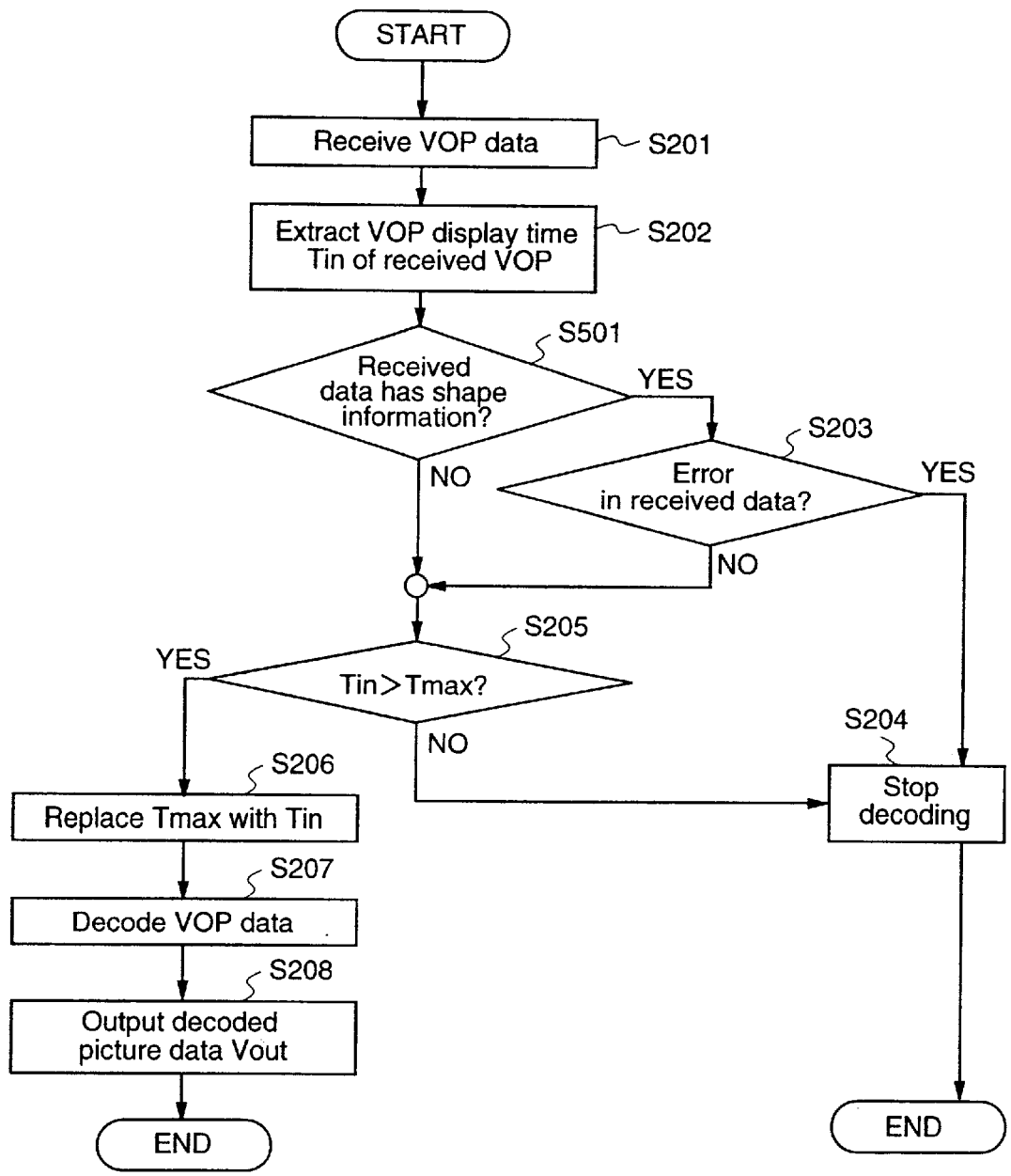
FIG. 18 is a flowchart illustrating the operation of the decoding unit 102e.

FIG. 18 is a flowchart for explaining the operation of the decoding unit 102e.

Initially, in the decoding unit 102e, as in the decoding unit 102 according to the first embodiment, VOP data of a predetermined VOP which is a component of a picture sequence is received by the decoding unit 102e as a video stream VOPstr corresponding to the picture sequence (step S201), and the VOP display time Tin of the received VOP data (VOP data of the target VOP to be decoded) is extracted in the second time extractor 301 (step S202).

Thereafter, in the decoding unit 102e, it is decided whether the picture sequence (object) has a shape or not by the shape extractor 601 (step S501). When the picture sequence has a shape, step S501 is followed by detection of a transmission error by the error detector 302 and detection of a stream error by the decoder 303 (step S203). On the other hand, when the picture sequence has no shape, error detection in step S203 is by-passed, and the VOP display time Tin of the target VOP is compared with the already-decoded VOP maximum display time Tmax stored in the maximum time holder 306 by the second comparator 307 (step S205).

When an error is detected in step S203, the second ON/OFF switch 308 is turned off according to a switch control signal Coff from the switch controller 304e to which a transmission error notification signal TRerr and a decoding error notification signal STerr are input, and supply of the video stream VOPstr to the decoder 303 is stopped. Thereby, the decoder 303 stops decoding on the video stream VOPstr. At this time, the first ON/OFF switch is also turned off according to the switch control signal Coff from the switch controller 304e, and the VOP display time Tin of the target VOP is not supplied to the maximum time holder 306 (step S204).

On the other hand, when no error is detected in step S203, the first ON/OFF switch 305 is turned on, and the VOP display time Tin of the target. VOP is compared with the maximum time Tmax stored in the maximum time holder 306 by the, second comparator 307 (step S205). Based on the result of comparison, when the VOP display time Tin is equal to or earlier than the maximum time Tmax (Tin≦Tmax), the second ON/OFF switch 308 is turned off according to the control signal Cpre from the second comparator 307 indicating that the target VOP is an already-decoded VOP. At this time, the decoder 303 stops decoding on the video stream VOPstr because supply of the video stream VOPstr to the decoder 303 is stopped (step S204).

On the other hand, when the VOP display time Tin is later than the maximum time Tmax (Tin>Tmax), the maximum time Tmax is replaced with the VOP display time Tin of the target VOP in the maximum time holder 306 (step S206). At this time, the second ON/OFF switch 308 is turned on according to the control signal Cpre from the second comparator 307 indicating that the target VOP is not an already-decoded VOP. Then, the decoder 303 performs decoding on the target VOP with reference to reference picture data VOPref as required (step S207). Thereby, decoded picture data VOPout corresponding to the target VOP is output from the decoder 303 (step S208).

Hereinafter, the function and effect of this fifth embodiment will be described.

When a picture sequence in which the shape of each picture (VOP) does not vary is coded, even if the picture quality is degraded in some frame due to loss of part of received data at the receiving end, the degradation in picture quality hardly affects on other frames. However, when a picture sequence having a shape is coded, since this coding process includes shape signal coding or pixel value coding depending on the shape of a picture which has already been subjected to local decoding, such degradation in picture quality propagates through other frames at the receiving end, resulting in considerable degradation in picture quality as a whole.

Generally, in a particular use for which real-time performance is required, a coding process for a picture sequence in which the shape of each picture does not vary (i.e., a picture sequence having no shape) is employed. On the other hand, in a use for which real-time performance is not required very much, a coding process for a picture sequence having a shape is employed. Accordingly, in a decoding process for a picture sequence which requires real-time performance and has no shape, even when the picture quality is degraded to some degree, decoding should be continued.

So, according to this fifth embodiment, when the inputted video stream VOPstr has shape information, it a transmission error or a stream error is detected, the ON/OFF switch 308 is turned off so as to stop decoding on the video stream VOPstr. On the other hand, when the inputted video stream VOPstr has no shape information, even if a transmission error or a stream error is detected, the ON/OFF switch 308 is maintained in the ON state so as to continue decoding on the video stream VOPstr.

As described above, the decoding unit 102e according to the fifth embodiment is provided with the shape existence decision unit 601 for deciding whether the inputted video stream VOPstr has shape information indicating the shape of an object, and stops decoding on the video stream VOPstr only when the video stream VOPstr has shape information and an error is detected in the video stream VOPstr. Therefore, a picture sequence having no shape signal, which is not very much affected by a transmission error or the like, can be decoded without de grading real-time performance. Further, with respect to a picture sequence having a shape signal which is considerably affected by a transmission error or the like, degradation in picture quality due to the error is reduced.

While in this fifth embodiment whether or not to stop decoding when an error is detected depends on whether the inputted video stream VOPstr has shape information or not, it may be decided by user operation according to the user's preference or purpose.

Embodiment 6

Figure 19:
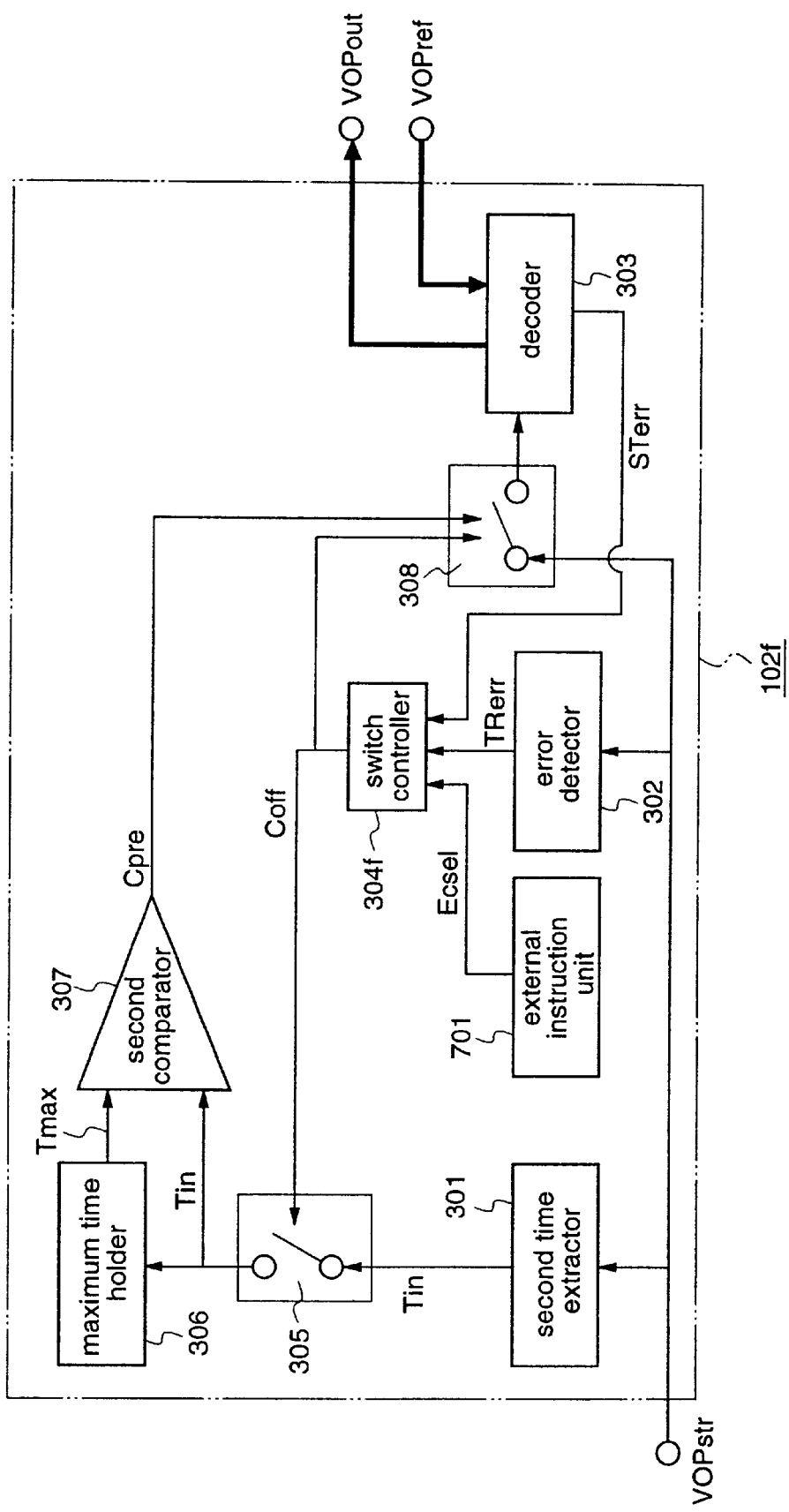
FIG. 19 is a block diagram for explaining a video decoding apparatus according to a sixth embodiment of the present invention, illustrating a decoding unit 102f as a component of the video decoding apparatus.

FIG. 19 is a block diagram for explaining a video decoding apparatus according to a sixth embodiment of the present invention, illustrating a decoding unit 102f as one of components of the video decoding apparatus.

The decoding unit 102f generates, according to user operation, an instruction signal Ecsel indicating whether decoding is to be stopped or not when an error is detected, and decides whether decoding is to be stopped or not at error detection on the basis of the instruction signal Ecsel.

To be specific, the decoding unit 102f includes an external instruction unit 701 instead of the shape existence decision unit 601 of the decoding unit 102e according to the fifth embodiment. The external instruction unit 701 generates, according to user operation, an instruction signal Ecsel instructing whether decoding on the inputted video stream VOPstr is to be stopped or not when a transmission error or the like is detected. Further, the decoding unit 102f includes an error notification unit 304f instead of the switch controller 304e of the decoding unit 102e according to the fifth embodiment. The error notification unit 304f generates a switch control signal Coff In the basis of an instruction signal Ecsel, a transmission error notification signal TRerr, and a stream error notification signal STerr.

The error notification unit 304f outputs a switch control signal Coff to turn off the ON/OFF switches 305 and 308 to these switches only when at least one of the transmission error notification signal TRerr and the decoding error notification signal STerr notifies that an error occurs, and the instruction signal Ecsel indicates that decoding on the inputted video stream VOPstr is to be stopped when a transmission error or the like is detected. Accordingly, when no error is detected or when the instruction signal Ecsel indicates that decoding on the inputted video stream VOPstr is not to be stopped when a transmission error or the like is detected, the ON/OFF switches 305 and 308 are not turned off by the switch control signal Coff. In this case, however, the ON/OFF switch 308 is controlled by a control signal Cpre from the second comparator 307.

Other constituents of the decoding unit 102f according to this sixth embodiment are identical to those of the decoding unit 102e according to the fifth embodiment.

In FIG. 19, the same reference numerals as those shown in FIG. 17 designate the same or corresponding parts.

Hereinafter, the operation will be described.

Figure 20:
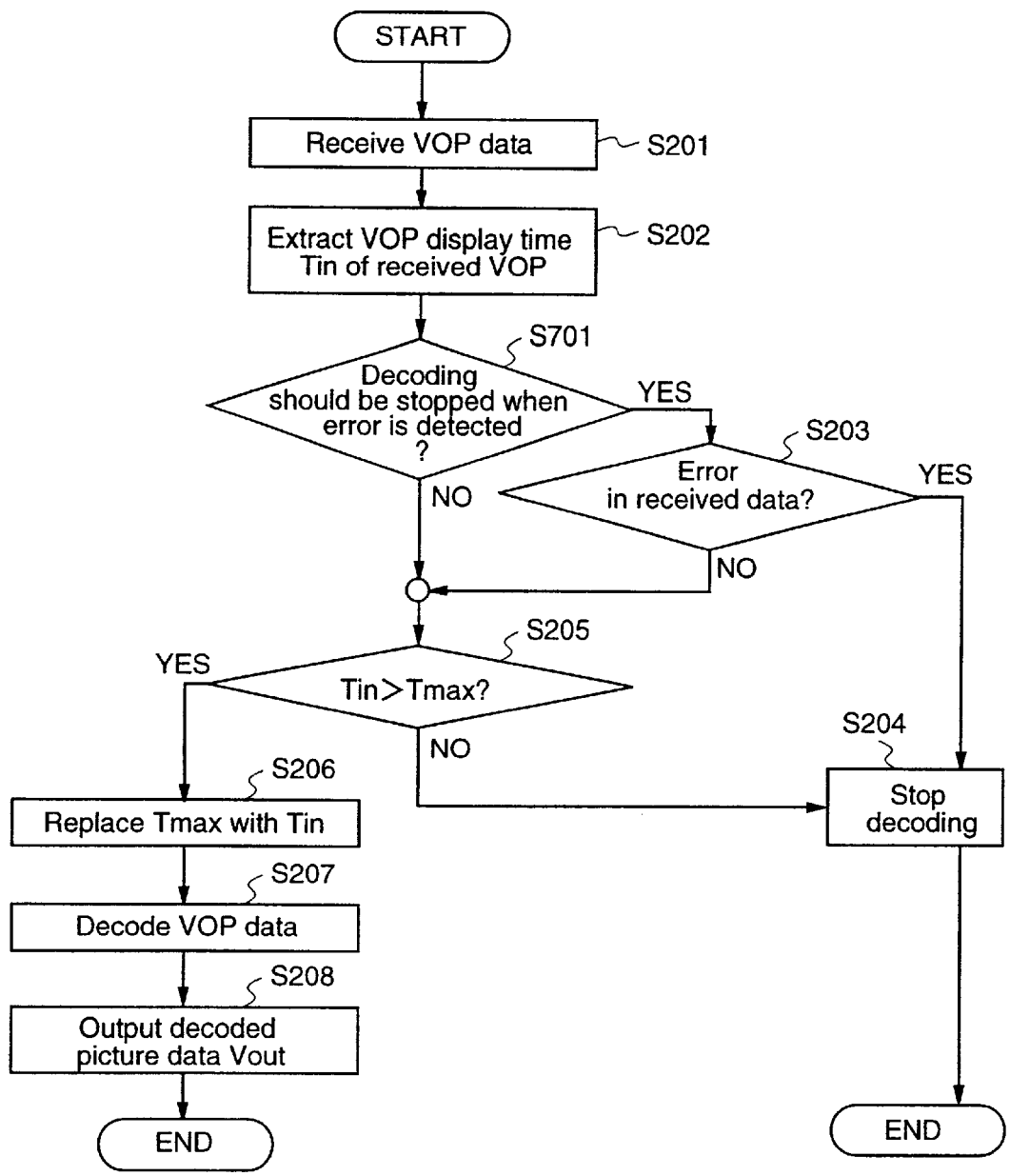
FIG. 20 is a flowchart illustrating the operation of the decoding unit 102f.

FIG. 20 is a flowchart for explaining the operation of the decoding unit 102f.

In the decoding unit 102f of this sixth embodiment, whether or not to stop decoding when an error is detected is predetermined in the external instruction unit 701 according to user operation, and an instruction signal Ecsel indicating whether decoding is to be stopped or not when detecting an error is output from the external instruction unit 701.

Initially, in the decoding unit 102f, as in the decoding unit 102e according to the fifth embodiment, VOP data of a predetermined VOP which is a component of a picture sequence is received by the decoding unit 102f as a video stream VOPstr corresponding to the picture sequence (step S201), and the VOP display time Tin of the received VOP data (VOP data of the target VOP to be decoded) is extracted in the second time extractor 301 (step S202).

Thereafter, in the decoding unit 102f, it is decided in the switch controller 304f whether the instruction signal Ecsel indicates that decoding on the inputted video stream VOPstr is to be stopped when a transmission error or the like is detected (step S701). When the instruction signal Ecsel indicates that decoding is to be stopped at error detection, step S701 is followed by detection of a transmission error by the error detector and detection of a stream error by the decoder 303 (step S203). On the other hand, when the instruction signal Ecsel indicates that decoding is not to be stopped at error detection, error detection in step S203 is by-passed, and the VOP display time Tin of the target VOP is compared with the already-decoded VOP maximum display time Tmax stored in the maximum time holder 306 by the second comparator 307 (step S205).

Thereafter, step S204 or steps S206~S208 is/are performed in the same way as described for the fifth embodiment.

As described above, the decoding unit 102f according to this sixth embodiment is provided with the external instruction unit 701 which generates, according to user operation, an instruction signal Ecsel instructing whether decoding on the inputted video stream VOPstr is to be stopped or not when a transmission error or the like is detected, and whether or not to stop decoding at error detection is decided on the basis of the instruction signal Ecsel. Therefore, whether or not to stop decoding at error detection can be decided according to the user's preference or purpose.

Embodiment 7

Figure 21:
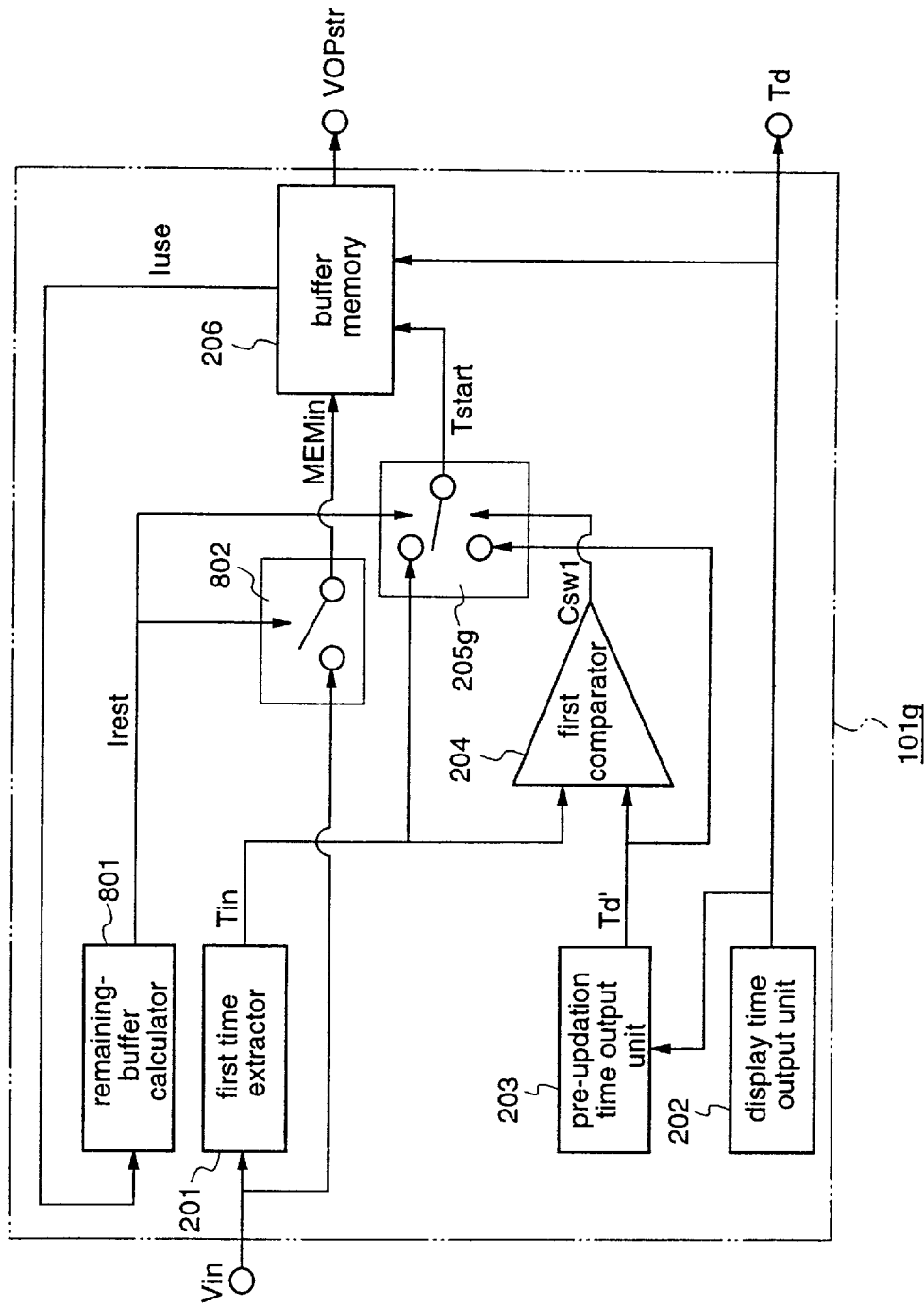
FIG. 21 is a block diagram for explaining a video decoding apparatus according to a seventh embodiment of the present invention, illustrating a rearrangement unit 101g as a component of the video decoding apparatus.

FIG. 21 is a block diagram for explaining a video decoding apparatus according to a seventh embodiment of the present invention, illustrating an arrangement unit 101g as one of components of the video decoding apparatus.

The rearrangement unit 101g includes, like the rearrangement unit 101 of the first embodiment, a first time extractor 201, a display time output unit 202, a pre-updation time output unit 203, a first comparator 204, and a buffer memory 206. The rearrangement unit 101g further includes a remaining buffer capacity calculator 801, and an ON/OFF switch 802. The calculator 801 calculates the capacity of the vacant space of the buffer memory 206 (hereinafter referred to as "remaining buffer capacity") on the basis of information Iuse indicating the use state of the buffer memory 206, and outputs a data input restriction signal Irest when the remaining buffer capacity is equal to or smaller than a predetermined threshold. The ON/OFF switch 802 controls supply of the inputted coded stream Vin to the buffer memory 206 on the basis of the data input restriction signal Irest. The rearrangement unit 101g further includes a selector switch 205g instead of the selector switch 205 of the rearrangement unit 101 according to the first embodiment. The selector switch 205g selects either the VOP display time Tin of the received VOP or the pre-updation display time Td' according to the control signal Csw1 from the first comparator 204 and the data input restriction signal Irest from the remaining buffer capacity calculator 801, and outputs the selected time to the buffer memory 206.

The ON/OFF switch 802 is turned off only when the remaining buffer capacity is smaller than the predetermined threshold, according to the data input restriction signal Irest from the remaining buffer capacity calculator 801, and it is in the ON state when the remaining buffer capacity is larger than the predetermined threshold. That is, the received VOP data is discarded at the ON/OFF switch 802 when the capacity of the vacant space of the buffer memory 206 is smaller than the predetermined threshold and, therefore, it is not output as memory input data MEMin to the buffer memory 206. On the other hand, when the capacity of the vacant space of the buffer memory 206 is larger than the threshold, the received VOP data is output as memory input data MEMin to the buffer memory 206 through the ON/OFF switch 802.

Further, the selector switch 205g selects the pre-updation display time Td' when the remaining buffer capacity Br is smaller than the threshold Bth (Br<Bth), and selects either the VOP display time Tin or the pre-updation display time Td' according to a control signal Csw1 from the first comparator 204 when the remaining buffer capacity Br is equal to or larger than the threshold Bth (Br≧Bth).

That is, when the VOP display time Tin of the received VOP is equal to or later than the pre-updation display time Td' (Tin≧Td'), the selector switch 205g selects the pre-updation display time Td', and outputs the pre-updation display time Td' as a decoding restart time Tstart to the buffer memory 206. On the other hand, when the VOP display time Tin of the received VOP is earlier than the pre-updation display time Td' (Tin<Td'), the selector switch 205g selects the VOP display time Tin, and outputs the VOP display time Tin as a decoding restart time Tstart to the buffer memory 206.

This seventh embodiment employs the remaining buffer capacity calculator 801 in place of the earliest time extractor 501 and the fourth comparator 502 in the rearrangement unit 101c according to the third embodiment, and in FIG. 21 the same reference numerals as those shown in FIG. 3 denote the same or corresponding parts.

Next, the operation will be described.

The operation of the video decoding apparatus according to the seventh embodiment is identical to that described for the third embodiment except the operation of the rearrangement unit 101g and, therefore, the operation of the rearrangement unit 101g will be mainly described hereinafter.

Figure 22:
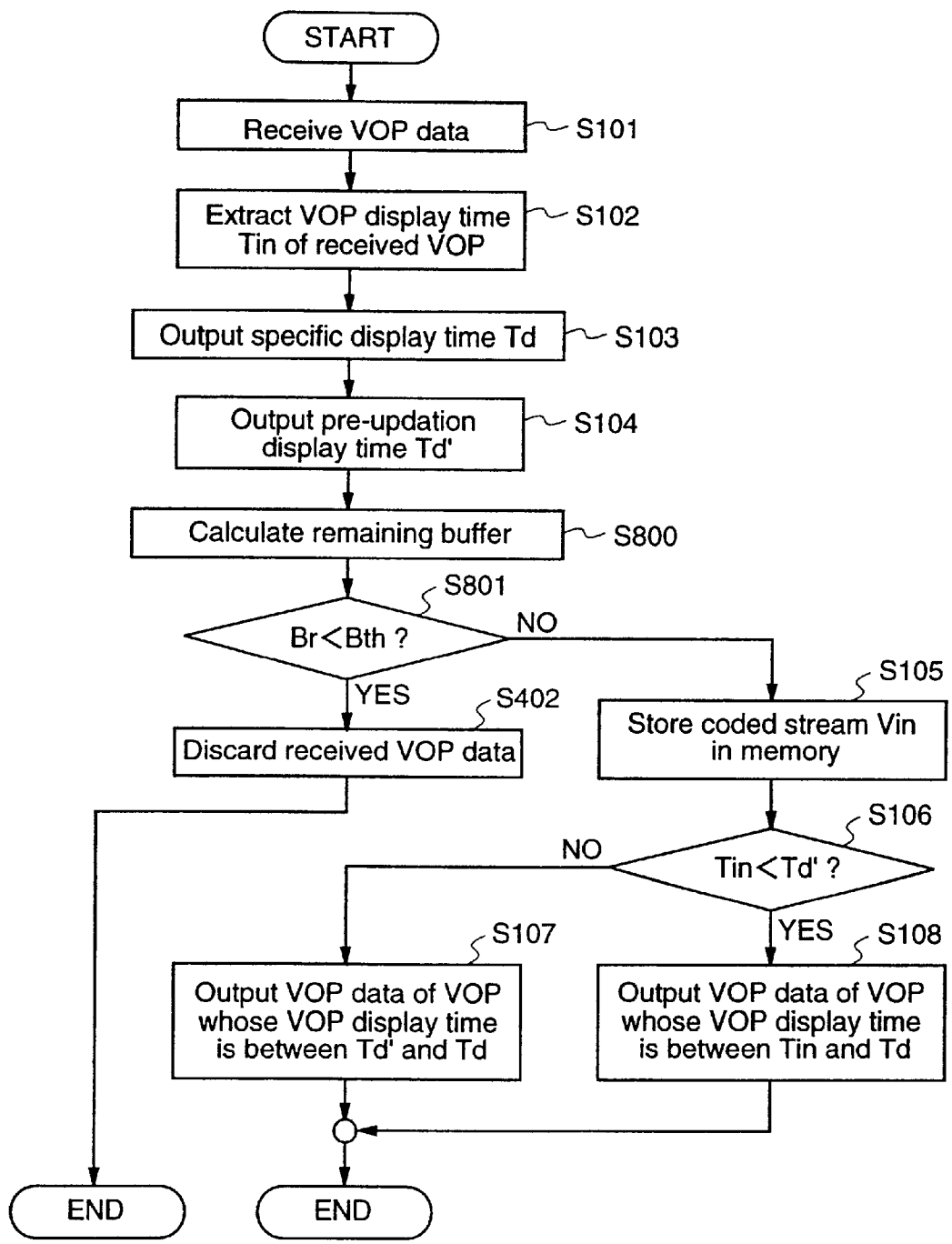
FIG. 22 is a flowchart illustrating the operation of the rearrangement unit 101g.

FIG. 22 is a flowchart for explaining the operation of the rearrangement unit 101g.

Initially, like the rearrangement unit 101c according to the third embodiment, VOP data inputted as a coded stream Vin is received (step S101), the VOP display time Tin of the received VOP is extracted (step S102), the specified display time Td is output (step S103), and the pre-updation display time Td' is output (step S104).

Thereafter, in the remaining buffer capacity calculator 801, the remaining buffer capacity Br is calculated on the basis of the information Iuse indicating the use state of the buffer memory 206 (step S801), and the remaining buffer capacity Br is compared with the threshold Bth (step S801).

Based on the result of comparison, when the remaining buffer capacity Br is smaller than the threshold Bth, the ON/OFF switch 802 is turned off according to the data input restriction signal Irest from the remaining buffer capacity calculator 801, and the VOP data of the received VOP is discarded (step S402). At this time, even when the control signal Csw1 from the first comparator 204 indicates that the VOP display time Tin is earlier than the pre-updation display time Td', the selector switch 205g selects the pre-updation display time Td' according to the data input restriction signal Irest from the remaining buffer capacity calculator 801.

On the other hand, when the remaining buffer capacity Br is larger than the threshold Bth, the ON/OFF switch 802 is turned on according to the data input restriction signal Irest from the remaining buffer capacity calculator 801, an the VOP data of the received VOP is supplied as memory input data MEMin to the buffer memory 206 to be stored in the buffer memory 206 (step S105).

Thereafter, like the rearrangement unit 101c of the third embodiment, the VOP display time Tin is compared with the pre-updation display time Td' by the first comparator 204 (step S106), and VOP data according to the result of comparison is output from the buffer memory 206 (steps S107 and S108).

As described above, in the rearrangement unit 101g of this seventh embodiment, as in the rearrangement unit 101 of the first embodiment, when VOP data of a previous VOP is received after VOP data of a subsequent VOP, VOP data of VOPs from the previous VOP to a VOP to be displayed at this point of time are output as a video stream VOPstr to the decoding unit 102 Therefore, when the VOP data of the previous VOP is input to the decoding 102 after the VOP data of the subsequent VOP, the decoding unit 102 can resume decoding on the VOP data of the previous VOP.

Further, the rearrangement unit 101g is provided with the remaining buffer capacity calculator 801 which calculates the capacity of the vacant area of the buffer memory 206 (remaining buffer capacity Br) on the basis of the information Iuse indicating the use state of the buffer memory 206, and outputs a data input restriction signal Irest when the remaining buffer capacity is smaller than a predetermined threshold Bth, and supplies the VOP data of the received VOP tog the buffer memory 206 only when the remaining buffer capacity Br is equal to or larger than the threshold Bth. Therefore, undesired overflow of the buffer memory 206 is avoided.

Embodiment 8

Figure 23:
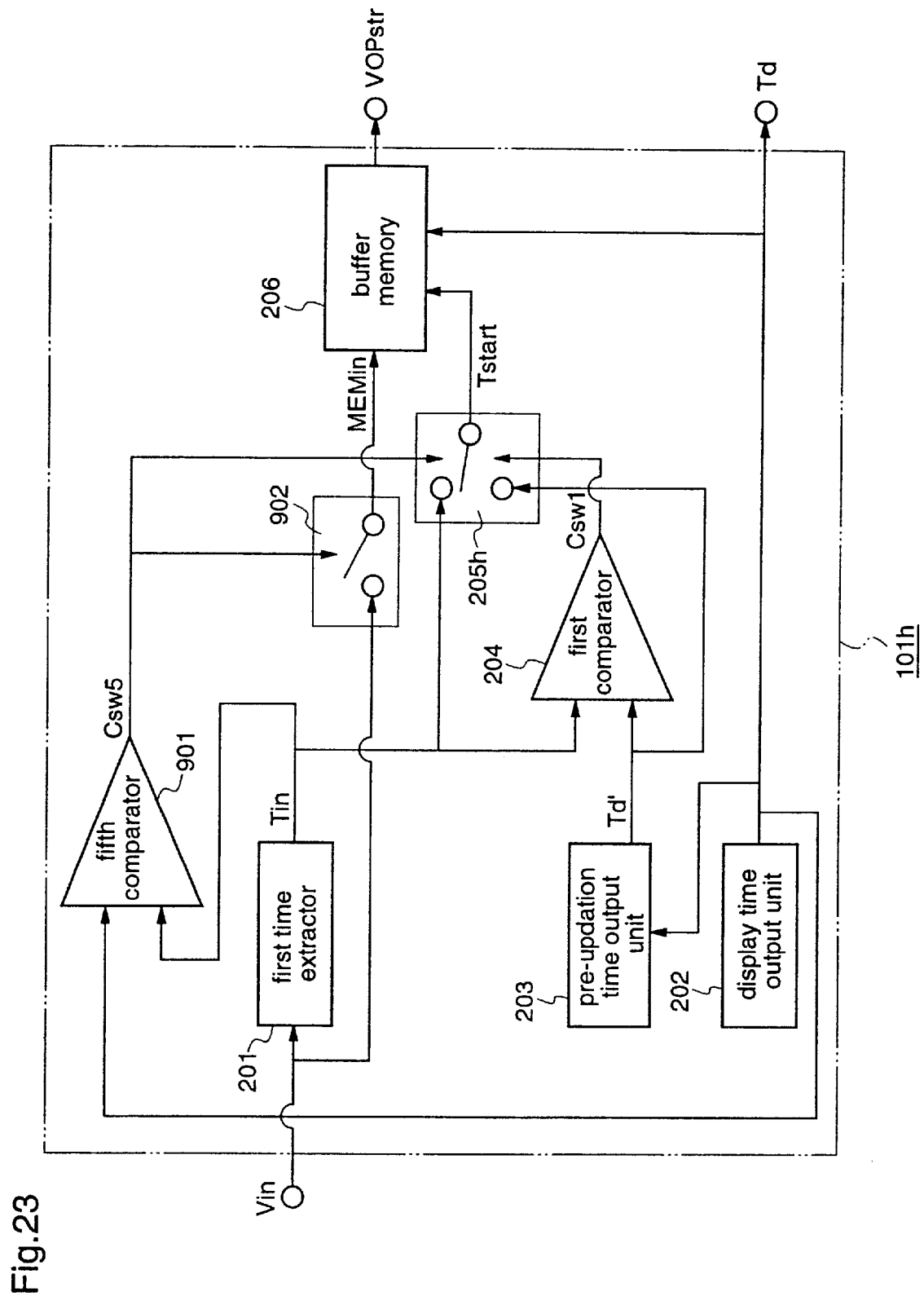
FIG. 23 is a block diagram for explaining a video decoding apparatus according to an eighth embodiment of the present invention, illustrating a rearrangement unit 101h as a component of the video decoding apparatus.

FIG. 23 is a block diagram for explaining a video decoding apparatus according to an eighth embodiment of the present invention, illustrating a rearrangement unit 101h as one of components of the video decoding apparatus.

The rearrangement unit 101h includes, like the rearrangement unit 101 of the first embodiment, a first time extractor 201, a display time output unit 202, a pre-updation time output unit 203, a first comparator 204, and a buffer memory 206. The rearrangement unit 101h further includes a fifth comparator 901, and an ON/OFF switch 902. The fifth comparator 901 compares the VOP display time Tin of the received VOP, which is outputted from the first time extractor 201, with the specified display time Td from the display time output unit 106, and outputs a control signal Csw5 according to whether the time $\Delta T$ ($\Delta T=Td-Tin$) from the VOP display time Tin to the specified display time Td (Tin<Td) is within a predetermined time Tth or not. The ON/OFF switch 902 is disposed just before the buffer memory 206, and controls supply of the inputted coded stream Vin to the buffer memory 206 on the basis of the control signal Csw5 from the fifth comparator 901. Further, the rearrangement unit 101h includes a selector switch 205h instead of the selector switch 205 of the rearrangement unit 101 according to the first embodiment. The selector switch 205h selects either the VOP display time Tin of the received VOP or the pre-updation display time Td' on the basis of the control signal Csw1 from the first comparator 204 and the control signal Csw5 from the fifth comparator 901, and outputs the selected time to the buffer memory 206.

The ON/OFF switch 902 is turned off only when the time $\Delta T$ from the VOP display time Tin to the specified display time Td exceeds the predetermined threshold Tth according to the control signal Csw from the fifth comparator 901, and it is in the ON state when the time $\Delta T$ is within the predetermined time Tth. That is, the received VOP data is discarded at the ON/OFF switch 902 when the time $\Delta T$ from its VOP display time Tin to the specified display time Td exceeds the predetermined time Tth and, therefore, it is not output as memory input data MEMin to the buffer memory 206. On the other hand, when the time $\Delta T$ is within the predetermined time, the received VOP data is output as memory input data MEMin to the buffer memory 206 through the ON/OFF switch 902.

Further, when the time $\Delta T$ from the VOP display time Tin to the specified display time Td exceeds the predetermined time Tth, the selector switch 205h selects the pre-updation display time Td' regardless of the control signal Csw1 from the first comparator 204, and outputs the pre-updation display time Td' as a decoding restart time Tstart to the buffer memory 206. On the other hand, when the time $\Delta T$ from the VOP display time Tin to the specified display time Td is within the predetermined time Tth, the selector switch 205h selects the earlier one between the VOP display time Tin and the pre-updation display time Td', according to the control signal Csw1 from the first comparator 204.

This eighth embodiment employs the fifth comparator 901 in place of the earliest time extractor 501 and the fourth comparator 502 in the rearrangement unit 101c according to the third embodiment, and in FIG. 23 the same reference numerals as those shown in FIG. 13 denote the same or corresponding parts.

Next, the operation will be described.

The operation of the video decoding apparatus according to the eighth embodiment is identical to that described for the third embodiment except the operation of the rearrangement unit 101h and, therefore, the operation of the rearrangement unit 101h will be mainly described hereinafter.

Figure 24:
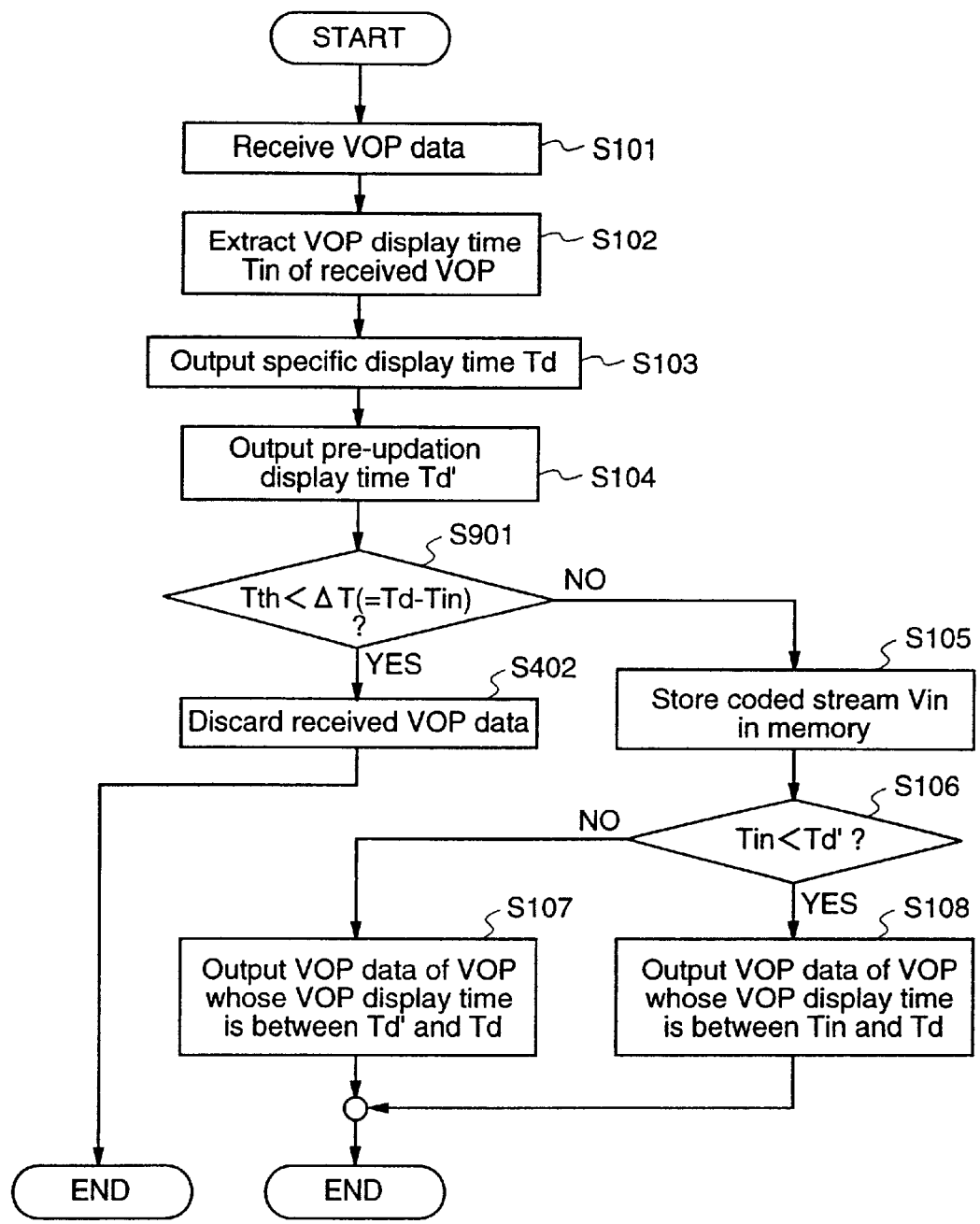
FIG. 24 is a flowchart illustrating the operation of the rearrangement unit 101h.

FIG. 24 is a flowchart for explaining the operation of the rearrangement unit 101h.

Initially, like the rearrangement unit 101c according to the third embodiment, VOP data inputted as a coded stream Vin is received (step S101), the VOP display time Tin of the received VOP is extracted (step S102), the specified display time Td is output (step S103), and the pre-updation display time Td' is output (step S104).

Thereafter, in the fifth comparator 901, it is decided whether the time ΔT from the VOP display time Tin to the specified display time Td exceeds a predetermined time Tth or not (step 5901).

Based on the result of comparison, when the time ΔT (=Td−Tin) exceeds the threshold time Tth, the ON/OFF switch 902 is turned off according to the control signal Csw5 from the fifth comparator 901, and the VOP data of the received VOP is discarded (step S402). At this time, even when the control signal Csw1 from the first comparator 204 indicates that the VOP display time Tin is earlier than the pre-updation display time Td', the selector switch 205h selects the pre-updation display time Td, according to the control signal Csw5 from the fifth comparator 901.

On the other hand, when the time ΔT (=Td−Tin) is within the predetermined time Tth, the ON/OFF switch 902 is turned on according to the control signal Csw5 from the fifth comparator 901, and the VOP data of the received VOP is supplied as memory input data MEMin to the buffer memory 206 to be stored in the buffer memory 206 (step S105).

Thereafter, like the rearrangement unit 101c of the third embodiment, the VOP display time Tin is compared with the pre-updation display time Td' by the first comparator 204 (step S106), and VOP data according to the result of comparison is output from the buffer memory 206 (steps S107 and S108).

As described above, in the rearrangement unit 101h of this eighth embodiment, as in the rearrangement unit 101 of the first embodiment, when VOP data of a previous VOP is received after VOP data of a subsequent VOP, VOP data of VOPs from the previous VOP to a VOP to be displayed at this point of time are output as a video stream VOPstr to the decoding unit 1021 Therefore, when the VOP data of the previous VOP is input to the decoding 102 after the VOP data of the subsequent VOP, the decoding unit 102 can resume decoding on the VOP data of the previous VOP.

Further, in the rearrangement unit 101h, only when a difference between the VOP display time of a delayed VOP which is received with a delay and the specified display time on the decoding end at the delayed VOP received time is within a predetermined time, VOP data of the received VOP is supplied to the buffer memory 206. Therefore, when part of VOP data from the delayed VOP to the display target VOP is deleted from the buffer memory 206 and so these VOP data cannot be decoded normally, the delayed VOP is prevented from being output to the buffer memory.

Embodiment 9

Figure 25:
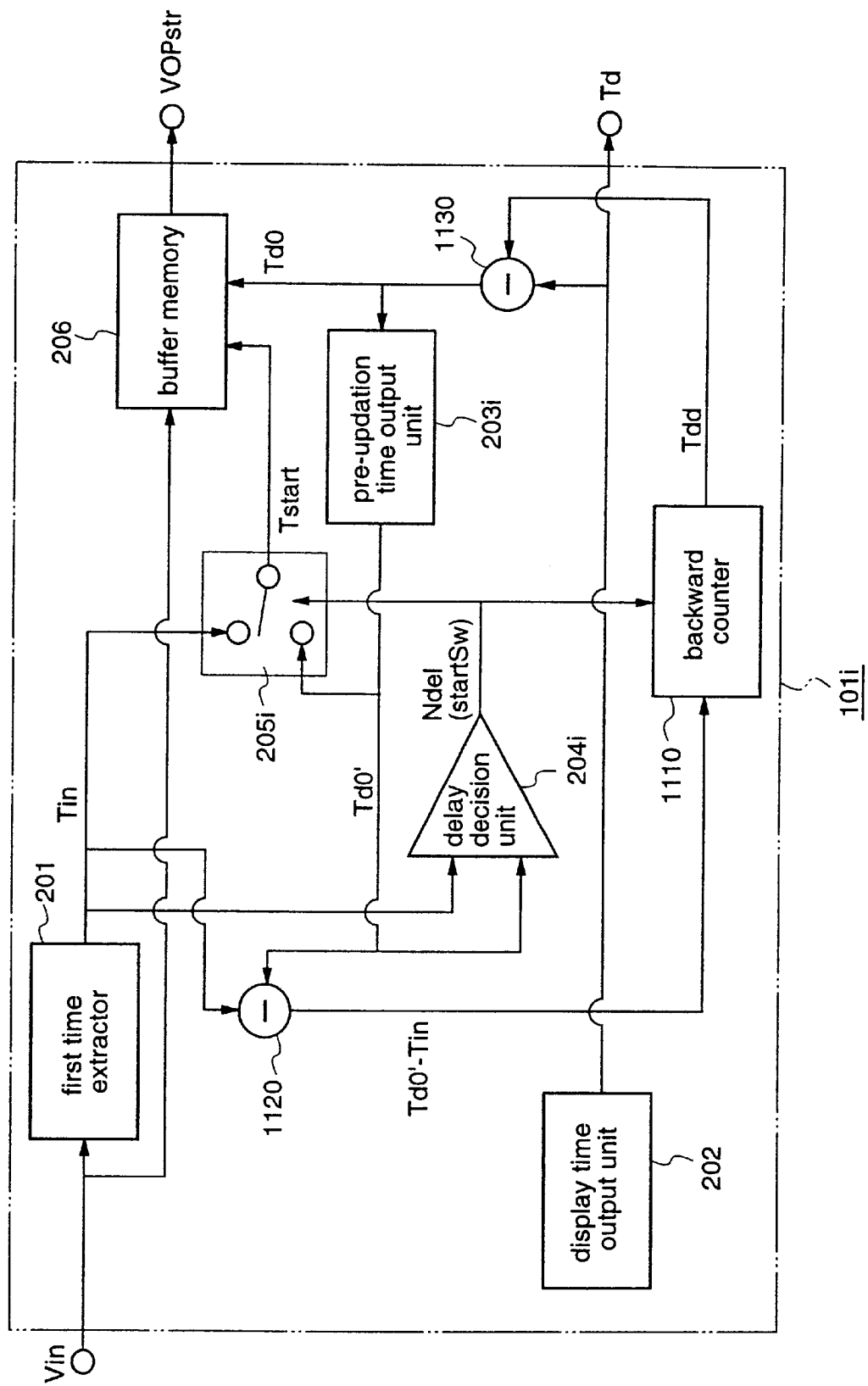
FIG. 25 is a block diagram for explaining a video decoding apparatus according to a ninth embodiment of the present invention, illustrating a rearrangement unit 101i as a component of the video decoding apparatus.

FIG. 25 is a block diagram for explaining a video decoding apparatus according to a ninth embodiment of the present invention, illustrating a rearrangement unit 101i as one of components of the video decoding apparatus.

The rearrangement unit 101i includes a first time extractor 201, a display time output unit 202, and a buffer memory 206. The first time extractor 201 extracts a VOP display time Tin which is set for each VOP, from an inputted coded stream Vin. The display time output unit 202 contains a timer (not shown), and updates and outputs a specified display time Td indicating a display timing for each VOP at the video decoding apparatus end. The buffer memory 206 stores the coded stream Vin.

Further, the rearrangement unit 101i includes a first subtracter 1120, and a backward counter 1110. The first subtracter 1120 calculates a difference (Td0'−Tin) between the VOP display time Tin of a received VOP (a VOP whose VOP data is received) and a set display time Td0 which has been set at reception of the received VOP and is not yet updated (pre-updation set display time Td0'). The backward counter 1110 receives a delay notification signal (startSw signal) indicating that VOP data of a predetermined VOP is received with a delay), and outputs a difference (Td0'−Tin) as a correction time (time to be used for correction) Tdd and, thereafter, gradually decrements the value of the correction time Tdd every time the specified display time Td is updated by the display time output unit 202. The backward counter 1110 outputs "0" after the value of the correction time Tdd to be output becomes "0". Thereafter, when the backward counter 1101 again receives a delay notification signal (startSw signal) Ndel indicating that VOP data of a predetermined VOP is received with a delay, it gradually decrements the correction time Tdd from the difference (Td0'−Tin).

The rearrangement unit 101i further includes a second subtracter 1130, a pre-updation time output unit 203i, a delay decision unit 204, and a selector switch 205w. The second subtracter 1130 outputs, as the above-mentioned set display time, a time Td0 obtained by subtracting the correction time Tdd outputted from the backward counter 1110 from the specified display time Td outputted from the display time output unit 202. The pre-updation time output unit 203i outputs a value Td0' of the set display time Td0 before updation (pre-updation set display time), on the basis of the set display time Td0. The delay decision unit 204 outputs the above-mentioned delay notification signal (startSw signal) Ndel by comparing the VOP display time Tin from the first time extractor 201 with the pre-updation set display time Td0'. The selector switch 205i selects either the VOP display time Tin or the pre-updation set display time Td0' on the basis of the delay notification signal (startSw signal) Ndel, and outputs the selected time as a decoding restart time Tstart.

The delay decision unit 204i decides whether or not the received VOP is a delayed VOP whose VOP data is received with a delay from its reception timing which enables decoding on the VOP data, and outputs a delay notification signal (startSw signal) Ndel when the received VOP is a delayed VOP. The selector switch 205i selects the VOP display time Tin when the delay notification signal (startSw signal) Ndel indicates that the received VOP is a delayed VOP, and selects the pre-updation set display time Td0' when the delay notification signal Ndel indicates that the received VOP is not a delayed VOP. Further, the buffer memory 206 outputs, as a video stream VOPstr, VOP data of VOPs whose VOP display times are within the range from the decoding restart time Tstart from the selector switch 205i to the set display time Td0 from the second subtracter 1130.

Next, the operation will be described.

Initially, when a coded stream Vin corresponding to one picture sequence (object) is input to the rearrangement unit 101i, VOP data received as the coded stream Vin is stored in the buffer memory 206. In the first time extractor 201, the VOP display time (VOP display time of the received VOP) Tin corresponding to the VOP data received as the coded stream Vin is extracted. Further, in the display time output unit 202 the specified display time Td indicating the VOP display timing at the video decoding apparatus end is successively updated and outputted, on the basis of reference time information included in the coded stream Vin.

At this time, in the first subtracter 1120, a difference (Td0'−Tin) between the VOP display time Tin of the received VOP and the set display time Td0 which has been set at reception of the received VOP and is not yet updated (pre-updation set display time Td0'), is calculated, and the difference (Td0'-Tin) so obtained is output to the backward counter 1110. In the backward counter 1110, the difference (Td0'-Tin) is output as a correction time Tdd to the second subtracter 1130 when a delay notification signal (startSw signal) indicating that VOP data of a predetermined VOP is received with a delay is supplied from the delay decision unit 204i. After the difference (Td0'-Tin) is output as a correction time Tdd, the value of the correction time Tdd to be output gradually decrements every time the specified display time Td is updated in the display time output unit 202. After the value of the correction time Tdd becomes "0" the value of the correction time Tdd is maintained at 1101 until a delay notification signal (startSw signal) Ndel is input again.

On the other hand, when a delay notification signal (startSw signal) Ndel indicating that VOP data of a specific VOP is received with a delay is not input to the backward counter 1110, "0" is output as a value of the correction time Tdd to the second subtracter 1130 regardless of the difference (Td0'-Tin) from the first subtracter 1120.

In the second subtracter 1130, a time Td0, which is obtained by subtracting the correction time Tdd outputted from the backward counter 1110 from the specified display time Td outputted from the display time output unit 202, is output as the above-mentioned set display time. In the pre-updation time output unit 203i, a value Td0' of the set display time Td0 before updation (pre-updation set display time) is output on the basis of the set display time Td0. In the delay decision unit 204, the VOP display time Tin from the first time extractor 201 is compared with the pre-updation set display time Td0', and the above-mentioned delay notification signal (startSw signal) Ndel is output as the result of comparison. To be specific, in the delay decision unit 204i, it is decided whether or not the received VOP is a delayed VOP whose VOP data is received with a delay from its reception timing which enables decoding on the VOP data. When the received VOP is a delayed VOP, the above-mentioned delay notification signal (startSw signal) is output.

In the selector switch 205i, either the, VOP display time Tin or the pre-updation set display time Td0' is selected on the basis of the delay notification signal (startSw signal) Ndel, and the selected time is output as a decoding restart time Tstart to the buffer memory 206. To be specific, in the selector switch 205i, the VOP display time Tin is selected when the delay notification signal (startSw signal) Ndel indicates that the received VOP is a delayed VOP, and the pre-updation set display time Td0' is selected when the delay notification signal Ndel indicates that the received VOP is not a delayed VOP.

Further, in the buffer memory 206, VOP data of VOPs, whose VOP display times are within the range from the decoding restart time Tstart from the selector switch 205i to the set display time Td0 from the second subtracter 1103, are output as a video stream VOPstr.

Next, the function of this ninth embodiment will be described.

In the rearrangement unit 101i according to this ninth embodiment, when VOP data of a predetermined VOP is received with a delay, a predetermined number of VOPs following this VOP are displayed such that the actual display times of these VOPs which are delayed from their original display time gradually approach the original display times. Therefore, even when there is a delayed VOP whose VOP data is received with a delay, the display times of VOPs following this delayed VOP are gradually corrected, resulting in a smoothly-moving picture.

To be specific, with respect to a VOP which is received with a delay, its actual display time (set display time Td0) is smaller than its original display time (specified display time Td) by a time Tdd corresponding to the delay time. Accordingly, VOP data of a VOP whose VOP display time is prior to its original display time Td (delayed VOP) is output from the buffer memory 206, and the delayed VOP is displayed.

Hereinafter, a description will be given of the case where VOP data of VOP(i) is received with a delay.

Figure 26:
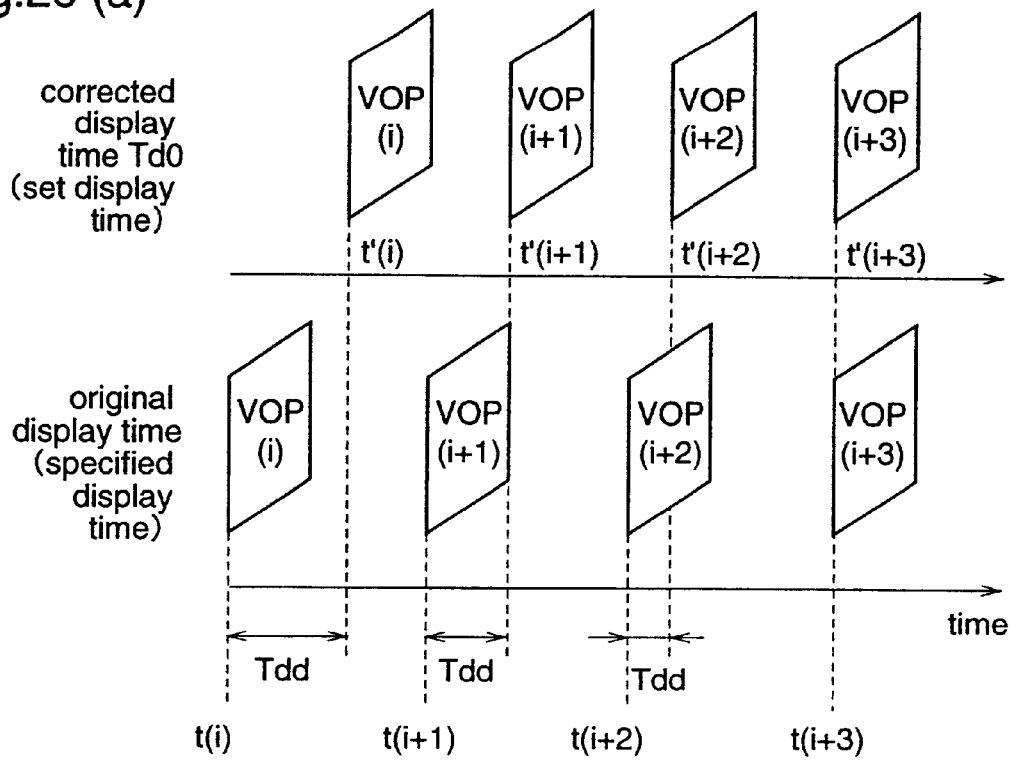
Figure 26:
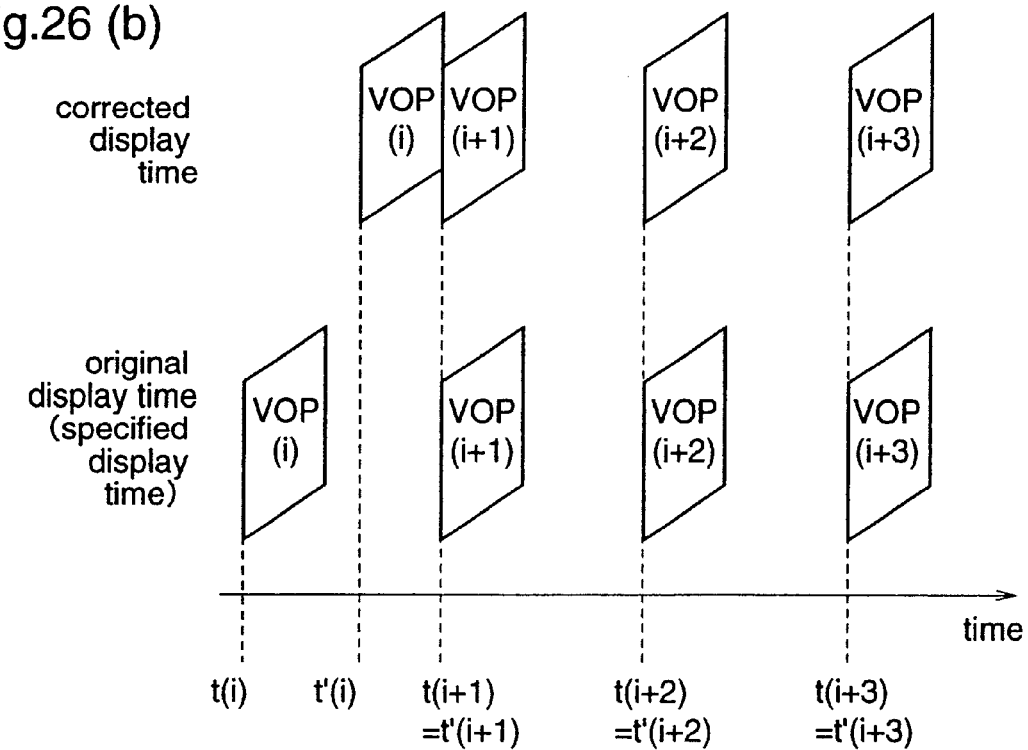

FIG. 26(a) illustrates the case where the actual display times (set display times Td0) of VOPs (i+1)~(i+3), which follow the delayed VOP(i), gradually approach the original display times (specified display times Td).

The delayed VOP(i) is displayed at time t' (i) that is Tdd(=Tdd0) behind its original display time t(i), and the VOP(i+1) which follows the delayed VOP(i) is displayed at time t' (i+1) that is Tdd(=Tdd1<Tdd0) behind its original display time t(i+1). Further, the following VOP(i+2) is displayed at time t' (i+2) that is Tdd(=Tdd2<Tdd1) behind its original display time t(i+2), and the following VOP(i+3) is displayed at time t'(i+3) that is equal to its original display time t(i+3).

In this case, the difference Tdd (=Td-Td0) between the actual display time (set display time Td0) and the original display time (specified display time Td) decrements in the backward counter 1110 in the order of VOP(i), VOP(i+1), VOP(i+2), and VOP(i+3), and the actual display time Td0 becomes equal to the original display time Td at VOP(i+3), that is, further delays in the subsequent VOPs due to the occurrence of delayed VOP are avoided.

On the other hand, when the display times of the subsequent VOPs following the delayed VOP are not adjusted, the subsequent VOPs are displayed at their original display times. In this case, the occurrence of delayed VOP causes temporarily abnormal motion of displayed picture.

FIG. 26(b) shows the case where the subsequent VOPS (i+1) to (i+3) following the delayed VOP(i) are displayed at their original display times (specified display times Td).

With reference to FIG. 26(b), although the delayed VOP (i) is displayed at time t'(i) that is Tdd(=Tdd0) behind its original display time t(i), the subsequent VOPs (i+1), (i+2), and (i+3) are displayed at their original display times t(i+1), t(i+2), and t(i+3), respectively.

As described above, in the rearrangement unit 101i of this ninth embodiment, like the rearrangement unit 101 of the first embodiment, when VOP data of a previous VOP is received after VOP data of a subsequent VOP, VOP data of VOPs from the previous VOP to the target VOP to be displayed at this point of time are output as a video stream VOPstr to the decoding unit 102. Therefore, when the VOP data of the previous VOP is input to the decoding unit 102 after the VOP data of the subsequent VOP, the decoding unit 102 can resume decoding from the VOP data of the previous VOP.

Further, the rearrangement unit 101i is provided with the backward counter 1110. When VOP data of a predetermined VOP is received with a delay, the backward counter 110 decrements a difference Tdd (Td-Td0) between the actual display time of subsequent VOP (set display time Td0) and its original display time (specified display time Td) such that a subsequent VOP whose original display time is later has a smaller difference Tdd. Therefore, even when there is a delayed VOP whose VOP data is received with a delay, the display times of subsequent VOPs which follow the delayed VOP are gradually corrected, resulting in smoothly-moving picture.

Embodiment 10

Figure 27:
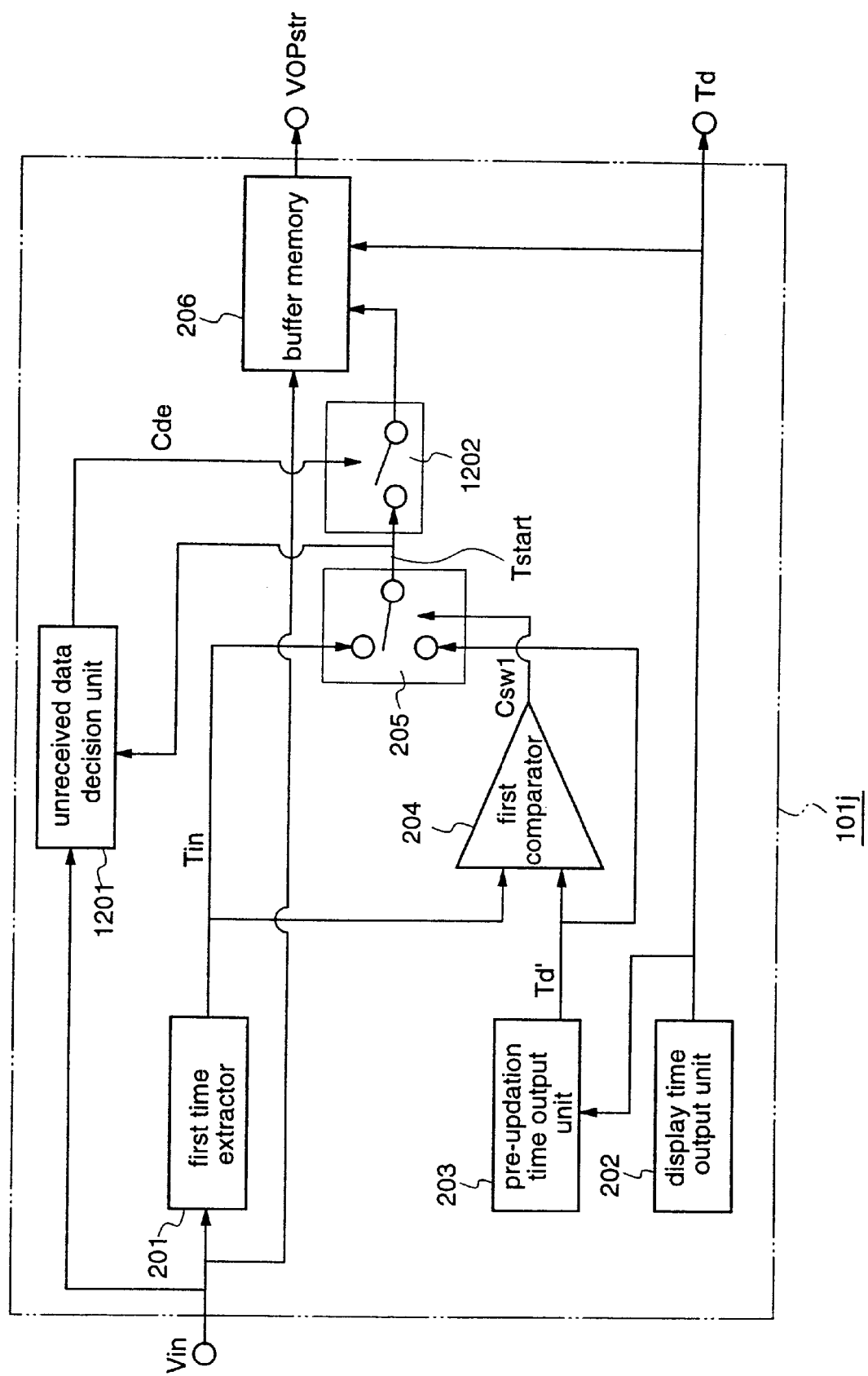
FIG. 27 is a block diagram for explaining a video decoding apparatus according to a tenth embodiment of the present invention, illustrating a rearrangement unit 101j as a component of the video decoding apparatus.

FIG. 27 is a block diagram for explaining a video decoding apparatus according to a tenth embodiment of the present invention, illustrating a rearrangement unit 101j as one of components of the video decoding apparatus.

The rearrangement unit 101j includes, like the rearrangement unit 101 of the first embodiment, a first time extractor 201, a display time output unit 202, a pre-updation,time output unit 203, a first comparator 204, a selector switch 205, and a buffer memory 206.

Further, the rearrangement unit 101j includes an unreceived data decision unit 1201, and an ON/OFF switch 1202. The unreceived data decision unit 1201 outputs a control signal Cde on the basis of an inputted coded stream Vin and a decoding restart time Tstart outputted from the selector switch 205. The ON/OFF switch 1202 is placed between the buffer memory 206 and the selector switch 205, and controls supply of the decoding restart time Tstart to the buffer memory 206 on the basis of the control signal Cde from the unreceived data decision unit 1201.

The unreceived data decision unit 1201 decides whether there is any VOP having a VOP display time between the VOP display time Tin of a received VOP and the decoding restart time Tstart and having VOP data which has not yet been received (unreceived VOP), and outputs a control signal Cre indicating the result of decision. The ON/OFF switch 1202 is turned off when the control signal Cre indicates that there is a unreceived VOP, and turned on when the control signal Cre indicates that there is no unreceived VOP. That is, when there is an unreceived VOP, no decoding restart time Tstart is supplied to the buffer memory 206 and, therefore, no video stream VOPstr is output from the buffer memory 206. Thereafter, when VOP data of the unreceived VOP is received, VOP data of VOPs from the delayed VOP which was received with a delay to the display target VOP are output as a video stream VOPstr from the buffer memory 236.

Next, the operation will be described.

The operation of the video decoding apparatus according to this tenth embodiment is identical to that according to the first embodiment except the operation of the rearrangement unit 101j and, therefore, the operation of the rearrangement unit 101j will be mainly described hereinafter.

Figure 28:
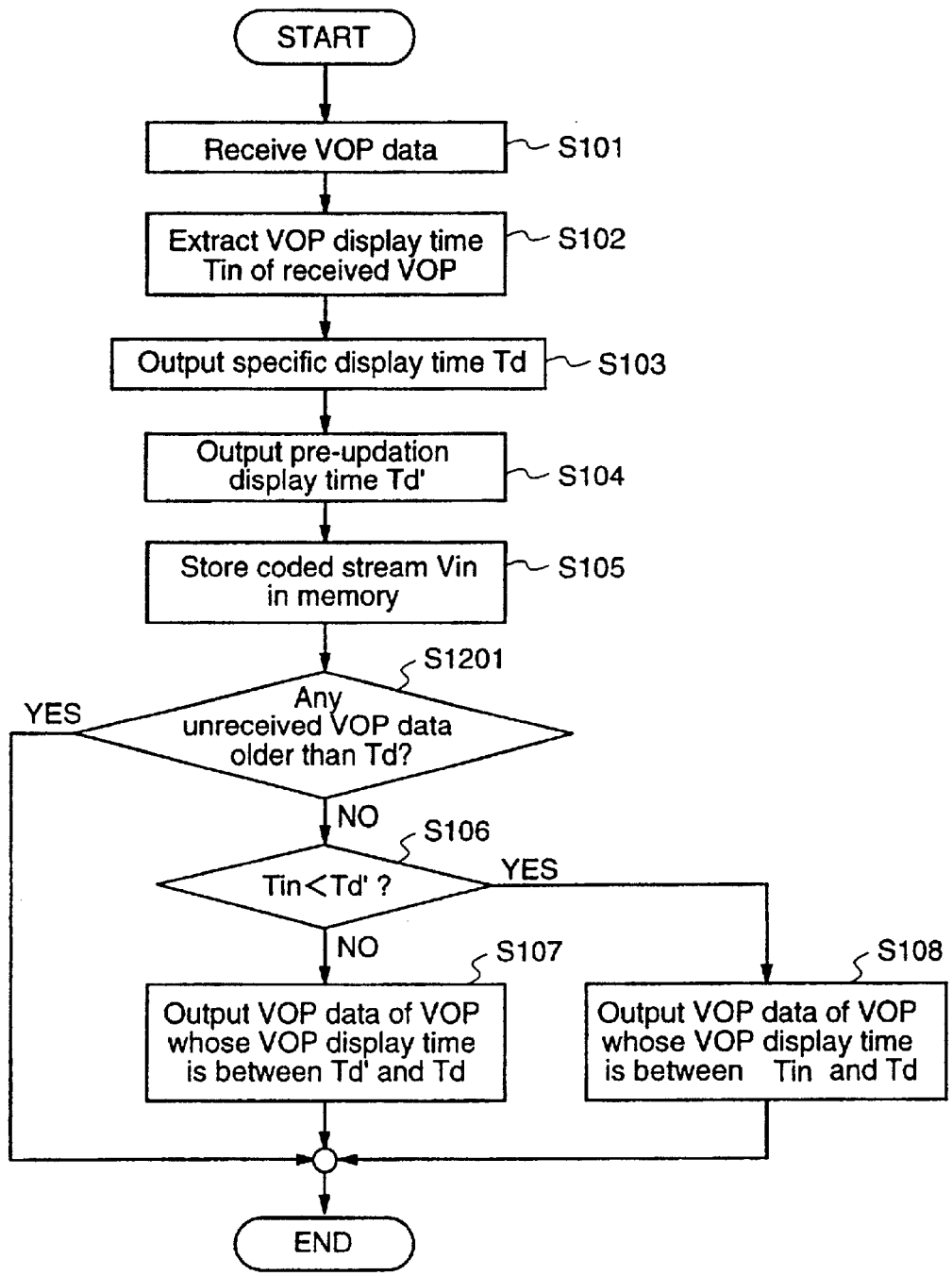
FIG. 28 is a flowchart illustrating the operation of the rearrangement unit 101j.

FIG. 28 is a flowchart for explaining the operation of the rearrangement unit 101j.

Initially, like the rearrangement unit 101 according to the first embodiment, VOP data inputted as a coded stream Vin is received (step 5101), the VOP display time Tin of the received VOP is extracted (step S102), the specified display time Td is output (step S103), the pre-updation display time Td' is output (step S104), and the coded stream Vin is stored in the buffer memory 206 (step S105).

Thereafter, in the unreceived data decision unit 1201, it is decided whether there is any VOP whose VOP display time is between the VOP display time Tin of the received VOP and the decoding restart time Tstart and whose VOP data has not yet been received, on the basis of the inputted coded stream Vin and the decoding restart time Tstart outputted from the selector switch 205 (step S1201).

When it is decided in step S1201 that there is an unreceived VOP, the ON/OFF switch 1202 is turned off by the control signal Cre, and the decoding restart time Tstart is not supplied to the buffer memory 206. Therefore, no video stream VOPstr is output from the buffer memory 206.

On the other hand, when it is decided in step S1201 that there is no unreceived VOP, the ON/OFF switch 1202 is turned on, and the decoding restart time Tstart is supplied to the buffer memory 206.

Thereafter, like the rearrangement unit 101 of the first embodiment, the VOP display time Tin is compared with the pre-updation display time Td' by the first comparator 204 (step S106), and VOP data according to the result of comparison is output from the buffer memory 206 (steps S107 and S108). That is, when the VOP display time Tin is earlier than the pre-updation display time Td' (Tin<Td'), VOP data of VOPs whose VOP display times are between the VOP display time Tin of the received VOP and the specified display time Td are output from the buffer memory 206 (step S108). On the other hand, when the VOP display time Tin is equal to or later than the pre-updation display time Td' (Tin≧Td'), VOP data of VOPs whose VOP display times are between the pre-updation display time Td, and the specified display time Td are output from the buffer memory (step S106).

As described above, in the rearrangement unit 101j of this tenth embodiment, as in the rearrangement unit 101 of the first embodiment, when VOP data of a previous VOP is received after VOP data of a subsequent VOP, VOP data of VOPs from the previous VOP to a VOP to be displayed at this point of time are output as a video stream VOPstr to the decoding unit 102. Therefore, when the VOP data of the previous VOP is input to the decoding 102 after the VOP data of the subsequent VOP, the decoding unit 102 can resume decoding on the VOP data of the previous VOP.

Further, the rearrangement unit 101j is provided with the unreceived data decision unit 1201 for deciding whether there is any VOP whose VOP display time is between the VOP display time Tin of the received VOP and the decoding restart time Tstart and whose VOP data has not yet been received. Supply of VOP data from the received VOP to the display target VOP is stopped when there is an unreceived VOP, while VOP data from the received VOP to the display target VOP are output to the decoding unit when there is no unreceived VOP. Therefore, when there is an unreceived VOP, supply of the video stream VOPstr from the buffer memory to the decoding unit is stopped until this VOP is received. Accordingly, even when the decoding unit is constituted by only a decoder which performs decoding on an inputted video stream VOPstr, it is avoided that inter-VOP prediction decoding is performed without normal reference picture data, whereby degradation in picture quality due to presence of unreceived VOP is avoided. Further, degradation in picture quality, which occurs in a VOP, is prevented from propagating through subsequent VOPs.

While in this tenth embodiment the rearrangement unit 101j is provided with an unreceived data decision unit 1201 and an ON/OFF switch 1202 in addition to the constituents of the rearrangement unit 101 according to the first embodiment, any of the rearrangement units 101b, 101c, 101d, 101g, 101h, and 101j according to the first, second, third, fourth, seventh, eighth, and ninth may be provided with an unreceived data decision unit 1201 and an ON/OFF switch 1202.

Furthermore, the video decoding apparatuses according to the aforementioned embodiments may be implemented not by hardware but by software.

For example, a video decoding apparatus according to any of the aforementioned embodiments can be implemented by software by recording, in a program storage medium, a decoding program for making a computer perform the operation of this video decoding apparatus, and loading the decoding program from the medium to a computer system.

Figure 29:
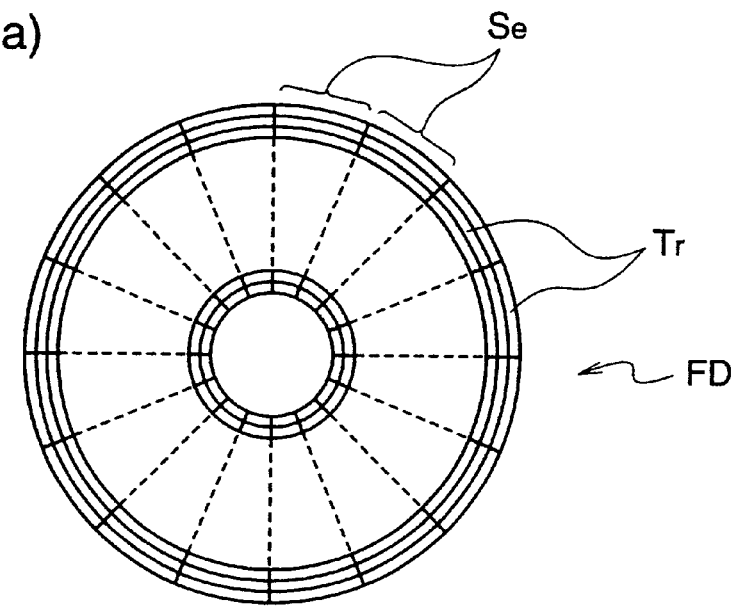
FIGS. 29(a) and 29(b) are diagrams for explaining a storage medium which contains a decoding pro ram for implementing a video decoding apparatus according to any of the aforementioned embodiments by using a computer system.
FIG. 29(c) is a diagram illustrating the computer system.
Figure 29:
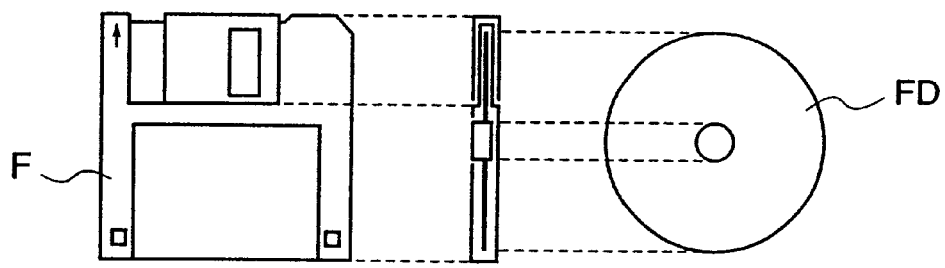
Figure 29:
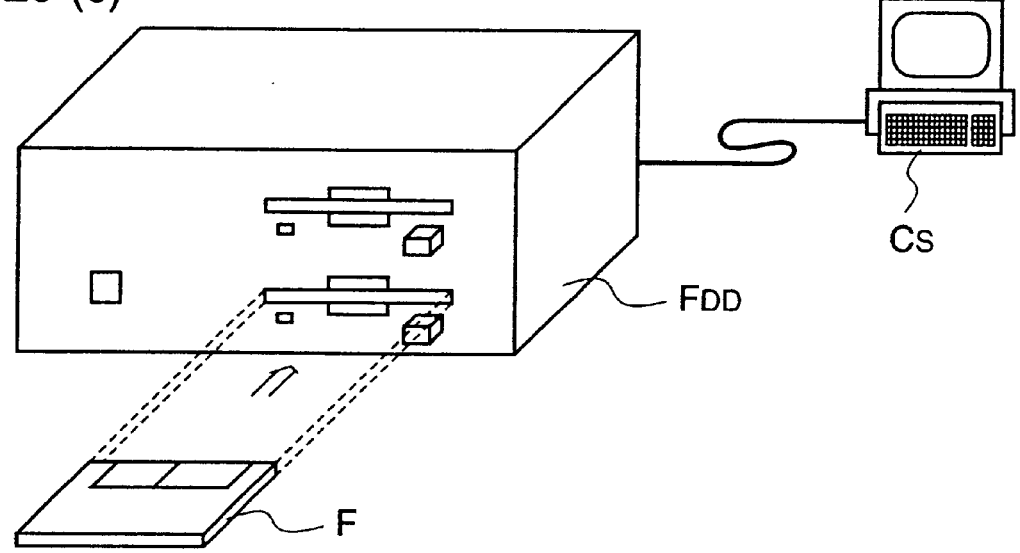

FIGS. 29(a) to 29(c) are diagrams for explaining the case of using a floppy disk as the program storage medium.

FIG. 29(a) is a diagram for explaining a physical format of a floppy disk FD, and FIG. 29(b) shows the floppy disk FD and a case F containing the floppy disk FD.

The floppy disk FD is contained in the case F. On the surface of the disk FD, a plurality of tracks Tr are formed concentrically along the radius of the disk, and each track is divided into sixteen sectors Se at equal angles.

On the floppy disk FD containing the above-mentioned decoding program, data of the decoding program is recorded in an assigned area of the floppy disk FD.

FIG. 29(c) shows an example of a specific construction for writing and reading the decoding program in/from the floppy disk FD.

The decoding program is written in the floppy disk FD from a computer system Cs through a floppy disk drive FDD. The decoding program recorded on the floppy disk FD is read into the computer system Cs through the floppy disk drive FDD. In the computer system Cs, a video decoding apparatus according to any of the aforementioned embodiments is constructed by the decoding program loaded from the floppy disk FD.

Although a floppy disk is described as a program storage medium, the program storage medium is not restricted to the floppy disk. Other media, such as optical disk, hard disk, magnetic disk, magneto-optic disk, ROM, and nonvolatile memory card, may be employed.

What is claimed is:

1. A video decoding method for decoding coded streams obtained by coding picture data of a moving picture comprising a plurality of pictures for which specific times are set, said method comprising:

a rearrangements operation comprising receiving coded data of the respective pictures as coded streams from a transmitting end, and outputting the received coded data of the respective pictures in chronological order of the specific times set on the respective pictures, at sending times corresponding to the respective pictures; and a decoding operation comprising performing decoding on the coded data of the respective pictures outputted in said rearrangement operation, thereby generating decoded picture data corresponding to the respective pictures;

wherein, when said rearrangement operation receives coded data of a picture to be outputted at a first sending time, with a delay after a second sending time which is later than the first sending time, said rearrangement operation outputs coded data of pictures whose specific times are within a range from the first sending time to the second sending time.

2. The video decoding method of claim 1 wherein, when said rearrangement operation receives coded data of a picture as one of components of the moving picture, before a time at which a last picture in a display order is to be displayed, said rearrangement operations outputs the coded data of the picture received; and when said rearrangement operation receives coded data of a picture as one of components of the moving picture after the time at which the last picture is to be displayed, said rearrangement operation further comprises discarding, the coded data of the picture received.

3. The video decoding method of claim 1, wherein, when said rearrangement operation receives the coded data of the picture to be outputted at the first sending time, with a delay after the second sending time later than the first sending time, if possible for said rearrangement operation to output coded data of all pictures whose specific times are within the range from the first sending time to the second sending time, said rearrangement operation outputs the coded data of all the pictures whose specific times are within the range; and if impossible to output coded data of all pictures whose specific times are within the range from the first sending time to the second sending time, said rearrangement operation further comprises discarding the coded data of the picture received.

4. A video decoding method for decoding coded streams obtained by coding picture data of a moving picture comprising a plurality of pictures on which specific times are set, said method comprising:

a rearrangement operation comprising receiving coded data of the respective pictures as coded streams from a transmitting end, and outputting the received coded data of the respective pictures in chronological order of the specific times set on the respective pictures; and a decoding operation comprising performing decoding on the coded data of the respective pictures outputted in said rearrangement operation, thereby generating decoded picture data corresponding to the respective pictures;

wherein, when said rearrangement operation outputs coded data of a picture which is not normally decodable, said decoding operation suspends decoding on coded data of pictures during a period from when the coded data is outputted to when coded data of a normally decodable picture is outputted.

5. The video decoding method of claim 4, wherein said decoding operation further comprises deciding whether or not decoding is to be suspended when coded data of a picture which is not normally decodable is outputted, based on control signal of a user.

6. The video decoding method of claim 4, wherein:

said decoding operation further comprises deciding whether or not coded data of a picture outputted from said rearrangement operation includes shape information indicating a shape of the picture; and when the coded data of the picture includes the shape information, and when coded data of a picture which is not normally decodable is outputted, said decoding operation suspends the decoding on coded data during a period from when the coded data is outputted to when coded data of a normally decodable picture is outputted; and when the coded data of the picture does not include the shape information, said decoding operation continues the decoding on coded data regardless of whether or not coded data of a picture outputted from said rearrangement operation is normally decodable.

7. A video decoding apparatus for decoding coded streams obtained by coding picture data of a moving picture comprising a plurality of pictures on which specific times are set, said apparatus comprising:

a data rearrangement unit for receiving coded data of the respective pictures as coded streams from a transmitting end, and outputting the received coded data of the pictures in chronological order of the specific times set on the respective pictures, at sending times corresponding to the respective pictures;

a decoding unit for performing decoding on the coded data of the respective pictures outputted from said data rearrangement unit, thereby generating decoded picture data corresponding to the respective pictures; and a display picture output unit for outputting the decoded picture data corresponding to the respective pictures outputted from said decoding unit, as display picture data, so that the respective pictures are displayed at predetermined timings;

wherein, when said data rearrangement unit receives coded data of a picture to be outputted at a first sending time, with a delay after a second sending time which is later than the first sending time, said data rearrangement unit outputs coded data of pictures whose specific times are within a range from the first sending time to the second sending time.

8. The video decoding apparatus of claim 7, wherein, when said data rearrangement unit outputs coded data of pictures whose specific times are within the range from the first sending time to the second sending time, said display picture output unit outputs, as the display picture data, only decoded picture data of a picture whose specific time is nearest to the second sending time, among the pictures whose coded data are outputted from said data rearrangement unit.

9. A video decoding apparatus for decoding coded streams obtained by coding picture data of a moving picture comprising a plurality of pictures on which specific times are set, said apparatus comprising:

a data rearrangement unit for receiving coded data of the respective pictures as coded streams from a transmitting end, and outputting the received coded data of the respective pictures in chronological order of the specific times set on the respective pictures;

a decoding unit for performing decoding on the coded data of the respective pictures outputted from said data rearrangement unit, thereby generating decoded picture data corresponding to the respective pictures; and a display picture output unit for outputting the decoded picture data corresponding to the respective pictures outputted from said decoding unit, as display picture data, so that the respective pictures are displayed at predetermined timings;

wherein, when coded data of a picture which is not normally decodable is outputted from said data rearrangement unit, said decoding unit suspends decoding on coded data of pictures during a period from when the coded data is outputted to when coded data of a picture which is normally decodable is outputted.

10. The video decoding apparatus of claim 9, wherein, while said decoding unit suspends decoding on coded data of pictures, said display picture output unit outputs, as the display picture data, decoded picture data which has most-recently been decoded by said decoding unit.

11. A program stored on a program storage medium for making a computer perform decoding on coded streams obtained by coding picture data of a moving picture comprising a plurality of pictures on which specific display times are set, said program comprising:

a rearrangement program for making the computer perform a rearrangement process comprising:
receiving coded data of the respective pictures as coded streams from a transmitting end;
outputting the received coded data of the respective pictures in chronological order of the specific times set on the respective pictures, at sending times corresponding to the respective pictures; and
when coded data of a picture to be outputted at a first sending time arrives at the computer with a delay after a second sending time which is later than the first sending time, outputting coded data of pictures whose specific times are within a range from the first sending time to the second sending time; and a decoding program for making the computer perform a decoding process on the coded data of the respective pictures outputted from said rearrangements program, thereby generating decoded picture data corresponding to the respective pictures.

12. A program stored on a storage medium for making a computer perform decoding on coded streams obtained by coding picture data of a moving picture comprising a plurality of pictures on which specific times are set, said program comprising:

a rearrangement program for making the computer perform a rearrangement process of receiving coded data of the respective pictures as coded streams from a transmitting end, and outputting the received coded data of the respective pictures in chronological order of the specific times set on the respective pictures; and a decoding program for making the computer perform a decoding process comprising:
performing decoding on the coded data of the respective pictures outputted from said rearrangement program, thereby generating decoded picture data corresponding to the respective pictures; and
during the decoding, when coded data of a display picture which is not normally decodable is outputted from said rearrangements program, suspending the decoding on coded data of pictures during a period from when the coded data is outputted to when coded data of a normally decodable picture is outputted.

13. A video decoding method for decoding coded streams obtained by coding picture data of a moving picture comprising a plurality of pictures for which their specific times are set, said method comprising:

a rearrangement operation comprising receiving coded data of the respective pictures as coded streams from a transmitting end, and outputting the received coded data of the respective pictures in chronological order of the specific times set on the respective pictures, at sending times corresponding to the respective pictures; and a decoding operation of performing decoding on the coded data of the respective pictures outputted in said rearrangement operation, thereby generating decoded picture data corresponding to the respective pictures;

wherein, when said rearrangement operation does not receive coded data of a picture to be outputted at a predetermined sending time by the predetermined sending time, said rearrangement operation suspends the outputting of coded data of pictures until receiving the coded data of the picture to be outputted at the predetermined sending time, and resumes the outputting of coded data of pictures after receiving the coded data of the picture.

14. A video decoding method for decoding coded streams obtained by coding picture data of a moving picture which comprises a plurality of pictures for which specific times are set, said method comprising:

a rearrangement operation of receiving coded data of the respective pictures as coded streams from a transmitting end, and outputting the received coded data of the respective pictures in chronological order of the specific times set on the respective pictures, at sending times corresponding to the respective pictures; and a decoding operation of performing decoding on the coded data of the respective pictures outputted in said rearrangement operation, thereby generating decoded picture data corresponding to the respective pictures;

wherein, when said rearrangement operation does not receive coded data of a picture to be outputted at a predetermined sending time by the predetermined sending time, said rearrangement operation suspends the outputting, of coded data of pictures until a predetermined condition is satisfied or until the coded data of the picture to be outputted at the predetermined sending time is received, and resumes the outputting of coded data of pictures after the condition is satisfied or after the coded data of the picture is received.

15. The video decoding method of claim 14, wherein the predetermined condition is that, in said rearrangement operation, a remaining memory capacity of a buffer memory which stores received coded streams of the respective pictures is equal to or smaller than a predetermined threshold.

16. The video decoding method of claim 14, wherein the predetermined condition is that, in said rearrangement operation, a time during which sending the outputting of coded data of pictures is suspended is equal to or longer than a predetermined threshold.

17. A video decoding apparatus for decoding coded streams obtained by coding picture data of a moving picture comprising a plurality of pictures on which specific times are set, said apparatus comprising:

a data rearrangement unit for receiving coded data of the respective pictures as coded streams from a transmitting end, and outputting the received coded data of the pictures in chronological order of the specific times set on the respective pictures, at sending times corresponding to the respective pictures;

a decoding unit for performing decoding on the coded data of the respective pictures outputted from said data rearrangement unit, thereby generating decoded picture data corresponding to the respective pictures; and a display picture output unit for outputting the decoded picture data corresponding to the respective pictures outputted from said decoding unit, as display picture data, so that the respective pictures are displayed at predetermined timings;

wherein, when said data rearrangement unit does not receive coded data of a picture to be outputted at a predetermined sending time by the predetermined sending time, said data rearrangement unit suspends the outputting of coded data of pictures until receiving the coded data of the picture to be outputted at the predetermined sending time, and resumes the outputting of coded data of pictures after receiving the coded data of the picture.

18. A video decoding apparatus for decoding coded streams obtained by coding picture data of a moving picture comprising a plurality of pictures on which specific times are set, said apparatus comprising:

a data rearrangement unit for receiving coded data of the respective pictures as coded streams from a transmitting end, and outputting the received coded data of the pictures in chronological order of the specific times set on the respective pictures, at sending times corresponding to the respective pictures;

a decoding unit for performing decoding on the coded data of the respective pictures outputted from said data rearrangement unit, thereby generating decoded picture data corresponding to the respective pictures; and a display picture output unit for outputting the decoded picture data corresponding to the respective pictures outputted from said decoding unit, as display picture data, so that the respective pictures are displayed at predetermined timings;

wherein, when said data rearrangement unit does not receive coded data of a picture to be outputted at a predetermined sending time by the predetermined sending time, said data rearrangement unit suspends the outputting of coded data of pictures until a predetermined condition is satisfied or until the coded data of the picture to be outputted at the predetermined sending time is received, and resumes the outputting of coded data of pictures after the condition is satisfied or after the coded data of the picture is received.

19. The video decoding apparatus of claim 18 wherein, when said data rearrangement unit resumes the outputting of coded data of pictures to said decoding unit, said display image output unit performs display of pictures within a predetermined period of time such that delays in display timings of the pictures, which occur due to the suspended outputting, are decreased every time a picture is displayed.

20. A program stored on a program storage medium for making a computer perform decoding on coded streams obtained by coding picture data of a moving picture comprising a plurality of pictures on which specific display times are set, said program comprising:

a rearrangement program for making the computer perform a rearrangement process comprising:

receiving coded data of the respective pictures as coded streams from a transmitting end;

outputting the received coded data of the respective pictures in chronological order of the specific times set on the respective pictures, at sending times corresponding to the respective pictures; and when coded data of a picture to be outputted at a predetermined sending time has not been received at the computer by the predetermined sending time, suspending the outputting of coded data of pictures until receiving the coded data of the picture to be outputted at the predetermined sending time, and resuming the outputting of coded data of pictures after receiving the coded data of the picture; and a decoding program for making the computer perform a decoding process on the coded data of the respective pictures outputted from said rearrangement program, thereby generating decoded picture data corresponding to the respective pictures.

21. A program stored on a program storage medium for making a computer perform decoding on coded streams obtained by coding picture data of a moving picture comprising a plurality of on which specific display times are set, said program comprising:

a rearrangement program for making the computer perform a rearrangement process comprising:

receiving coded data of the respective pictures as coded streams from a transmitting end;

outputting the received coded data of the respective pictures in chronological order of the specific times set on the respective pictures, at sending times corresponding to the respective pictures; and when coded data of a picture to be outputted at a predetermined sending time has not been received at the computer by the predetermined sending time, suspending the outputting of coded data of pictures until a predetermined condition is satisfied or until the computer receives the coded data of the picture to be outputted at the predetermined sending time, and resuming the outputting of coded data of pictures after the condition is satisfied or after the computer receives the coded data of the picture; and a decoding program for making the computer perform a decoding process on the coded data of the respective pictures outputted from said rearrangement program, thereby generating decoded picture data corresponding to the respective pictures.

* * * * *

UNITED STATES PATENT AND TRADEMARK OFFICE
CERTIFICATE OF CORRECTION

PATENT NO. : 6,757,332 B1
DATED : June 29, 2004
INVENTOR(S) : Shinya Kadono

It is certified that error appears in the above-identified patent and that said Letters Patent is hereby corrected as shown below:

Column 51,
Line 38, please change "rearrangements" with -- rearrangement --.
Line 57, please insert -- , -- after "claim 1",
Line 61, please change "operations" to -- operation --.
Line 66, replace "discarding," with -- discarding --.

Column 54,
Line 11, please change "rearrangements" to -- rearrangement --.

Column 55,
Line 15, replace "outputting," with -- outputting --.
Line 28, replace "which sending the" with -- which the --.

Column 56,
Line 63, please insert -- pictures -- between "a plurality of" and "on which".

Signed and Sealed this

Fifth Day of October, 2004

JON W. DUDAS
*Director of the United States Patent and Trademark Office*